(12) United States Patent
Gindilis

(10) Patent No.: US 10,286,377 B1
(45) Date of Patent: May 14, 2019

(54) ELECTRODE ARRAY DEVICE HAVING AN ADSORBED POROUS REACTION LAYER

(71) Applicant: CUSTOMARRAY, INC., Bothwell, WA (US)

(72) Inventor: Andrei Gindilis, Mukilteo, WA (US)

(73) Assignee: CustomArray, Inc., Bothwell, WA (US)

( * ) Notice: Subject to any disclaimer, the term of this patent is extended or adjusted under 35 U.S.C. 154(b) by 221 days.

(21) Appl. No.: 15/155,046

(22) Filed: May 15, 2016

Related U.S. Application Data

(63) Continuation of application No. 14/082,971, filed on Nov. 18, 2013, now Pat. No. 9,339,782, which is a continuation of application No. 13/571,306, filed on Aug. 9, 2012, now abandoned, which is a continuation of application No. 11/863,097, filed on Sep. 27, 2007, now abandoned, which is a continuation of application No. 10/992,252, filed on Nov. 18, 2004, now abandoned.

(51) Int. Cl.
| | |
|---|---|
| G01N 33/566 | (2006.01) |
| B01J 19/00 | (2006.01) |
| C23C 26/00 | (2006.01) |
| C25F 1/00 | (2006.01) |
| C25F 7/00 | (2006.01) |
| B08B 3/08 | (2006.01) |

(52) U.S. Cl.
CPC ............ B01J 19/0046 (2013.01); B08B 3/08 (2013.01); C23C 26/00 (2013.01); C25F 1/00 (2013.01); C25F 7/00 (2013.01); *B01J 2219/00596* (2013.01); *B01J 2219/00722* (2013.01); *B01J 2219/00725* (2013.01)

(58) Field of Classification Search
CPC ................... G01N 33/54313; G01N 2458/30
USPC ...................... 436/501; 506/19, 42
See application file for complete search history.

(56) References Cited

U.S. PATENT DOCUMENTS

| | | | |
|---|---|---|---|
| 3,720,591 A | 3/1973 | Skarlos | |
| 3,950,357 A | 4/1976 | Kahan | |
| 4,165,320 A | 8/1979 | Ondetti | |
| 4,563,263 A | 1/1986 | Oyama | |
| 4,840,893 A | 6/1989 | Hill | |
| 5,143,854 A | 9/1992 | Pirrung | |
| 5,445,934 A | 8/1995 | Fodor | |
| 5,510,270 A | 4/1996 | Fodor | |
| 5,540,828 A | 7/1996 | Yacynych | |
| 5,653,939 A | 8/1997 | Hollis | |
| 5,667,667 A | 9/1997 | Southern | |
| 5,695,940 A | 12/1997 | Drmanac | |
| 5,723,344 A | 3/1998 | Malibat | |
| 5,766,550 A | 6/1998 | Kaplan | |
| 5,824,473 A | 10/1998 | Meade | |
| 5,874,047 A | 2/1999 | Schoning | |
| 5,912,339 A | 6/1999 | Miller | |
| 5,928,905 A | 7/1999 | Stemmer | |
| 5,929,208 A | 7/1999 | Heller | |
| 5,953,681 A | 9/1999 | Cantatore | |
| 6,013,440 A | 1/2000 | Lipshutz | |
| 6,017,696 A | 1/2000 | Heller | |
| 6,051,380 A | 4/2000 | Sosnowski | |
| 6,066,448 A | 5/2000 | Wohlstader | |
| 6,093,302 A | 7/2000 | Montgomery | |
| 6,280,595 B1 | 8/2001 | Montgomery | |
| 6,320,041 B1 | 11/2001 | Hogrefe | |
| 6,391,558 B1 | 5/2002 | Henkens | |
| 6,444,111 B1 | 9/2002 | Montgomery | |
| 6,456,942 B1 | 9/2002 | Anderson | |
| 6,475,699 B2 | 11/2002 | Uetani | |
| 6,518,024 B2 | 2/2003 | Choong | |
| 6,576,426 B2 | 6/2003 | Southern | |
| 6,586,211 B1 | 7/2003 | Stahler | |
| 6,743,564 B2 | 6/2004 | Hatakeyama | |
| 6,780,582 B1 | 8/2004 | Wagner | |

(Continued)

FOREIGN PATENT DOCUMENTS

| | | |
|---|---|---|
| EP | 1420252 | 5/2004 |
| JP | 2005166601 | 6/2006 |

(Continued)

OTHER PUBLICATIONS

Office Action, Application No. 05849631.6 PCT/US2005/041906 dated May 2, 2012, 3 pages.

(Continued)

*Primary Examiner* — Natalia Levkovich

(74) *Attorney, Agent, or Firm* — Sci-Law Strategies, PC

(57) ABSTRACT

There is disclosed an electrode array device having an adsorbed porous reaction layer for improved synthesis quality. The array comprises a plurality of electrodes on a substrate, wherein the electrodes are electronically connected to a computer control system. The array has an adsorbed porous reaction layer on the plurality of electrodes, wherein the adsorbed porous reaction layer comprises a chemical species having at least one hydroxyl group. In the preferred embodiment, the reaction layer is sucrose. A method for preparing an electrode array for improved synthesis quality is disclosed. The method comprises a cleaning method and a method of attachment of a reaction layer. The cleaning method comprises a plasma cleaning method and a chemical cleaning method. The reaction layer is attached after cleaning by exposing the microarray to a solution containing the chemical species having at least one hydroxyl group.

20 Claims, 35 Drawing Sheets

Specification includes a Sequence Listing.

(56) References Cited

U.S. PATENT DOCUMENTS

| | | | |
|---|---|---|---|
| 6,824,669 | B1 | 11/2004 | Li |
| 6,921,636 | B1 | 7/2005 | Brennan |
| 6,960,298 | B2 | 11/2005 | Krotz |
| 7,008,769 | B2 | 3/2006 | Henderson |
| 7,541,314 | B2 | 6/2009 | Suciu |
| 7,557,069 | B2 | 7/2009 | Strathmann |
| 8,855,955 | B2 | 10/2014 | Peyvan |
| 9,267,213 | B1 | 2/2016 | Maurer |
| 9,339,782 | B1 | 5/2016 | Gindilis |
| 9,394,167 | B2 | 7/2016 | Maurer |
| 9,983,204 | B2 | 5/2018 | Maurer |
| 10,006,131 | B1 | 6/2018 | Maurer |
| 2001/0053529 | A1 | 12/2001 | Gindilis |
| 2002/0090738 | A1 | 7/2002 | Cozzette |
| 2002/0172963 | A1 | 11/2002 | Kelley |
| 2003/0022150 | A1 | 1/2003 | Sampson |
| 2003/0050437 | A1 | 3/2003 | Montgomery |
| 2003/0111356 | A1 | 6/2003 | Strathmann |
| 2003/0113713 | A1* | 6/2003 | Glezer .................. C12Q 1/485 435/5 |
| 2003/0134989 | A1 | 7/2003 | Aldrich |
| 2003/0152919 | A1 | 8/2003 | Roelens |
| 2003/0186226 | A1 | 10/2003 | Brennan |
| 2003/0190632 | A1 | 10/2003 | Sosnowski |
| 2003/0194709 | A1 | 10/2003 | Yang |
| 2004/0073017 | A1 | 4/2004 | Skrzypcznski |
| 2004/0238369 | A1 | 12/2004 | Southern |
| 2005/0043894 | A1 | 2/2005 | Fernandez |
| 2005/0212902 | A1 | 9/2005 | Cook |
| 2005/0239112 | A1 | 10/2005 | Padmanabhan |
| 2005/0272088 | A1 | 12/2005 | Cook |
| 2006/0035218 | A1 | 2/2006 | Oleinikov |
| 2006/0102471 | A1 | 5/2006 | Adermann |
| 2006/0105355 | A1 | 5/2006 | Maurer |
| 2006/0160100 | A1 | 7/2006 | Gao |
| 2006/0231411 | A1 | 10/2006 | Maurer |
| 2007/0034513 | A1 | 2/2007 | Maurer |
| 2007/0065877 | A1 | 3/2007 | Maurer |
| 2007/0072169 | A1 | 3/2007 | Peyvan |
| 2007/0231794 | A1 | 10/2007 | Dill |
| 2007/0292855 | A1 | 12/2007 | Dubin |
| 2008/0035494 | A1 | 2/2008 | Gomez |
| 2008/0039342 | A1 | 2/2008 | Tian |
| 2008/0125327 | A1 | 5/2008 | Kumar |
| 2009/0280998 | A1 | 11/2009 | Maurer |
| 2011/0281766 | A1 | 11/2011 | Cooper |
| 2016/0354751 | A1 | 12/2016 | Maurer |

FOREIGN PATENT DOCUMENTS

| | | |
|---|---|---|
| WO | WO9603417 | 2/1996 |
| WO | WO0051721 | 9/2000 |
| WO | WO0123082 | 4/2001 |
| WO | WO0231463 | 4/2002 |
| WO | WO0231481 | 4/2002 |
| WO | WO02090963 | 11/2002 |
| WO | WO02103061 | 12/2002 |
| WO | WO03020415 | 3/2003 |
| WO | WO04024886 | 3/2004 |
| WO | WO2006055810 | 5/2006 |

OTHER PUBLICATIONS

Extended European Search Report, Application No. 06739757.0 PCT/US2006/011150 dated Jan. 20, 2011, 9 pages.
Article 94(3) European Communication, Application No. 05849631.6 PCT/US2005/041906, dated Nov. 25, 2015, 5 pages.
Article 116(1) European Communication, Application No. 06750351.6 PCT/US2006/014288, dated Nov. 24, 2015, 9 pages.
Office Action, Application No. 06750351.6 PCT/US2006/014288 dated Feb. 21, 2013, 4 pages.
European Search Report, Application No. EP06750351 PCT/US2006/014288 dated Dec. 2, 2010, 9 pages.
Afshari et al., "Application of Complementary DNA Microarray Technology to Carcinogen Identification . . . ", Cancer Res., 1999, pp. 4759-4760, vol. 59.
Bard et al., "Azo, Azoxy and Diazo Compounds," Encyclo. of Electrochemistry of the Elements, 1979, pp. 179-209, vol. XIII-4, NY, NY.
Beier et al., "Versatile Derivatisation of Solid Support Media for Convalent Bonding . . . " Nucleic Acids Research, 1999, pp. 1970-1977, vol. 27, No. 9.
Cahill and Nordhoff, "Protein Arrays & Their Role in Protemics" Adv. Biochem. Engin/Biotechnol., 2003, pp. 177-187, vol. 83.
Campbell et al., "Enzyme-Amplified Amperometric Sandwich Test for RNA and DNA" Anal. Chem., 2002, 158-162, 74(1) American Chemical Society.
Dill et al., "Antigen Detection Using Microelectrode Array Microchips" Analytica Chimica Acta, 2001, pp. 69-78, vol. 444.
Dill et al., "Immunoassays and Sequence-Specific DNA Detection on a Microchip . . . " J. Biochem. Biophys. Methods, 2004, 59 pp. 181-187, Elsevier B.V.
Drummond et al., "Electrochemical DNA Sensors" Nature Biotechnology Oct. 2003, 1192-1199, vol. 21, No. 10 Nature Publishing Group.
Egeland et al., "An Electrochemical Redox Couple Activitated by Microelectrodes for Confined Chemical Patterning of Surfaces" Analytical Chemistry (2002) vol. 74, pp. 1590-1596.
Fledler et al., "Diffusional Electrotitration: Generation of pH Gradients . . . " Analytical Chemistry, Mar. 1, 1995, pp. 820-828, vol. 67, No. 5.
Fodor et al., "Light-Directed, Spatially Addressable Parallel Chemical Synthesis" Science, Feb. 15, 1991, 767-773, vol. 251.
Gao et al., "In Situ Synthesis of Oligonucleotide Microarrays" Biopolymers Mar. 2004, pp. 579-596, vol. 73.
Ghindilis et al., "Immunosensors: Electrochemical Sensing and Other . . . " Biosensors & Bioelectronics 1998, pp. 113-131, vol. 13, No. 1, Elsevier Sciences S.A.
Greene et al., "Protective Groups in Organic Synthesis" Third Edition, Wiley-Interscience, 1999.
Guo, et al., "Direct Fluorescence Analysis of Genetic Polymorphisms by Hybridization with Oligonucleotide . . . " Nucl. Acids Res., 1994, pp. 5456-5465, vol. 22, No. 24.
Hacia "Resequencing and mutational analysis using oligonucleotide microarrays" Nature Genetics 21 Supp.: 42, (1999).
Hacia et al., "Applications of DNA Chips for Genomic Analysis" Mol. Psychiatry, Nov. 1998, pp. 483-492, vol. 3, No. 6.
Hammerich et al., "Organic Electrochemistry, an Introduction & Guide" ed. by Lund and Baizer, 3rd Edition, 1991 pp. 615-657 Marcel Dekker, Inc., NY.
Johnston, "Gene Chips: Array of Hope for Understanding Gene Regulation" Curr. Biology, Feb. 26, 1998, R171-R174, vol. 8.
Krotz et al., "Large-Scale Synthesis of Antisense Oligonucleotides Without Chlorinated Solvents" Organic Process Res & Dev, 2000, pp. 190-193, vol. 4.
Kurian et al., "DNA Chip Technology" J. Pathology, 1999, pp. 267-271, vol. 187.
Lane et al., "Electrochemistry of Chemisorbed Molecules . . . " J. Physical Chemistry, 1973, pp. 1411-1421, vol. 77, No. 11 (1$^{st}$ Page Only).
Leproust et al., "Characterization of Oligodeoxyribonucleotide Synthesis on Glass Plates" Nucl. Acids Res., 2001, pp. 2171-2180, vol. 29, No. 10 (Abstract Only).
Lipkowski, et al., "Molecular Adsorption at Metal Electrodes" Electrochimica Acta, 1994, pp. 1045-1056, vol. 39, No. 8/9.
Maskos and Southern, "Oligodeoxyribonucleotide Synthesis on Glass Plates", Nucl. Acids Res., 1992, pp. 1679-1684, vol. 20.
Moller et al.. "Anodic oxidation of cyclohexene: Dependence of the product distribution on the reaction variables" Electrochimica Acta, vol. 42, No. 13, Jan. 1, 1997, pp. 1971-1978.
Ono et al., "Nucleosides and Nucleotides. 121. Synthesis of Oligonucleotides . . . " Bioconjugate Chem. 1993, pp. 499-508, vol. 4.
Patolsky et al. "Highly Sensitive Amplified Electronic Detection of DNA . . . " Chem. Eur. J., 2003, pp. 1137-1145, vol. 9, No. 5 Wiley-VCH Weinheim.

(56) References Cited

OTHER PUBLICATIONS

Patolsky et al., "Enzyme-Linked Amplified Electrochemical Sensing . . . " Langmuir 1999, vol. 15, No. 1,1 pp. 3703-3706, Am. Chemical Society.
Paul et al., "Acid Binding and Detritylation During Oligonucleotide Synthesis" Nucleic Acids Research, 1996, 3048-3052, vol. 24, No. 15.
Pellois et al.,"Peptide Synthesis Based on t-Boc Chemistry & Solution Photogenerated Acids" J. Comb. Chem. 2000, pp. 355-360, vol. 2, No. 4.
Pillai, "Photoremovable Protecting Groups in Organic Chemistry" Synthesis 1980, pp. 1-26, vol. 39.
Ronlan, A. and Parker, V. D., "Anodic oxidation of phenolic compounds. Part II. Products and mechanisms of the anodic oxidation of hindered phenols" J. Chem. Soc. (C), 1971, pp. 3214-3218.
Rossier et al., "Enzyme Linked Immunsorbent Assay on a Microchip . . . " Lab on a Chip 2001, vol. 1, pp. 153-157, The Royal Society of Chemistry.
Septak, M. "Kinetic Studies on Depurination and Detritylation of CPG-bound Intermediates . . . " Nucleic Acids Research, 1996, pp. 3053-3058, vol. 24, No. 15.
Shchepinov et al., "Steric Factors Influencing Hybridisation of Nucleic Acids to Oligonucleotide Arrays" Nucl., Acids Res., 1997, pp. 115-1161, vol. 25, No. 6.
Shchepinov, M.S., "Oligonucleotide Dendrimers: From Poly-Labeled DNAc617 Probes to Stable Nano-Structures" Glen Report, Dec. 1999, vol. 12, No. 1.
Soriaga et al., "Determination of Orientation of Adsorbed Molecules . . . ", J. Am. Chem. Soc., 1982, pp. 3937-3945, vol. 104 ($1^{st}$ Page Only).
Stickney et al., "A Survey of Factors Influencing the Stablity of . . . " J. Electroanaly. Chem., 1981, pp. 73-88, vol. 125 (Abstract Only).
Wang, G. et al., "Synthesis of Oligonucleotides Containing . . . " Tetrahedron Letters, 1993, 6721-6724, vol. 34, No. 42, Great Britain.
Wang et al., "Dual Enzyme Electrochemical Coding for Detecting DNA Hybridization" Analyst 2002, 1279-1282, The Royal Society of Chemistry.
Wang, Joseph "Survey and Summary from DNA Biosensors . . . " Nucleic Acids Research 2000, pp. 3011-3016, vol. 28, No. 16 Oxford University Press.
Wilgenbus and Lichter, "DNA Chip Technology Ante Portas" J. Mol. Med., Nov. 1999, pp. 761-768, vol. 77.
Wu and Chen, J. Mater. Chem., 1997, 7(8), pp. 1409-1413.
Xie et al., Amperometric Detection of Nucleic Acid at Femtomolar Levels with a Nucleic Acid/Electrochemical Activator Bilayer on Gold Electrodes, 2004, vol. 76, pp. 1611-1617.
ISR, Application No. 05849631.6 PCT/US2005/041906, dated May 24, 2007, 4 pages.
Extended European Search Report, Application No. 05849631.6 PCT/US2005/041906, dated Sep. 23, 2010, 9 pages.
Rule 71(3) EPC European Communication, Application No. 05849631.6 PCT/US2005/041906, dated Jul. 23, 2018, 11 pages.
Communication from the examining division, Application No. 06739757.0 PCT/US2006/011150, dated Dec. 11, 2015, 29 pages.
Bakker E (2004) Electrochemical sensors. Anal Chem 76: 3285-3298.
Batchelor-McAuley, C.; Wildgoose, G. G.; Compton, R. G. The physicochemical aspects of DNA sensing using electrochemical methods. Biosens. Bioelectron. 2009, 24, 3183-3190.
Caillat, P.; David, D.; Belleville, M.; Clerc, F.; Massit, C.; Revol-Cavalier, F.; Peltie, P.; Livache, T.; Bidan, G.; Roget, A.; Crapez, E. Biochips on CMOS: An active matrix address array for DNA analysis. Sens. Actuat. B: Chem. 1999, 61, 154-162.
Chen, C.; Nagy, G.; Walker, A. V.; Maurer, K.; McShea, A.; Moeller, K. D. Building addressable libraries: The use of a mass spectrometry cleavable linker for monitoring reactions on a microelectrode array. J. Am. Chem. Soc. 2006, 128, 16020-16021.
Cosnier S (1999) Biomolecule immobilization on electrode surfaces by entrapment or attachment to electrochemically polymerized films. A review. Biosensors & Bioelectronics 14: 443-456.
Cuzin, M. DNA chips: A new tool for genetic analysis and diagnostics. Transfus. Clin. Biol. 2001, 8, 291-296.
Daniels, J. S.; Pourmand, N. Label-free impedance biosensors: opportunities and challenges. Electroanalysis 2007, 19, 1239-1257.
De Giglio, E.; Sabbatini, L.; Zambonin, P. G. Development and analytical characterization of cysteine-grafted polypyrrole films electrosynthesized on Pt- and Ti-substrates as precursors of bioactive interfaces. J. Biomater. Sci. Polym. Ed. 1999, 10, 845-858.
Diaz-Gonzales M, Gonzalez-Garcia M B, Costa-Garcia A (2005) Recent advances in electrochemical enzyme immunoassays. Electroanalysis 17: 1901-1918.
Dill K, Montgomery D D, Ghindilis A L, Schwarzkopf K R, Ragsdale S R, et al. (2004) Immunoassays based on electrochemical detection using microelectrode arrays. Biosensors & Bioelectronics 20: 736-742.
Galandoava, J.; Labuda, J. Polymer interfaces used in electrochemical DNA-based biosensors. Chem. Pap. 2009, 63, 1-14.
Gambhir, A.; Gerard, M.; Jain, S. K.; Malhotra, B. D. Characterization of DNA immobilized on electrochemically prepared conducting polypyrrole-polyvinyl sulfonate films. Appl. Biochem. Biotechnol. 2001, 96, 303-309.
Ghindilis, A. L.; Smith, M. W.; Schwarzkopf, K. R.; Roth, K. M.; Peyvan, K.; Munro, S. B.; Lodes, M. J.; Stover, A. G.; Bernards, K.; Dill, K.; McShea, A. CombiMatrix oligonucleotide arrays: genotyping and gene expression assays employing electrochemical detection. Biosens. Bioelectron. 2007, 22, 1853-1860.
Labib M, Hedstrom M, Amin M, Mattiasson B (2009) A capacitive biosensor for detection of staphylococcal enterotoxin B. Anal Bioanal Chem 393: 1539-1544.
Livache, T.; Maillart, E; Lassalle, N.; Mailley, P.; Corso, B.; Guedon, P.; Roget, A.; Levy, Y. Polypyrrole based DNA hybridization assays: study of label free detection processes versus fluorescence on microchips. J. Pharm. Biomed. Anal 2003, 32, 687-696.
Livache, T.; Fouque, B.; Roget, A.; Marchand, J.; Bidan, G.; Teoule, R.; Mathis, G. Polypyrrole DNA chip on a silicon device: example of hepatitis C virus genotyping. Anal. Biochem. 1998, 255, 188-194.
Livache, T.; Roget, A.; Dejean, E.; Barthet, C.; Bidan, G.; Teoule, R. Preparation of a DNA matrix via an electrochemically directed copolymerization of pyrrole and oligonucleotides hearing a pyrrole group. Nucleic. Acid. Res. 1994, 22, 2915-2921.
Minehan, D. S.; Marx, K. A.; Tripathy, S. K. Kinetics of DNA binding to electrically conducting polypyrrole films. Macromolecules 1994, 27, 777-783.
Minchan, D. S.; Marx, K. A.; Tripathy, S. K. DNA binding to electropolymerized polypyrrole: The dependence on film characteristics. J. Macromol. Sci. Part A: Pure Appl. Chem. 2001, 38, 1245-1258.
Palmisano F, Zambonin P G, Centoze D (2000) Amperometric biosensors based on electrosynthesised polymeric films. Fresenius Journal of Analytical Chemistry 366: 586-601.
Park, J. Y.; Park, S. M. DNA Hybridization sensors based on electrochemical impedance spectroscopy as a detection tool. Sensors 2009, 9, 9513-9532.
Peng, H.; Zhang, L.; Soeller, C.; Travas-Sejdic, J. Conducting polymers for electrochemical DNA sensing. Biomaterials 2009, 30, 2132-2148.
Rahman M A, Kumar P, Park D-S, Shim Y-B (2008) Electrochemical sensors based on organic conjugated polymers. Sensors 8: 118-141.
Ramanaviciene A, Ramanavicius A (2002) Application of polypyrrole for the creation of immunosensors. Critical Reviews in Analytical Chemistry 32: 245-252.
Ramanavicius A, Ramanaviciene A, Malinauskas A (2006) Electrochemical sensors based on conducting polymer-pyrrole. Electrochimica Acta 51: 6027-6037.
Ramanavicius, A.; Kurilcik, N.; Jursenas, S.; Finkelsteinas, A.; Ramanaviciene, A. Conducting polymer based fluorescence quenching as a new approach to increase the selectivity of immunosensors. Biosen. Bioelectron. 2007, 23, 499-505.

(56) References Cited

OTHER PUBLICATIONS

Roth, K. M.; Peyvan, K.; Schwarzkopf, K. R.; Ghindilis, A. Electrochemical detection of short dna oligomer hybridization using the combimatrix electrasense microarray reader. Electroanalysis 2006, 18, 1982-1988.

Sadik O A, Ngundi M, Wanekaya A (2003) Chemical biological sensors based on advances in conducting electroactive polymers. Microchimica Acta 143: 187-194.

Sadki S, Schottland P, Brodie N, Sabouraud G (2000) The mechanisms of pyrrole electropolymerization. Chemical Society Review 29: 283-293.

Song, X.; Wang, H. L.; Shi, J.; Park, J. W.; Swanson, B. I. Conjugated polymers as efficient fluorescence quenchers and their applications for bioassays. Chem. Mater. 2002, 14, 2342-2347.

Stuart, M.; Maurer, K.; Moeller, K. D. Moving known libraries to an addressable array: A site-selective hetero-Michael reaction. Bioconjug. Chem. 2008, 19, 1514-1517.

Tesfu, E.; Roth, K.; Maurer, K.; Moeller, K. D. Building addressable libraries: Site selective coumarin synthesis and the "real-time" signaling of antibody-coumarin binding. Org. Lett. 2006, 8, 709-712.

Trojanowicz M (2003) Application of conducting polymers in chemical analysis. Microchimica Acta 143: 75-91.

Vestergaard Md, Kerman K, Tamiya E (2007) An overview of label-free electrochemical protein sensors. Sensors 7: 3442-3458.

Vidal J-C, Garcia-Ruiz E, Castillo J-R (2003) Recent Advances in electropolymerized conducting polymers in amperometric biosensors. Microchimica Acta 143.

Zhang S, Wright G, Yang Y (2000) Materials and techniques for electrochemical biosensor design and construction. Biosensors & Bioelectronics 15: 273-282.

Zhou, Y.; Yu, B.; Guiseppi-Elie, A.; Sergeyev, V.; Levon, K. Potentiometric monitoring DNA hybridization. Biosens. Bioelectron. 2009, 24, 3275-3280.

* cited by examiner

Agarose

Sucrose

Diethylene Glycol

Ethylene Glycol

N-Hydroxysuccinimide

Triethylene Glycol

Melizitose
1202

Palatinose

Polyethylene glycol
Molecular weight 8000

Melibiose 2202  2204

Adsorbed Porous Reaction Layer:
1-(3-hydroxypropyl) pyrrole

DNA hybridization having fluorescent tag

Adsorbed Porous Reaction Layer:
1-hexylpyrrole

DNA hybridization having fluorescent tag

Adsorbed Porous Reaction Layer:
sucrose, fructose, and glucose blend 9-mer DNA hybridization having fluorescent tag
35 mers on the array Adsorbed Porous Reaction Layer:
sucrose, fructose, and glucose blend 9-mer DNA hybridization having fluorescent tag
40 mers on the array Adsorbed Porous Reaction Layer:
sucrose, fructose, and glucose blend 9-mer DNA hybridization having fluorescent tag
45 mers on the array

Adsorbed Porous Reaction Layer:
sucrose, fructose, and glucose blend 9-mer DNA hybridization having fluorescent tag
50 mers on the array Adsorbed Porous Reaction Layer:
sucrose, fructose, and glucose blend 9-mer DNA hybridization having fluorescent tag
55 mers on the array Adsorbed Porous Reaction Layer:
sucrose, fructose, and glucose blend 9-mer DNA hybridization having fluorescent tag
60 mers on the array Adsorbed Porous Reaction Layer:
sucrose, fructose, and glucose blend 9-mer DNA hybridization having fluorescent tag
65 mers on the array Adsorbed Porous Reaction Layer:
sucrose, fructose, and glucose blend 9-mer DNA hybridization having fluorescent tag
70 mers on the array

ELECTRODE ARRAY DEVICE HAVING AN ADSORBED POROUS REACTION LAYER

PRIORITY CLAIM

The present application is a continuation application of U.S. patent application Ser. No. 14/082,971 entitled "ELECTRODE ARRAY DEVICE HAVING AN ADSORBED POROUS REACTION LAYER" filed Nov. 18, 2013 which is a continuation of U.S. patent application Ser. No. 13/571, 306 entitled "ELECTRODE ARRAY DEVICE HAVING AN ADSORBED POROUS REACTION LAYER" filed Aug. 9, 2012, which is a continuation of U.S. patent application Ser. No. 11/863,097 entitled "ELECTRODE ARRAY DEVICE HAVING AN ADSORBED POROUS REACTION LAYER" filed Sep. 27, 2007, abandoned Jun. 11, 2014, which is a continuation of U.S. patent application Ser. No. 10/992,252 entitled "ELECTRODE ARRAY DEVICE HAVING AN ADSORBED POROUS REACTION LAYER" inventors Maurer et al., filed Nov. 18, 2004, abandoned Feb. 1, 2011.

REFERENCE TO A "SEQUENCE LISTING," A TABLE, OR A COMPUTER PROGRAM LISTING APPENDIX SUBMITTED AS AN ASCII TEXT FILE

The Sequence Listing written in file CUST-01113US3_ST25.TXT, created Nov. 22, 2017, 1011 bytes, machine format IBM-PC, MS-Windows operating system, is hereby incorporated by reference.

TECHNICAL FIELD OF THE INVENTION

The present invention provides an electrode microarray having an adsorbed porous reaction layer for improved synthesis quality. Specifically, the present invention provides an electrode microarray having a plurality of electrodes, having an adsorbed porous reaction layer and a process for treating the microarray surface to significantly enhance nucleic acid synthesis quality and increase assay sensitivity. More specifically, the present invention provides a computer controlled electrode microarray having a plurality of platinum-containing electrodes, having an adsorbed porous reaction layer and a process of treating the microarray surface to significantly enhance the quality of synthesis of oligonucleotides, peptides, and other chemical species while increasing binding assay sensitivity.

BACKGROUND OF THE INVENTION

Microarrays and particularly nucleic acid microarrays have become important analytical research tools in pharmacological and biochemical research and discovery. Microarrays are miniaturized arrays of points or locations arranged in a column and row format. Molecules, including biomolecules, are attached or synthesized in situ at specific attachment points, which are usually in a column and row format although other formats may be used. An advantage of microarrays is that they provide the ability to conduct hundreds, if not thousands, of experiments in parallel. Such parallelism, as compared to sequential experimentation, can be used to increase the efficiency of exploring relationships between molecular structure and biological function, where slight variations in chemical structure can have profound biochemical effects. Microarrays are available in different formats and have different surface chemistry characteristics that lead to different approaches for attaching or synthesizing molecules. Differences in microarray surface chemistry lead to differences in preparation methods for providing a surface that is receptive to attachment of a presynthesized chemical species or for synthesizing a chemical species in situ. As the name suggests, the attachment points on microarrays are of a micrometer scale, which is generally 1-100 µm.

Research using microarrays has focused mainly on deoxyribonucleic acid (DNA) and ribonucleic acid (RNA) related areas, which includes genomics, cellular gene expression, single nucleotide polymorphisms (SNP), genomic DNA detection and validation, functional genomics, and proteomics (Wilgenbus and Lichter, J. Mol. Med. 77:761, 1999; Ashfari et al., Cancer Res. 59:4759, 1999; Kurian et al., J. Pathol. 187:267, 1999; Hacia, Nature Genetics 21 suppl.:42, 1999; Hacia et al., Mol. Psychiatry 3:483, 1998; and Johnson, Curr. Biol. 26:R171, 1998.) In addition to microarrays for DNA/RNA research, microarrays can be used for research related to peptides (two or more linked natural or synthetic amino acids), small molecules (such as pharmaceutical compounds), oligomers, and polymers.

Considering microarrays for DNA related research, there are numerous methods for preparing a microarray of DNA related molecules. DNA related molecules include native or cloned DNA and synthetic DNA. Synthetic relatively short single-stranded DNA or RNA strands are commonly referred to as oligonucleotides (oligos), which is synonymous with oligodeoxyribonucleotide. Microarray preparation methods include the following: (1) spotting a solution on a prepared flat surface using spotting robots; (2) in situ synthesis by printing reagents via ink jet or other printing technology and using regular phosphoramidite chemistry; (3) in situ parallel synthesis using electrochemically generated acid for deprotection and using regular phosphoramidite chemistry; (4) maskless photo-generated acid (PGA) controlled in situ synthesis and using regular phosphoramidite chemistry; (5) mask-directed in situ parallel synthesis using photo-cleavage of photolabile protecting groups (PLPG); (6) maskless in situ parallel synthesis using PLPG and digital photolithography; and (7) electric field attraction/repulsion for depositing oligos.

Photolithographic techniques for in situ olio synthesis are disclosed in Fodor et al. U.S. Pat. No. 5,445,934 and the additional patents claiming priority thereto. Electric field attraction/repulsion microarrays are disclosed in Hollis et al. U.S. Pat. No. 5,653,939 and Heller et al. U.S. Pat. No. 5,929,208. An electrode microarray for in situ oligo synthesis using electrochemical deblocking is disclosed in Montgomery U.S. Pat. Nos. 6,093,302; 6,280,595, and 6,444,111 (Montgomery I, II, and III respectively), which are incorporated by reference herein. Another and materially different electrode array (not a microarray) for in situ oligo synthesis on surfaces separate and apart from electrodes using electrochemical deblocking is disclosed in Southern U.S. Pat. No. 5,667,667. A review of oligo microarray synthesis is provided by Gao et al., Biopolymers 2004, 73, 579.

Microarrays other than DNA microarrays have been disclosed. For example, the synthetic preparation of a peptide array was originally reported in 1991 using photolithography masking techniques. This method was extended in year 2000 to include an addressable masking technique using photogenerated acids and/or in combination with photosensitizers for deblocking. Reviews of peptide microarray synthesis using photolabile deblocking are provided by Pellois et al., J. Comb. Chem. 2000, 2:355 and Fodor et al., Science, 1991, 251:767. Recent work using peptide arrays has utilized arrays produced by spotting pre-synthesized peptides or isolated proteins. A review of protein arrays is provided by Cahill and Nordhoff, Adv. Biochem. Engin/Biotechnol. 2003, 83:177.

Preparation methods for providing a microarray surface that is receptive to attachment of a presynthesized chemical species or for synthesizing a chemical species in situ must provide a surface that is capable of bonding a chemical species as well as being capable of providing the chemical functionality necessary to conduct pharmacological and biochemical research and discovery. One approach is to treat a surface to provide reactive groups capable of covalently bonding to chemical species of interest. In such an approach, the reactive group is typically present as a result of a surface treatment or coating of the surface. For DNA related species, the reactive group required is a hydroxyl, unless there has been a chemical modification. For peptides, the reactive group required is an amine, unless there has been a chemical modification.

Glass is a commonly used solid substrate for microarrays and must be treated before use. A common glass treatment uses silanization chemistry to introduce a stable and uniform surface having reactive groups for attachment or in situ synthesis of oligos or other chemical species (Guo et al., 1994, Nucl. Acids Res., 22:5456-5465; LeProust et al., 2001, Nucl. Acids Res., 29:2171-2180; Maskos and Southern, 1992, Nucl. Acids Res., 20:1679-1684; Skrzypcznski et al., U.S. Patent Appl. Pub. 2004/0073017, and Southern et al. U.S. Pat. No. 6,576,426.). Glass beads for bulk synthesis must also undergo silanization (Maskos and Southern). Gold surfaces are treated with thiol linker chemistry (Kelley et al. U.S. Patent Pub. 2002/0172963). Similarly, polymeric microarray supports, such as polypropylene, must be treated by oxidation followed by introduction of reactive groups such as terminal amines (Schepinov et al., 1997, Nucl. Acids Res., 25:1155-1161). Additionally, polystyrene beads are surface treated with polyethylene glycols having reactive terminal groups for bulk synthesis of peptides (Merck, Inc. Novabiochem Div. and Aldrich et al., U.S. Patent Appl. Pub. 2003/0134989). Finally, the surface of electrodes on an electrode microarray must be treated with a surface coating to provide reactive groups (Montgomery I, II, and III). For oligo synthesis, such a surface coating must be able to withstand the rigors of repeated exposure to synthesis solutions and to electrochemical deblocking solutions.

The electrochemical synthesis microarray disclosed in Montgomery I, II, and III is based upon a semiconductor chip having a plurality of microelectrodes in a column and row format. This chip design uses Complimentary Metal Oxide Semiconductor (CMOS) technology to create high-density arrays of microelectrodes with parallel addressing for selecting and controlling individual microelectrodes within the array. The electrodes are "turned on" by applying a voltage, which generates electrochemical reagents (particularly acidic protons) that alter the pH in a small, defined "virtual flask" region or volume adjacent to the electrode. In order to provide reactive groups at each electrode, the microarray is coated with a porous matrix material. Biomolecules can be synthesized at any of the electrodes, and such synthesis occurs within the porous matrix material. For the deblocking step, the pH is electrochemically decreased by applying a voltage to an electrode. The pH decreases only in the vicinity of the electrode because the ability of the acidic reagent to travel away from an electrode is limited by natural diffusion and by a buffer in solution.

In general, when a surface is treated, there is a reactive group at the terminal end of a linker that is attached to the surface during treatment. A linker is a molecule that connects a species of interest to a solid surface. For example, a linker for glass has a reactive group at one end and a silane-coupling group at the other for bonding to glass. Linkers can be of various lengths, depending on the particular chemical species used to form the linker. In addition to linkers, spacers can be attached to a linker in order to provide more distance between a solid surface and an attached chemical species. Spacers can be of a different chemistry than linkers. Linkers and spacers for attachment of oligos are disclosed for glass supports (Guo et al., LeProus et. al., Maskos et al., Skrzypcznski and Southern) for aminated polypropylene supports (Schepinov et al.) and for polystyrene beads (Merck, Inc. Novabiochem Div. and Aldrich et al.).

For a surface coating on an electrode microarray, the surface coating itself provides reactive groups that are naturally present within the coating. Montgomery I, II, and III disclose a surface coating comprising controlled porosity glass (CPG); generic polymers, such as, teflons, nylons, polycarbonates, polystyrenes, polyacylates, polycyanoacrylates, polyvinyl alcohols, polyamides, polyimides, polysiloxanes, polysilicones, polynitriles, polyelectrolytes, hydrogels, expoxy polymers, melamines, urethanes and copolymers and mixtures of these and other polymers; biologically derived polymers, polyhyaluric acids, celluloses, and chitons; ceramics, such as, alumina, metal oxides, clays, and zeolites; surfactants; thiols; self-assembled monolayers; porous carbon; and fullerine materials. Montgomery I, II, and III further discloses that the surface coating can be attached to the electrodes by spin coating, dip coating or manual application, or any other acceptable form of coating. Montgomery I, II, and III further discloses linker molecules attached to controlled porosity glass via silicon-carbon bonds and that the linker molecules include aryl, acetylene, ethylene glycol oligomers containing from 2 to 10 monomer units, diamines, diacids, amino acids, and combinations thereof. In each instance, Montgomery discloses coating the entire surface of a microarray device and not just electrode surfaces.

Guo et al. discloses the use of a 23-atom linker for covalently attaching a DNA sequence to glass. The linker is made by reaction of the glass surface with aminopropyltrimethoxysilane to provide an amino-derivatized surface followed by coupling of the amino groups with excess p-phenylenediisothiocyanate to convert the amino groups to amino-reactive phenylisothiocyanate groups. An oligonucleotide is then covalently attached to the amino-reactive group by coupling to the amino-reactive group a 5' amino-modified oligonucleotide attached to the 5' end of a sequence of an oligonucleotide. The resulting structure is a solid surface having a linker attached thereto and the linker having an oligonucleotide attached from the 5' side to the linker. Guo et al. further disclose a spacer comprising up to a 15-deoxythymidylate chain that is between the oligonucleotide and the linker. The spacer has a 5' amino-modified oligonucleotide to allow attachment to the amino-reactive group. The spacer is attached onto the 5' end of an oligonucleotide as a part of the oligonucleotide, and then the spacer-oligonucleotide is attached to the linker. As viewed from the glass surface, the final structure provides a glass surface having a linker having attached thereto a 5' to 3' prime spacer-oligonucleotide, where the spacer-oligonucleotide has been synthesized elsewhere and then attached to the linker. The 15-deoxythymidylate chain was found to have the highest hybridization signal compared to chains having fewer deoxythymidylate units.

Maskos and Southern disclose silane-coupled linkers for glass. The linkers are different length and are terminated with a hydroxyl for oligonucleotide synthesis on the glass. The linkers are bound to glass through a glycidoxypropyl silane linkage and have a hexaethylene glycol middle section of different lengths. The linkers range from 8 to 26 atoms in length and do not have any charge. Shchepinov et al. discloses spacer molecules for coupling oligonucleotides to aminated polypropylene. The spacer molecules are built using phosphoramidite chemistry and synthesized monomers having diols as a part of the monomeric unit. Both 3' and 5' oligonucleotides were built upon the spacers.

LeProust et al. discloses silane linkers terminating in a hydroxyl, amide, or amine group. The linkers were used to synthesize oligonucleotides (deoxythymidylate units) on glass slides to determine the efficiency/fidelity of synthesis. The linkers were nonionic. Southern et al. discloses nonionic linkers/spacers for use on control pore glass (CPG) for oligonucleotide synthesis. The linkers were attached to CPG through a terminal amine attached to a group on the CPG via silanization. Skrzypcznski et al. discloses nonionic linkers/spacer coupled to glass or sol-gel glass coating through silane linkage. The linker/spacer is proposed to have a hydrophobic part next to the glass attached to a hydrophilic part where a DNA probe is attached.

Linkers and spacers are sometimes used for peptide synthesis off of a microarray. Specifically, microscopic polystyrene (PS) beads are used as a solid support (Aldrich et al.). The beads have a polyethylene glycol (PEG) spacer attached to the beads and a linking group attached to the PEG, where the linking group has a reactive group for synthesis of peptides. After synthesis, the peptides are cleaved from the linking group and recovered. Numerous PS-PEG resins for synthesis are available commercially from Merck Company, Novabiochem Division, as well as other sources.

Oligo microarrays made with the electrochemical process as disclosed in Montgomery I, II, and III have had problems with oligo quality, where quality is judged by missing deoxynucleotide bases in sequences resulting from inefficient deblocking. In addition, quality problems can arise from delamination of the coating over the electrodes. Control pore glass coatings and polysaccharide agarose coatings are both prone to delamination quality problems. Such quality problems have caused the resulting oligo microarray to be less useful for sensitivity of gene expression assays (i.e., finding low abundance mRNA species) and for single nucleotide polymorphisms (SNP) assays, wherein single base changes need to be detected. Peptide synthesis on electrode microarrays has also been problematic. Similar quality problems have been found for glass microarrays, where research has found inefficient reactions of the various reagents with functional groups close to glass plate surfaces (LeProust et al.).

Considering (1) the above discussion of electrode microarray quality problems for oligonucleotides, peptides, and other chemical species, and (2) the need for a surface having reactive groups on electrode microarrays, there is a need in the art to be able to improve in situ electrochemical synthesis quality to provide microarrays having higher quality. The present invention addresses these needs. Additionally, for electrode microarrays, there is a need for a modified surface coating incorporating a linker and spacer to improve synthesis quality and prevent fluorescence quenching.

SUMMARY OF THE INVENTION

The present invention provides an electrode microarray having an adsorbed porous reaction layer for improved synthesis quality. The microarray comprises a plurality of electrodes on a substrate, wherein the electrodes are electronically connected to a computer control system. In addition, the microarray has an adsorbed porous reaction layer on the plurality of electrodes, wherein the adsorbed porous reaction layer comprises a chemical species having at least one hydroxyl group. The chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, and formula VII, and combinations thereof. Formula I is

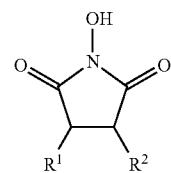

formula II is

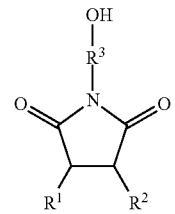

formula III is $HOR^4(OR^5)_mR^7$, formula IV is

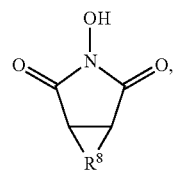

formula V is

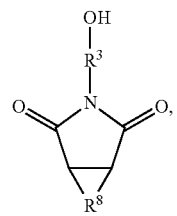

formula VI is

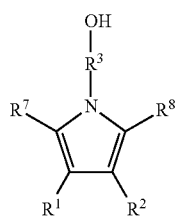

and formula VII is

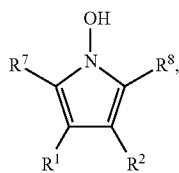

The subscript m is an integer from ranging from 1 to about 4. The polyethylene glycol has a molecular weight of approximately 1,000 to 20,000 daltons.

$R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester.

$R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group. $R^4$ and $R^5$ are independently selected from the group consisting of methylene, ethylene, propylene, butylene, pentylene, and hexylene. $R^6$ forms a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group. $R^7$ is selected from the group consisting of amino and hydroxyl.

The monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose. The disaccharide is selected from the group consisting of amylose, cellobiose, lactose, maltose, melibiose, palatinose, sucrose, and trehalose. The triaccharide is selected from the group consisting of raffinose and melezitose.

The polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri (ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethylene glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra (ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta (ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa (ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa (ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

The present invention further provides a process for forming an electrode array having an adsorbed porous reaction layer for improved synthesis quality. The process comprises (1) providing a plurality of clean electrodes on a substrate, wherein the electrodes are electronically connected to a computer control system; and (2) adsorbing a porous reaction layer on the plurality of electrodes, wherein the porous reaction layer comprises a chemical species having at least one hydroxyl group, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, and combinations thereof. The saccharides, PEG's, Formulae I-V are as provided herein.

The present invention further provides a process for adsorbing a porous reaction layer onto a plurality of electrodes, comprising (1) contacting a treatment solution to the microarray for from about 1 minute to about 2 weeks, wherein the treatment solution comprises the chemical species that adsorbs onto each electrode of the plurality of electrodes and a solvent capable of dissolving the chemical species; and (2) washing off the treatment solution while leaving a layer of chemical species adsorbed onto each electrode of the plurality of electrodes.

The present invention further provides a process for cleaning an electrode microarray comprising (1) etching the electrode microarray surface using a plasma cleaning method; and (2) cleaning the electrode microarray using a chemical cleaning method. Preferably, the plasma cleaning method comprises exposing the electrode microarray to an argon plasma sputter etch process for approximately two to six minutes, where the plasma power is 200 W, the self bias voltage is 600-650V, the plasma pressure is 8 mTorr, and a 200 mm diameter electrode is used in a parallel plate plasma chamber. Preferably, the plasma cleaning method comprises exposing the electrode microarray to a sulfur hexafluoride plasma for approximately 30 to 60 minutes, where the plasma power is 300 watts, the plasma pressure is approximately 250 to 350 mTorr, and the gas flow is 124 cubic centimeters per minute in an isoptropic plasma chamber. Preferably, the plasma cleaning method comprises etching the electrode microarray in a commercial Reactive Ion Etch Plasma system (such as Oxford Plasmalab 800Plus RIE system with a 460 mm diameter electrode) using (1) an argon plasma for approximately 2 to 4 minutes and a RF plasma power of approximately 600 watts, where the pressure is approximately eight millitorr and the Ar gas flow is approximately 30 sccm; (2) an oxygen plasma for approximately 5 to 7 minutes using a power of approximately 500 watts, where the pressure is approximately 50 millitorr and the oxygen gas flow of approximately 50 sccm; or (3) an argon plasma for approximately 8 to 12 minutes using a power of approximately 600 watts, where the pressure is approximately eight millitorr and the Ar gas flow is approximately 30 sccm.

Preferably, chemical cleaning method comprises an electrochemical cleaning method comprising (1) contacting a sulfuric acid solution with the electrodes of the electrode microarray, wherein the sulfuric acid solution has a concentration of approximately 0.01 to 5 molar and the electrode microarray is electronically attached to a control system; (2) pulsing a current for approximately 0.01 to 60 seconds to a first group of electrodes while a second group of electrodes is grounded; (3) pulsing a current for approximately 0.01 to 60 seconds to the second group of electrodes while the first group of electrodes is grounded; and (4) alternating between pulsing a current for approximately 0.01 to 60 seconds to the first group of electrodes while the second group of electrodes is grounded and pulsing a current for approximately 0.01 to 60 seconds to the second group of electrodes while the first group of electrodes remains grounded for a cumulative time of approximately 1 to 60 minutes. Preferably, the chemical cleaning method comprises a hydrogen peroxide cleaning method comprising contacting a hydrogen peroxide solution with the electrodes of the electrode microarray, wherein the hydrogen peroxide solution has a concentration of approximately 0.5 to 10% (by volume), contacting time is approximately 1 minute to 24 hours, and the hydrogen peroxide solution temperature is approximately 20 to 95 degrees Celsius.

BRIEF DESCRIPTION OF THE FIGURES

In FIG. 1A, an adsorbed porous reaction layer is shown as being adsorbed across the entire microarray surface. In FIG. 1B, an adsorbed porous reaction layer is shown as being adsorbed predominately on only electrode surfaces. The reaction layer is shown having hydroxyl moieties as reactive groups.

FIG. 20A-20E are schematics of a cross-section of four electrodes of a microarray of electrodes showing the synthesis of peptides on the electrodes followed by exposure to anti-beta endorphin antibody (clone 3-E7, mouse) and Cy5 labeled donkey anti-mouse antibody. Two electrodes have an ionic linking group, and two electrodes are missing an ionic linking group. Sequence listing: FIGS. 20B-30E, Elements 2016+2018 (TTTTTTTTTTTTTTT) (SEQ ID NO:3); FIGS. 20D-20E, Elements 2024 (Tyr Gly Gly Phe Leu) (SEQ ID NO:2).

FIG. 21 is a schematic of a cross-section of two electrodes of a microarray of electrodes showing the quenching of fluorescently labeled reagent by the platinum electrode when an ionic linker is not used. Sequence listing: Element 2116 (TTTTTTTTTTTTTTT) (SEQ ID NO:3); Elements 2124 (Tyr Gly Gly Phe Leu) (SEQ ID NO:2).

FIG. 22 is a magnified and contrast-enhanced photograph of the top view of a section of an electrode microarray showing that the fluorescence of Cy5 labeled donkey anti-mouse antibody is visible when an ionic linker is used to connect the peptide to the platinum electrode overlayer.

FIG. 23 is schematic of a cross-section of two electrodes of a microarray of electrodes. One electrode shows that the use of a non-ionic linker allows quenching of the Cy5 labeled donkey anti-mouse antibody because the non-ionic linker is poorly solvated. The other electrode shows that the use of an ionic linker prevents quenching of the Cy5 labeled donkey anti-mouse antibody because the ionic linker is well solvated and thus keeps the labeled antibody away from the platinum electrode. Sequence listing: Element 2316 (TTTTTTTTTTTTTTT) (SEQ ID NO:3); Elements 2324 (Tyr Gly Gly Phe Leu) (SEQ ID NO:2).

FIG. 24 is a magnified photograph of the top view of a section of an electrode microarray showing the decrease in fluorescence quenching as the length of the linker/spacer is increased from 0 to 15 deoxythymidylate units. The linker/spacer was synthesized in situ. The fluorescence is from Texas Red labeled streptavidin bound to a biotin that is covalently attached to the end of the linker/spacer.

FIG. 25 is a photograph of a magnified portion of a top view of a microarray having 1-(3-hydroxylpropyl) pyrrole as a reaction layer. The lighter spots are fluorescence of fluorescently labeled nucleotides that were hybridized with the array after in situ synthesis of DNA oligos.

FIG. 26 is a photograph of a magnified portion of a top view of a microarray having 1-hexylpyrrole as a reaction layer. The lighter spots are fluorescence of fluorescently labeled nucleotides that were hybridized with the array after in situ synthesis of DNA oligos.

FIG. 27 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 35 to 70 mers.

FIG. 28 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 35 mers.

FIG. 29 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have an average length of 40 mers.

FIG. 30 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 45 mers.

DETAILED DESCRIPTION OF THE INVENTION

Figure 1A:
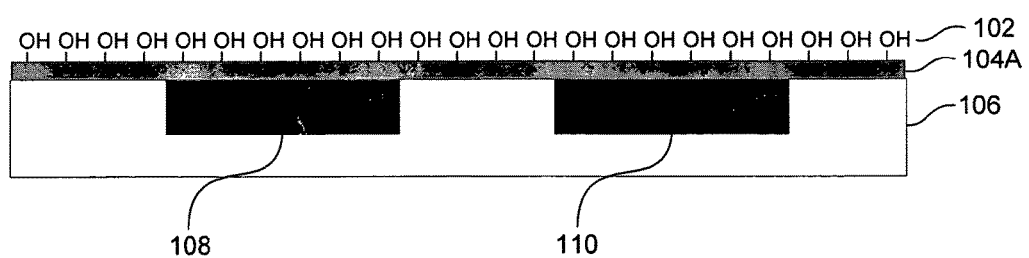
FIGS. 1A and 1B are schematics of a cross section of two electrodes of a microarray of electrodes.

For the most part, nomenclature for chemical groups as used herein follows the recommendations of "The International Union for Pure and Applied Chemistry", Principles of Chemical Nomenclature: a Guide to IUPAC Recommendations, Leigh, G. J.; Favre, H. A. and Metanomski, W. V., Blackwell Science, 1998, the disclosure of which is incorporated by reference herein. Formation of substituted structures is limited by atom valence requirements.

"Oligomer" means a molecule of intermediate relative molecular mass, the structure of which essentially comprises a small plurality of units derived, actually or conceptually, from molecules of lower relative molecular mass. A molecule is regarded as having an intermediate relative molecular mass if it has properties which do vary significantly with the removal of one or a few of the units. If a part or the whole of the molecule has an intermediate relative molecular mass and essentially comprises a small plurality of units derived, actually or conceptually, from molecules of lower relative molecular mass, it may be described as oligomeric, or by oligomer used adjectivally. Oligomers are typically comprised of a monomer.

The term "co-oligomer" means an oligomer derived from more than one species of monomer. The term oligomer includes co-oligomers. As examples of oligomers, a single stranded DNA molecule consisting of deoxyadenylate (A), deoxyguanylate (G), deoxycytidylate (C), and deoxythymidylate (T) units in the following sequence, AGCTGCTATA (SEQ ID NO:1) is a co-oligomer, and a single stranded DNA molecule consisting of 10-T units is an oligomer; however, both are referred to as oligomers.

The term "monomer" means a molecule that can undergo polymerization thereby contributing constitutional units to the essential structure of a macromolecule such as an oligomer, co-oligomer, polymer, or co-polymer. Examples of monomers include A, C, G, T, adenylate, guanylate, cytidylate, uridylate, amino acids, vinyl chloride, and other vinyls.

The term "polymer" means a substance composed of macromolecules, which is a molecule of high relative molecular mass, the structure of which essentially comprises the multiple repetition of units derived, actually or conceptually, from molecules of low relative molecular mass. In many cases, especially for synthetic polymers, a molecule can be regarded as having a high relative molecular mass if the addition or removal of one or a few of the units has a negligible effect on the molecular properties. This statement fails in the case of certain macromolecules for which the properties may be critically dependent on fine details of the molecular structure. If a part or the whole of the molecule has a high relative molecular mass and essentially comprises the multiple repetition of units derived, actually or conceptually, from molecules of low relative molecular mass, it may be described as either macromolecular or polymeric, or by polymer used adjectivally.

The term "copolymer" means a polymer derived from more than one species of monomer. Copolymers that are obtained by copolymerization of two monomer species are sometimes termed bipolymers, those obtained from three monomers terpolymers, those obtained from four monomers quaterpolymers, etc. The term polymer includes co-polymers.

The term "polyethylene glycol" (PEG) means an organic chemical having a chain consisting of the common repeating ethylene glycol unit [—$CH_2$—$CH_2$—O—]$_n$. PEG's are typically long chain organic polymers that are flexible, hydrophilic, enzymatically stable, and biologically inert, but they do not have an ionic charge in water. In general, PEG can be divided into two categories. First, there is polymeric PEG having a molecular weight ranging from 1000 to greater than 20,000. Second, there are PEG-like chains having a molecular weight that is less than 1000. Polymeric PEG has been used in bioconjugates, and numerous reviews have described the attachment of this linker moiety to various molecules. PEG has been used as a linker, where the short PEG-like linkers can be classified into two types, the homo-[X—($CH_2$—$CH_2$—O)$_n$]—X and heterobifunctional [X—($CH_2$—$CH_2$—O)$_n$]—Y spacers.

The term "PEG derivative" means an ethylene glycol derivative having the common repeating unit of PEG. Examples of PEG derivatives include, but are not limited to, diethylene glycol (DEG), tetraethylene glycol (TEG), polyethylene glycol having primary amino groups, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri (ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra (ethylene glycol) mono methyl ether, tetra(ethylene glycol) mono tosyl mono allyl ether, tetra(ethylene glycol) mono tosylate, tetra(ethylene glycol) mono benzyl ether, tetra (ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa (ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa (ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra(ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

The term "polyethylene glycol having primary amino groups" refers to polyethylene glycol having substituted primary amino groups in place of the hydroxyl groups. Substitution can be up to 98% in commercial products ranging in molecular weight from 5,000 to 20,000 Da.

The term "alkyl" means a straight or branched chain alkyl group containing up to approximately 20 but preferably up to 8 carbon atoms. Examples of alkyl groups include but are not limited to the following: methyl, ethyl, n-propyl, iso-propyl, n-butyl, isobutyl, sec-butyl, tert-butyl, n-pentyl, iso-pentyl, neopentyl, tert-pentyl, isohexyl, n-hexyl, n-heptyl, and n-octyl. A substituted alkyl has one or more hydrogen atoms substituted by other groups or a carbon replaced by a divalent, trivalent, or tetravalent group or atom. Although alkyls by definition have a single radical, as used herein, alkyl includes groups that have more than one radical to meet valence requirements for substitution.

The term "alkenyl" means a straight or branched chain alkyl group having at least one carbon-carbon double bond, and containing up to approximately 20 but preferably up to 8 carbon atoms. Examples of alkenyl groups include, but are not limited to, vinyl, 1-propenyl, 2-butenyl, 1,3-butadienyl, 2-pentenyl, 2,4-hexadienyl, 4-(ethyl)-1,3-hexadienyl, and 2-(methyl)-3-(propyl)-1,3-butadienyl. A substituted alkenyl has one or more hydrogen atoms substituted by other groups or a carbon replaced by a divalent, trivalent, or tetravalent group or atom. Although alkenyls by definition have a single radical, as used herein, alkenyl includes groups that have more than one radical to meet valence requirements for substitution.

The term "alkynyl" means a straight or branched chain alkyl group having a single radical, having at least one carbon-carbon triple bond, and containing up to approximately 20 but preferably up to 8 carbon atoms. Examples of alkynyl groups include, but are not limited to, the ethynyl, 1-propynyl, 2-propynyl, 1-butynyl, 2-butynyl, 3-butynyl, 4-pentynyl, 5-hexynyl, 6-heptynyl, 7-octynyl, 1-methyl-2-butynyl, 2-methyl-3-pentynyl, 4-ethyl-2-pentynyl, and 5,5-methyl-1,3-hexynyl. A substituted alkynyl has one or more hydrogen atoms substituted by other groups or a carbon replaced by a divalent, trivalent, or tetravalent group or atom. Although alkynyls by definition have a single radical, as used herein, alkynyl includes groups that have more than one radical to meet valence requirements for substitution.

The term "cycloalkyl" means an alkyl group forming at least one ring, wherein the ring has approximately 3 to 14 carbon atoms. Examples of cycloalkyl groups include but are not limited to the following: cyclopropyl, cyclobutyl, cyclopentyl, and cyclohexyl. A substituted cycloalkyl has one or more hydrogen atoms substituted by other groups or a carbon replaced by a divalent, trivalent, or tetravalent group or atom. Although cycloalkyls by definition have a single radical, as used herein, cycloalkyl includes groups that have more than one radical to meet valence requirements for substitution.

The term "cycloalkenyl" means an alkenyl group forming at least one ring and having at least one carbon-carbon double bond within the ring, wherein the ring has approximately 3 to 14 carbon atoms. Examples of cycloalkenyl groups include, but are not limited to, cyclopropenyl, cyclobutenyl, cyclopentenyl, 1,3-cyclopentadienyl, and cyclohexenyl. A substituted cycloalkenyl has one or more hydrogens substituted by other groups or a carbon replaced by a divalent, trivalent, or tetravalent group or atom. Although cycloalkenyls by definition have a single radical, as used herein, cycloalkenyl includes groups that have more than one radical to meet valence requirements for substitution.

The term "cycloalkynyl" means an alkynyl group forming at least one ring and having at least one carbon-carbon triple bond, wherein the ring contains up to approximately 14 carbon atoms. A group forming a ring having at least one triple bond and having at least one double bond is a cycloalkynyl group. An example of a cycloalkynyl group includes, but is not limited to, cyclooctyne. A substituted cycloalkynyl has one or more hydrogen atoms substituted by other groups. Although cycloalkynyls by definition have a single radical, as used herein, cycloalkynyl includes groups that have more than one radical to meet valence requirements for substitution.

The term "aryl" means an aromatic carbon ring group having a single radical and having approximately 4 to 20 carbon atoms. Examples of aryl groups include, but are not limited to, phenyl, naphthyl, and anthryl. A substituted aryl has one or more hydrogen atoms substituted by other groups. Although aryls by definition have a single radical, as used herein, aryl includes groups that have more than one radical to meet valence requirements for substitution. An aryl group can be a part of a fused ring structure such as N-hydroxy-succinimide bonded to phenyl (benzene) to form N-hydroxyphthalimide.

The term "hetero" when used in the context of chemical groups, or "heteroatom" means an atom other than carbon or hydrogen. Preferred examples of heteroatoms include oxygen, nitrogen, phosphorous, sulfur, boron, silicon, and selenium.

The term "heterocyclic ring" means a ring structure having at least one ring moiety having at least one heteroatom forming a part of the ring, wherein the heterocyclic ring has approximately 4 to 20 atoms connected to form the ring structure. An example of a heterocyclic ring having 6 atoms is pyridine with a single heteroatom. Additional examples of heterocyclic ring structures having a single radical include, but are not limited to, acridine, carbazole, chromene, imidazole, furan, indole, quinoline, and phosphinoline. Examples of heterocyclic ring structures include, but are not limited to, aziridine, 1,3-dithiolane, 1,3-diazetidine, and 1,4,2-oxazaphospholidine. Examples of heterocyclic ring structures having a single radical include, but are not limited to, fused aromatic and non-aromatic structures: 2H-furo[3,2-b]pyran, 5H-pyrido[2,3-d]-o-oxazine, 1H-pyrazolo[4,3-d] oxazole, 4H-imidazo[4,5-d]thiazole, selenazolo[5,4-j]benzothiazole, and cyclopenta[b]pyran. Heterocyclic rings can have one or more radicals to meet valence requirements for substitution.

The term "polycyclic" or "polycyclic group" means a carbon ring structure having more than one ring, wherein the polycyclic group has approximately 4 to 20 carbons forming the ring structure and has a single radical. Examples of polycyclic groups include, but are not limited to, bicyclo[1.1.0]butane, bicyclo[5.2.0]nonane, and tricycle[5.3.1.1]dodecane. Polycyclic groups can have one or more radicals to meet valence requirements for substitution. The term "halo" or "halogen" means fluorine, chlorine, bromine, or iodine.

The term "heteroatom group" means one heteroatom or more than one heteroatoms bound together and having two free valences for forming a covalent bridge between two atoms. For example, the oxy radical, —O— can form a bridge between two methyls to form $CH_3$—O—$CH_3$ (dimethyl ether) or can form a bridge between two carbons to form an epoxy such as cis or trans 2,3-epoxybutane,

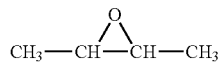

As used herein and in contrast to the normal usage, the term heteroatom group will be used to mean the replacement of groups in an alkyl, alkenyl, alkynyl, cycloalkyl, cycloalkenyl, and cycloalkynyl and not the formation of cyclic bridges, such as an epoxy, unless the term cyclic bridge is used with the term heteroatom group to denote the normal usage.

Examples of heteroatom groups, using the nomenclature for hetero bridges (such as an epoxy bridge), include but are not limited to the following: azimino (—N=N—HN—), azo (—N=N—), biimino (—NH—NH—), epidioxy (—O—O—), epidithio (—S—S—), epithio (—S—), epithioximino (—S—O—NH—), epoxy (—O—), epoxyimino (—O—NH—), epoxynitrilo (—O—N=), epoxythio (—O—S—), epoxythioxy (—O—S—O—), furano (—$C_4H_2O$—), imino (—NH—), and nitrilo (—N=). Examples of heteroatom groups using the nomenclature for forming acyclic bridges include but are not limited to the following: epoxy (—O—), epithio (—S—), episeleno (—Se—), epidioxy (—O—O—), epidithio (—S—S—), lambda$^4$-sulfano (—$SH_2$—), epoxythio (—O—S—), epoxythioxy (—O—S—O—), epoxyimino (—O—NH—), epimino (—NH—), diazano (—NH—NH—), diazeno (—N=N—), triaz[1]eno (—N=N—NH—), phosphano (—PH—), stannano (—$SnH_2$—), epoxymethano (—O—$CH_2$—), epoxyethano (—O—$CH_2$—$CH_2$—), epoxyprop[1]eno

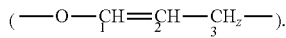

The term "bridge" means a connection between one part of a ring structure to another part of the ring structure by a hydrocarbon bridge. Examples of bridges include but are not limited to the following: methano, ethano, etheno, propano, butano, 2-buteno, and benzeno.

The term "hetero bridge" means a connection between one part of a ring structure to another part of the ring structure by one or more heteroatom groups, or a ring formed by a heterobridge connecting one part of a linear structure to another part of the linear structure, thus forming a ring.

The term "oxy" means the divalent radical —O—.
The term "oxo" means the divalent radical =O.
The term "carbonyl" means the group

wherein the carbon has two radicals for bonding.
The term "amide" or "acylamino" means the group

wherein the nitrogen has one single radical for bonding and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxy" means the group —O—R, wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of alkoxy groups where the R is an alkyl include but are not limited to the following: methoxy, ethoxy, propoxy, butoxy, pentoxy, hexoxy, heptoxy, octoxy, 1,1-dimethylethoxy, 1,1-dimethylpropoxy, 1,1-dimethylbutoxy, 1,1-dimethylpentoxy, 1-ethyl-1-methylbutoxy, 2,2-dimethylpropoxy, 2,2-dimethylbutoxy, 1-methyl-1-ethylpropoxy, 1,1-diethylpropoxy, 1,1,2-trimethylpropoxy, 1,1,2-trimethylbutoxy, 1,1,2,2-tetramethylpropoxy. Examples of alkoxy groups where the R is an alkenyl group include but are not limited to the following: ethenyloxy, 1-propenyloxy, 2-propenyloxy, 1-butenyloxy, 2-butenyloxy, 3-butenyloxy, 1-methyl-prop-2-enyloxy, 1,1-dimethyl-prop-2-enyloxy, 1,1,2-trimethyl-prop-2-enyloxy, and 1,1-dimethyl-but-2-enyloxy, 2-ethyl-1,3-dimethyl-but-1-enyloxy. Examples of alkyloxy groups where the R is an alkynyl include but are not limited to the following: ethynyloxy, 1-propynyloxy, 2-propynyloxy, 1-butynyloxy, 2-butynyloxy, 3-butynyloxy, 1-methyl-prop-2-ynyloxy, 1,1-dimethyl-prop-2-ynyloxy, and 1,1-dimethyl-but-2-ynyloxy, 3-ethyl-3-methyl-but-1-ynyloxy. Examples of alkoxy groups where the R is an aryl group include but are not limited to the following: phenoxy, 2-naphthyloxy, and 1-anthyloxy.

The term "acyl" means the group

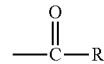

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyl groups include but are not limited to the following: acetyl, propionyl, butyryl, isobutyryl, valeryl, isovaleryl, acryloyl, propioloyl, mathacryloyl, crotonoyl, isocrotonoyl, benzoyl, and naphthoyl.

The term "acyloxy" means the group

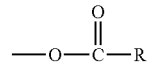

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyloxy groups include but are not limited to the following: acetoxy, ethylcarbonyloxy, 2-propenylcarbonyloxy, pentylcarbonyloxy, 1-hexynylcarbonyloxy, benzoyloxy, cyclohexylcarbonyloxy, 2-naphthoyloxy, 3-cyclodecenylcarbonyloxy.

The term "oxycarbonyl" means the group

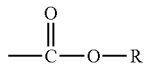

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of oxycarbonyl groups include but are not limited to the following: methoxycarbonyl, ethoxycarbonyl, isopropyloxycarbonyl, phenoxycarbonyl, and cyclohexyloxycarbonyl.

The term "acyloxycarbonyl" means the group

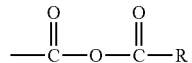

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxycarbonyloxy" means the group

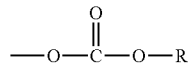

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "carboxy" means the group —C(O)OH, wherein the carbon has a single radical.

The term "imino" or "nitrene" means the group =N—R, wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "amino" means the group —NH$_2$, where the nitrogen has a single radical.

The term "secondary amino" means the group —NH—R, wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group:

The term "tertiary amino" means the group

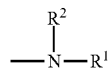

wherein the nitrogen has a single radical and $R_1$ and $R_2$ are independently selected from the group consisting of unsubstituted and substituted alkyl, alkenyl, alkynyl, cycloalkyl, cycloalkenyl, cycloalkynyl, aryl, heterocyclic ring, and polycyclic group.

The term "hydrazi" means the group —NH—NH—, wherein the nitrogens have single radicals bound to the same atom. The term "hydrazo" means the group —NH—NH—, wherein the nitrogens have single radicals bound to the different atoms.

The term "hydrazine" means the group NH$_2$—NH—, wherein the nitrogen has a single radical.

The term "hydrazone" means the group NH$_2$—N=, wherein the nitrogen has two radicals.

The term "hydroxyimino" means the group HO—N=, wherein the nitrogen has two radicals.

The term "alkoxyimino" means the group R—O—N=, wherein the nitrogen has two radicals and R is an unsubstituted or substituted alkyl, alkenyl, alkynyl, cycloalkyl, cycloalkenyl, cycloalkynyl, aryl, heterocyclic ring, or polycyclic group.

The term "azido" means the group N$_3$—, wherein the nitrogen has one radical.

The term "azoxy" means the group —N(O)=N—, wherein the nitrogens have one radical.

The term "alkazoxy" means the group R—N(O)=N—, wherein the nitrogen has one radical and R is hydrogen or an unsubstituted or substituted alkyl, alkenyl, alkynyl, cycloalkyl, cycloalkenyl, cycloalkynyl, aryl, heterocyclic ring, or polycyclic group. Azoxybenzene is an example compound.

The term "cyano" means the group —CN. The term "isocyano" means the group —NC. The term "cyanato" means the group —OCN. The term "isocyanato" means the group —NCO. The term "fulminate" means the group —ONC. The term "thiocyanato" means the group —SCN. The term "isothiocyanato" means the group —NCS. The term "selenocyanato" means the group —SeCN. The term "isoselenocyanato" means the group —NCSe.

The term "carboxyamido" or "acylamino" means the group

wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "acylimino" means the group

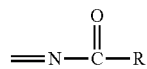

wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "nitroso" means the group O=N—, wherein the nitrogen has a single radical.

The term "aminooxy" means the group —O—NH$_2$, wherein the oxygen has a single radical.

The term "carxoimidioy" means the group

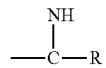

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazonoyl" means the group

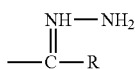

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydroximoyl" or "oxime" means the group

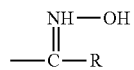

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazine" means the group

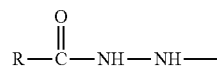

wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "amidino" means the group

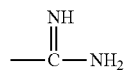

wherein the carbon has a single radical.

The term "sulfide" means the group —S—R, wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "thiol" means the group —S—, wherein the sulfur has two radicals. Hydrothiol means —SH.

The term "thioacyl" means the group —C(S)—R, wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "sulfoxide" means the group

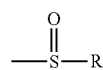

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfoxide" means the substitution of sulfur for oxygen in sulfoxide; the term includes substitution for an oxygen-bound between the sulfur and the R group when the first carbon of the R group has been substituted by an oxy group and when the sulfoxide is bound to a sulfur atom on another group.

The term "sulfone" means the group

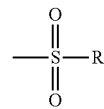

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfone" means substitution of sulfur for oxygen in one or two locations in sulfone; the term includes substitution for an oxygen bound between the sulfur and the R group when the first carbon of the R group has been substituted by an oxy group and when the sulfone is bound to a sulfur atom on another group.

The term "sulfate" means the group

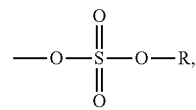

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfate" means substitution of sulfur for oxygen in one, two, three, or four locations in sulfate.

The term "phosphoric acid ester" means the group $R_1R_2PO_4$—, wherein the oxygen has a single radical and $R^1$ is selected from the group consisting of hydrogen and unsubstituted and substituted alkyl, alkenyl, alkynyl, cycloalkyl, cycloalkenyl, cycloalkynyl, aryl, heterocyclic ring, and polycyclic group, and $R^2$ is selected from the group consisting of unsubstituted and substituted alkyl, alkenyl, alkynyl, cycloalkyl, cycloalkenyl, cycloalkynyl, aryl, heterocyclic ring, and polycyclic group.

The term "substituted" or "substitution," in the context of chemical species, means independently selected from the group consisting of (1) the replacement of a hydrogen on at least one carbon by a monovalent radical, (2) the replacement of two hydrogens on at least one carbon by a divalent radical, (3) the replacement of three hydrogens on at least one terminal carbon (methyl group) by a trivalent radical, (4) the replacement of at least one carbon and the associated hydrogens (e.g., methylene group) by a divalent, trivalent, or tetravalent radical, and (5) combinations thereof. Meeting valence requirements restricts substitution. Substitution occurs on alkyl, alkenyl, alkynyl, cycloalkyl, cycloalkenyl, cycloalkynyl, aryl, heterocyclic ring, and polycyclic groups, providing substituted alkyl, substituted alkenyl, substituted alkynyl, substituted cycloalkyl, substituted cycloalkenyl, substituted cycloalkynyl, substituted aryl group, substituted heterocyclic ring, and substituted polycyclic groups.

The groups that are substituted on an alkyl, alkenyl, alkynyl, cycloalkyl, cycloalkenyl, cycloalkynyl, aryl, heterocyclic ring, and polycyclic groups are independently selected from the group consisting of alkyl, alkenyl, alkynyl, cycloalkyl, cycloalkenyl, cycloalkynyl, aryl, heterocyclic ring, polycyclic group, halo, heteroatom group, oxy, oxo, carbonyl, amide, alkoxy, acyl, acyloxy, oxycarbonyl, acyloxycarbonyl, alkoxycarbonyloxy, carboxy, imino, amino, secondary amino, tertiary amino, hydrazi, hydrazino, hydrazono, hydroxyimino, azido, azoxy, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, thiol, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitrilo, nitro, aci-nitro, nitroso, semicarbazono, oxamoyl, pentazolyl, seleno, thiooxi, sulfamoyl, sulfenamoyl, sulfeno, sulfinamoyl, sulfino, sulfinyl, sulfo, sulfoamino, sulfonato, sulfonyl, sulfonyldioxy, hydrothiol, tetrazolyl, thiocarbamoyl, thiocarbazono, thiocarbodiazono, thiocarbonohydrazido, thiocarbonyl, thiocarboxy, thiocyanato, thioformyl, thioacyl, thiosemicarbazido, thiosulfino, thiosulfo, thioureido, thioxo, triazano, triazeno, triazinyl, trithio, trithiosulfo, sulfinimidic acid, sulfonimidic acid, sulfinohydrazonic acid, sulfonohydrazonic acid, sulfinohydroximic acid, sulfonohydroximic acid, and phosphoric acid ester, and combinations thereof.

As an example of a substitution, replacement of one hydrogen or ethane by a hydroxyl provides ethanol, and replacement of two hydogens by an oxo on the middle carbon of propane provides acetone (dimethyl ketone.) As a further example, replacement the middle carbon (the methenyl group) of propane by the oxy radical (—O—) provides dimethyl ether ($CH_3$—O—$CH_3$). As a further example, replacement of one hydrogen on a benzene by a phenyl group provides biphenyl. As provided above, heteroatom groups can be substituted inside an alkyl, alkenyl, or alkylnyl group for a methylene group (:$CH_2$) thus forming a linear or branched substituted structure rather than a ring or can be substituted for a methylene inside of a cycloalkyl, cycloalkenyl, or cycloalkynyl ring thus forming a heterocyclic ring. As a further example, nitrilo (—N≡) can be substituted on benzene for one of the carbons and associated hydrogen to provide pyridine, or and oxy radical can be substituted to provide pyran.

The term "unsubstituted" means that no hydrogen or carbon has been replaced on an alkyl, alkenyl, alkynyl, cycloalkyl, cycloalkenyl, cycloalkynyl, or aryl group.

The term "linker" means a molecule having one end attached or capable of attaching to a solid surface and the other end having a reactive group that is attached or capable of attaching to a chemical species of interest such as a small molecule, an oligomer, or a polymer. A linker may already be bound to a solid surface and/or may already have a chemical species of interest bound to its reactive group. A linker may have a protective group attached to its reactive group, where the protective group is chemically or electrochemically removable. A linker may comprise more than one molecule, where the molecules are covalently joined in situ to form the linker having the desired reactive group projecting away from a solid surface.

The term "spacer" means a molecule having one end attached or capable of attaching to the reactive group of a linker and the other end having a reactive group that is attached or capable of attaching to a chemical species of interest such as a small molecule, an oligomer, or a polymer. A spacer may already be bound to a linker and/or may already have a chemical species of interest bound to its reactive group. A spacer may have a protective group attached to its reactive group, where the protective group is chemically or electrochemically removable. A spacer may be formed in situ on a linker. A spacer may be formed and then attached to a linker already attached to a solid surface. A spacer may be externally synthesized on a chemical species of interest followed by attachment to a linker already attached to a solid surface. A chemical species of interest may be attached to a spacer that is attached to a linker, where the entire structure is then attached to a solid surface at a reactive sight on the solid surface. The purpose of a spacer is to extend the distance between a molecule of interest and a solid surface.

The term "combination linker and spacer" means a linker having both the properties of a linker and a spacer. A combination linker and spacer may be synthesized in situ or synthesized externally and attached to a solid surface.

The term "coating" means a thin layer of material that is chemically and/or physically bound to a solid surface. A coating may be attached to a solid surface by mechanical interlocking as well as by van der Waals forces (dispersion forces and dipole forces), electron donor-acceptor interactions, metallic coordination/complexation, covalent bonding, or a combination of the aforementioned. A coating can provide a reactive group for direct attachment of a chemical species of interest, attachment of a linker, or attachment of a combination linker and spacer. A coating can be polymerized and/or cross-linked in situ.

The term "reactive" or "reaction" as used in reactive or reaction coating or reactive or reaction layer means that there is a chemical species or bound group within the layer that is capable of forming a covalent bond for attachment of a linker, spacer, or other chemical species to the layer or coating.

The term "porous" as used in porous reactive layer or coating means that there are non-uniformities within the layer or coating to allow molecular species to diffuse into and through the layer or coating.

The term "adsorption" or "adsorbed" means a chemical attachment by van der Waals forces (dispersion forces and dipole forces), electron donor-acceptor interactions, or metallic coordination/complexation, or a combination of the aforementioned forces. After adsorption, a species may covalently bind to a surface, depending on the surface, the species, and the environmental conditions.

The term "microarray" refers to, in general, planer surface having specific spots that are usually arranged in a column and row format, wherein each spot can be used for some type of chemical or biochemical analysis, synthesis, or method. The spots on a microarray are typically smaller than 100 micrometers. The term "electrode microarray" refers to a microarray of electrodes, wherein the electrodes are the specific spots on the microarray.

The term "synthesis quality" refers to, in general, the average degree of similarity between a desired or designed chemical or biochemical species and the species actually synthesized. The term can refer to other issues in a synthesis such as the effect of a layer or coating on the synthesis quality achieved.

The term "solvation" means a chemical process in which solvent molecules and molecules or ions of a solute combine to form a compound, wherein the compound is generally a loosely bound complex held together by van der Waals forces (dispersion forces and dipole forces), acid-base interactions (electron donor acceptor interactions), ionic interaction, or metal complex interactions but not covalent bonds. In water, the pH of the water can affect solvation of dissociable species such as acids and bases. In addition, the concentration of salts as well as the charge on salts can affect solvation.

The term "agarose" means any commercially available agarose. Agarose is a polysaccharide biopolymer and is usually obtained from seaweed. Agarose has a relatively large number of hydroxyl groups, which provide for high water solubility. Agarose is available commercially in a wide ranger of molecular weights and properties.

The term "controlled pore glass" means any commercially available controlled pore glass material suitable for coating purposes. In general, controlled pore glass (CPG) is an inorganic glass material having a high surface area owing to a large amount of void space.

The term "monosaccharide" means one sugar molecule unlinked to any other sugars. Examples of monosaccharides include allose, altrose, arabinose, deoxyribose, erythrose, fructose (D-Levulose), galactose, glucose, gulose, idose, lyxose, mannose, psicose, ribose, ribulose, sedoheptulose, D-sorbitol, sorbose, sylulose, L-rhamnose (6-Deoxy-L-mannose), tagatose, talose, threose, xylulose, and xylose.

The term "disaccharide" means two sugars linked together to form one molecule. Examples of disaccharides include amylose, cellobiose (4-.beta.-D-glucopyranosyl-D-glucopyranose), lactose, maltose (4-O-α-D-glucopyranosyl-D-glucose), melibiose (6-O-α-D-Galactopyranosyl-D-glucose), palatinose (6-O-α-D-Glucopyranosyl-D-fructose), sucrose, and trehalose (a-D-Glucopyranosyl-α-D-glucopyranoside).

The term "trisaccharide" means three sugars linked together to form one molecule. Examples of a trisaccharides include raffinose (6-O-α-D-Galactopyranosyl-D-glucopyranosyl-.beta.-D-fructofuranoside) and melezitose (O-α-D-glucopyranosyl-(1.fwdarw.3)-.beta.-D-fructofuranosyl-a-D-glu-copyranoside).

The term "polysaccharide" means more than three sugars linked together to form one molecule, but more accurately means a sugar-based polymer or oligomer. Examples of polysaccharides include inulin, dextran (polymer composed of glucose subunits), starches, and cellulose.

Specific Embodiments

Figure 1B:
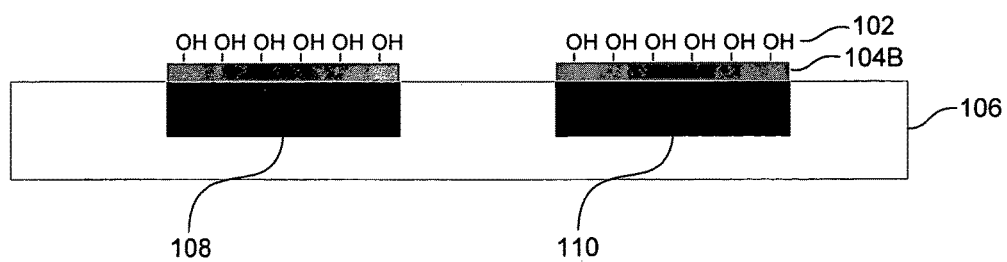

In an embodiment of the present invention, an electrode microarray having an adsorbed porous reaction layer for improved synthesis quality is provided. The microarray has a plurality of electrodes attached to a substrate, wherein the electrodes are electronically connected to a computer control system that allows selection of any electrode individually or more than one electrode as group of electrodes. FIGS. 1A and 1B are schematics of a cross section of two electrodes 108, 110 of such a microarray 106 having a plurality of electrodes. In one embodiment of the present invention, an adsorbed layer 104A shown in FIG. 1A covers the electrodes and the substrate that the electrodes are attached thereto. The adsorbed layer 104A has hydroxyl reactive groups 102. The reactive groups 102 can be groups other than hydroxyl including but not limited to amine, carboxylic acid, aldehyde, thiol, alkene, alkyne, nitrile, azido, or phosphorous-based compound. In another embodiment shown in FIG. 1B, the adsorbed layer 104B can be substantially on the electrodes but substantially not on the substrate 106. In either embodiment, the adsorbed layer can be chemically blocked and selectively electrochemically deblocked to control the locations of chemical reactions to specific electrodes while preventing chemical reactions on non-selected electrodes and on non-electrode areas.

The adsorbed porous reaction layer on the plurality of electrodes comprises a chemical species having at least one hydroxyl group, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, and formula VII, and combinations thereof, wherein formula I is

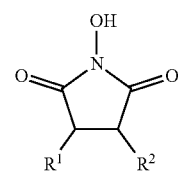

formula II is

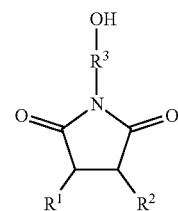

formula III is $HOR^4(OR^5)_m R^7$, formula IV is

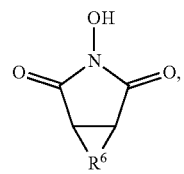

formula V is

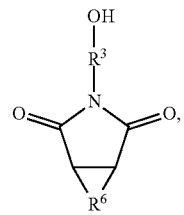

formula VI is

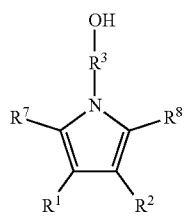

and formula VII is

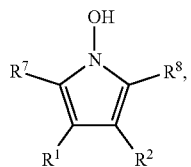

wherein m is an integer from 1 to 4.

$R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester;

$R^3$ is preferably selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group $R^4$ and $R^5$ are preferably independently selected from the group consisting of methylene, ethylene, propylene, butylene, pentylene, and hexylene.

$R^6$ forms a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group. $R^7$ is selected from the group consisting of amino and hydroxyl.

Preferably, the monosaccharide is selected from the group consisting of allose, altrose, arabinose, deoxyribose, erythrose, fructose (D-Levulose), galactose, glucose, gulose, idose, lyxose, mannose, psicose, L-rhamnose (6-Deoxy-L-mannose), ribose, ribulose, sedoheptulose, D-sorbitol, sorbose, sylulose, tagatose, talose, threose, xylulose, and xylose. Preferably, the disaccharide is selected from the group consisting of amylose, cellobiose (4-.beta.-D-glucopyranosyl-D-glucopyranose), lactose, maltose (4-O-α-D-glucopyranosyl-D-glucose), melibiose (6-O-α-D-Galactopyranosyl-D-glucose), palatinose (6-O-α-D-Glucopyranosyl-D-fructose), sucrose, and trehalose (α-D-Glucopyranosyl-α-D-glucopyranoside). Preferably the triaccharide is selected from the group consisting of raffinose (6-O-α-D-Galactopyranosyl-D-glucopyranosyl-α-D-fructofuranoside) and melezitose (O—α-D-glucopyranosyl-(1.fwdarw.3)-.beta.-D-fructofuranosyl-α-D-glucopyranoside).

Preferably the polyethylene glycol has a molecular weight between approximately 1,000 and approximately 20,000, more preferably between approximately 5000 and approximately 15,000, and most preferably between approximately 7,000 and approximately 10,000.

Preferably, the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri (ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra (ethylene glycol) mono methyl ether, tetra(ethylene glycol) mono tosyl mono allyl ether, tetra(ethylene glycol) mono tosylate, tetra(ethylene glycol) mono benzyl ether, tetra (ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa (ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa (ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

More preferably, the adsorbed porous reaction layer chemical species having at least one hydroxyl group is selected from the group consisting of sucrose, palatinose, fructose, glucose, lactose, DEG, TEG, and PEG having a molecular weight of approximately 8,000. Most preferably, the adsorbed porous reaction layer chemical species having at least one hydroxyl group is sucrose.

In an embodiment of the present invention, a method is provided for cleaning the electrode microarray prior to adsorption of the porous reaction layer onto the microarray. In one preferred embodiment for cleaning the microarray, the microarray is cleaned using a plasma cleaning method and then cleaned using an electrochemical cleaning method. In another preferred embodiment for cleaning the microarray, the microarray is cleaned using a plasma cleaning method and then cleaned using a hydrogen peroxide cleaning method.

In one embodiment of the present invention, the plurality of electrodes on the electrode microarray is selected from the group consisting of platinum, gold, semiconductor, indium tin oxide, and carbon, and combinations thereof. Platinum is the preferred embodiment. In one embodiment, the plasma cleaning method comprises exposing the electrode microarray to an inert gas to physically clean (sputter etch) the surface of the electrode array. The inert gas is preferably Argon, and preferably, the sputter etch process is performed for approximately two to six minutes, wherein the plasma power is 200 W, the self bias voltage is 600-650V, the plasma pressure is 8 mTorr, and a 200 mm diameter electrode is used in a parallel plate plasma chamber. In another embodiment, the plasma cleaning method comprises exposing the electrode microarray to a chemically reactive gas to clean the surface of the electrode array through a chemical reactive process. The reactive gas is preferably oxygen, sulfur hexafluoride, trifluoromethane, carbon tetrafluoride or other chemically reactive gas species.

In a preferred embodiment the plasma process is performed in an Oxford Instruments Plasmalab 800 Plus RIE system having an electrode diameter of 460 mm, wherein the plasma cleaning method comprises a three-step plasma treatment. In step one, the microarray is etched using argon plasma for approximately three minutes using a RF plasma power of approximately 600 watts, a set pressure of approximately eight millitorr and an Ar gas flow of approximately 30 sccm. In step two, the microarray is etched using oxygen plasma for approximately six minutes using an RF plasma power of approximately 500 watts, a set pressure of approximately 50 millitorr and an oxygen gas flow of approximately 50 sccm. For the final step, the microarray is etched using argon plasma for approximately ten minutes using an RF plasma power of approximately 600 watts, a set pressure of approximately eight millitorr and an Ar gas flow of approximately 30 sccm. Without being bound by the degree of etching, the amount of material removed by etching is estimated to be approximately equivalent to between 300 to 400 angstrom of a plasma enhanced chemical vapor deposited (PECVD) silicon nitride film.

Preferably, the plasma cleaning method comprises exposing the electrode microarray to a sulfur hexafluoride plasma for approximately 30 to 60 minutes, where the plasma power is 300 watts, the plasma pressure is approximately 250 to 350 mTorr, and the gas flow is 124 cubic centimeters per minute in an isoptropic plasma chamber. Preferably, the plasma cleaning method comprises etching the electrode microarray in a commercial Reactive Ion Etch Plasma system (such as Oxford Plasmalab 800Plus RIE system with a 460 mm diameter electrode) using (1) an argon plasma for approximately 2 to 4 minutes and a RF plasma power of approximately 600 watts, where the pressure is approximately eight millitorr and the Ar gas flow is approximately 30 sccm; (2) an oxygen plasma for approximately 5 to 7 minutes using a power of approximately 500 watts, where the pressure is approximately 50 millitorr and the oxygen gas flow of approximately 50 sccm; or (3) an argon plasma for approximately 8 to 12 minutes using a power of approximately 600 watts, where the pressure is approximately eight millitorr and the Ar gas flow is approximately 30 sccm.

In a preferred embodiment, the electrochemical cleaning method comprises placing the electrode microarray into a solution of sulfuric acid and then pulsing columns of electrodes having an alternating pattern of pulsed/active electrodes and ground electrodes. After the first pulse, the active electrodes become the ground electrodes and the ground electrodes become the active electrodes. For each subsequent pulse, the electrode columns alternate between being the active column and being the ground column. The electrode columns alternate between active and ground for the duration of the cleaning time. The concentration of sulfuric acid is between approximately 0.01 and 5 molar, more preferably between approximately 0.1 and 1.5 molar, and most preferably between approximately 0.4 and 0.6 molar. The duration of the cleaning time is between approximately 1 and 60 minutes, more preferably between approximately 5 and 15 minutes, and most preferably between approximately 8 and 12 minutes. The pulse time (active electrode column time) is between approximately 0.01 and 60 seconds, more preferably between approximately 0.05 and 0.5 seconds, and most preferably between approximately 0.08-0.12 seconds. The cleaning is done preferably between approximately 0.degree. C. and 50.degree. C. and most preferably between approximately room temperature and 30.degree. C. After exposure to the sulfuric acid and electrical pulsing, the microarray is washed using distilled water. In one preferred embodiment, the concentration of sulfuric acid is 0.5 molar, the cleaning time is 10 minutes, the pulse time is 0.1 seconds, and the temperature is room temperature.

In a preferred embodiment, the hydrogen peroxide cleaning method comprises placing the electrode microarray into a solution containing hydrogen peroxide. The concentration of hydrogen peroxide is between approximately 0.5 and 10 percent hydrogen peroxide, more preferably between approximately 1 and 5 percent hydrogen peroxide, and most preferably between approximately 2 and 4 percent hydrogen peroxide. The temperature of the solution is preferably between approximately room temperature and 95.degree. C., more preferably between approximately 35.degree. C. and 80.degree. C., and most preferably between approximately 60.degree. C. and 70.degree. C. The time of treatment is preferably between approximately 1 minute and 24 hours, more preferably between approximately 30 minutes and 12 hours, and most preferably between approximately 45 minutes and 2 hours. In the most preferred embodiment, the concentration of hydrogen peroxide is 3 percent; the treatment time is one hour; and the temperature of the solution is 65.degree. C. Afterward exposure to the hydrogen peroxide solution, the microarray is rinsed using distilled water.

In one embodiment of the present invention, an adsorption method is provided for the attachment of the adsorbed porous reaction layer chemical species to a clean electrode microarray. The electrode microarray is placed into a solution containing a chemical species that forms the reaction layer. Without being bound by theory, the chemical species has a natural affinity for the clean microarray thus adsorbs onto the surface thereof. The treatment time is between approximately 1 minute and 1 month, more preferably between approximately 30 minutes to 1 week, and most preferably between approximately 1 hour and 24 hours. The solvent used for making the solution is preferably water. Other solvents are suitable, including alcohols, acetonitrile, dimethyl formamide and methylene chloride as well as other common laboratory solvents or the uncommon equivalent of such solvents. Other unusual solvents may be suitable. Any solvent that dissolves the chemical species is suitable. The concentration of the chemical species in solution is between approximately 0.001 and 5 molar, more preferably between approximately 0.1 and 2 molar, and most preferably between approximately 0.2 and 0.5 molar. The temperature of the solution during treatment is preferably between approximately 0 and 90.degree. C. In one preferred embodiment, the solution is an aqueous solution of 0.25 molar sucrose; the treatment time is one hour; and the temperature is room temperature. In another preferred embodiment, the solution is an aqueous solution of 0.25 molar sucrose; the treatment time is 48 hours; and the temperature is 37.degree. C. After treatment, the microarray is rinsed using the solvent used for the treatment solution. After rinsing, the microarray is allowed to air dry.

In another embodiment of the present invention, an electrode microarray having an adsorbed porous reaction layer having a combination linker and spacer (linker/spacer) attached thereto for improved synthesis quality is provided. The microarray has a plurality of electrodes attached to a substrate, wherein the electrodes are electronically connected to a computer control system that allows selection of any electrode individually or more than one electrode as group of electrodes. In one embodiment, the linker/spacer is synthesized in situ on the adsorbed porous reaction layer. In a preferred embodiment, the linker/spacer is synthesized in situ on an adsorbed porous reaction layer comprising sucrose.

Figure 2A:
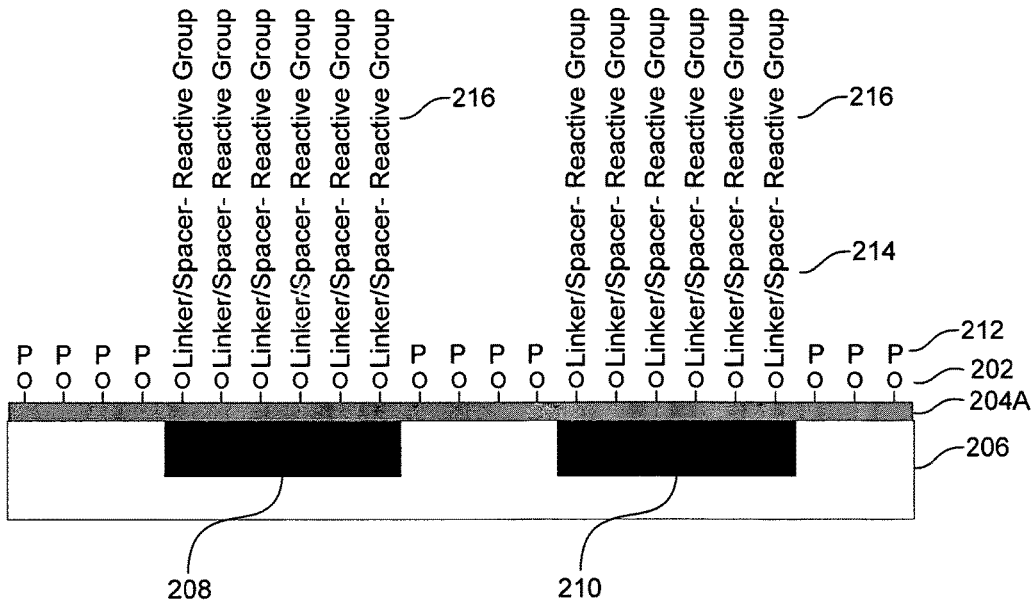
FIGS. 2A and 2B are schematics of a cross section of two electrodes of a microarray of electrodes, wherein there is a bound linker moiety has a terminal reactive group for in situ synthesis.
Figure 2B:
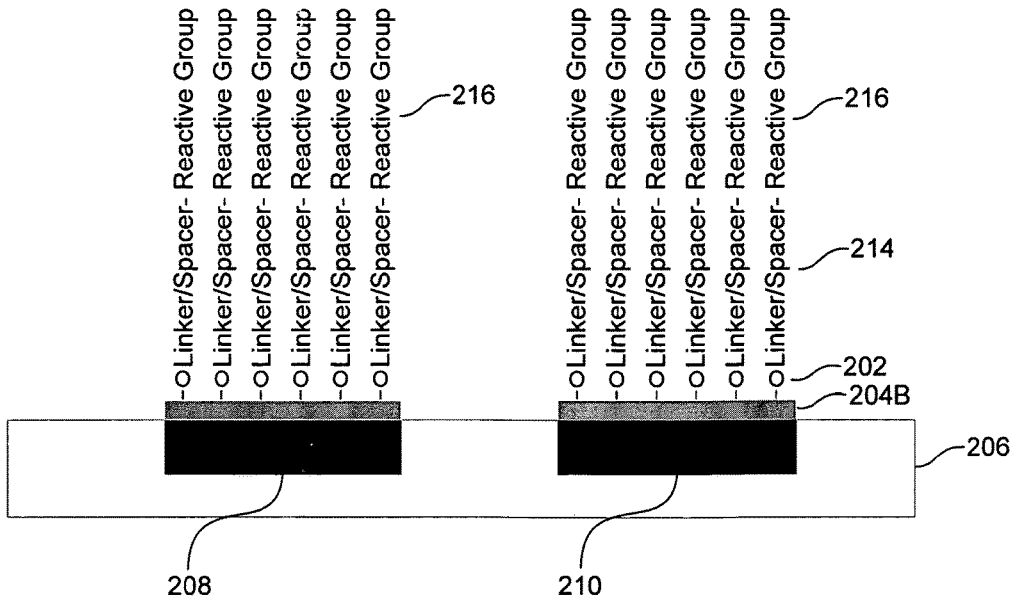

Embodiments of the present invention are provided in FIGS. 2A and 2B, which are schematics of a cross section of two electrodes 208, 210 of an electrode microarray 206 having a plurality of electrodes. In one embodiment, shown in FIG. 2A, the microarray 206 has an adsorbed porous reaction layer 204A having reacted hydroxyl groups 202 (shown after reaction as an ether linkage) attached to the entire surface of the microarray 206. A blocking group (P) 212 is shown attached to the reaction layer 204A at non-electrode locations. The blocking group 212 prevents synthesis at non-electrode locations. In another embodiment, shown in FIG. 2B, the microarray 205 has an adsorbed porous reaction layer 204B having reacted hydroxyl groups 202 (shown after reaction as an ether linkage), wherein the reaction layer is substantially attached only to electrodes 208, 210. In both embodiments, the electrodes 208, 210 have a linker/spacer 214 attached thereto to the reaction layer 204A, 204B. The linker/spacer 214 is attached through an ether linkage 202. The linker/spacer has a terminal reactive group 216 for in situ synthesis.

Figure 3:
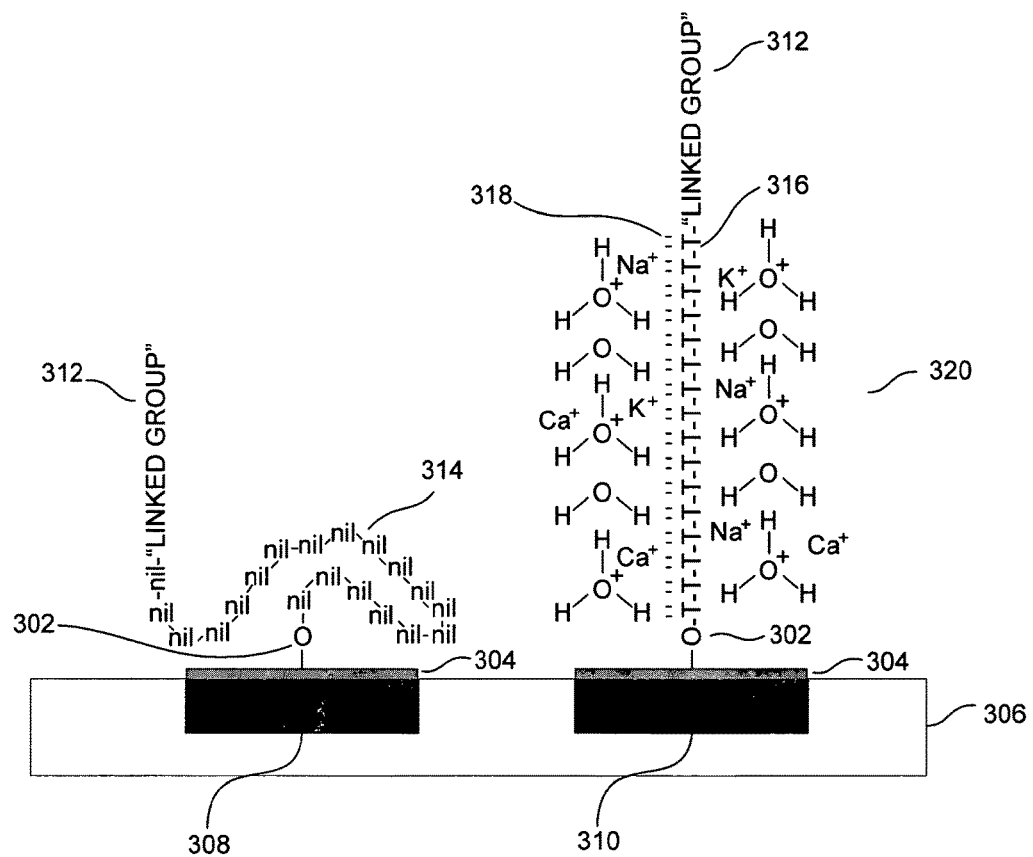
FIG. 3 is a schematic of a cross section of two electrodes of a microarray of electrodes, wherein a comparison is made between a linker/spacer having no charge to one have charge. Sequence listing: Element 316 (TTTTTTTTTTTTTTTT) (SEQ ID NO:3).

In one embodiment of the present invention, the linker/spacer is an oligomer synthesized in situ and having a substantial charge in aqueous solution. In a preferred embodiment, the linker/spacer is a sequence of DNA synthesized in situ. FIG. 3 shows a cross section of two electrodes 308, 310 of an electrode microarray 306 having a plurality of electrodes. An adsorbed porous reaction layer 304 is shown attached to the microarray 306. Electrode 310 shows a DNA linker/spacer 316 having a negative charge 318 in an aqueous solution 320 having cations, wherein the linker/spacer is attached to an adsorbed porous reaction layer 304 through an ether linkage 302 and has a linked group 312 attached at the end of the linker/spacer 316 protruding into the aqueous solution 320. In a preferred embodiment, the linker/spacer comprises a 15-unit deoxythymidylate DNA chain synthesized in situ. Electrode 308 shows a non-ionic linker/spacer 314 attached thereto via an ether linkage 302 and having a linked group 312 terminally attached.

Without being bound by theory, the non-ionic linker/spacer 314 likely allows the linked group 312 to approach the microarray 306 because the non-ionic linker/spacer 314 is less well solvated owing to the lack of ionic charge. Without being bound by theory, the charge on the linker/spacer 316 likely improves solvation in aqueous media 320 by preventing the linker/spacer 316 from folding on itself because of charge repulsion. Charge repulsion prevents the linker/spacer 316 from interacting with other adjacent charged linker/spacers on the same electrode. Additionally, salvation structures are likely formed in the aqueous media thus minimizing side chain contact of the charged linker/spacer with the solid surface. Without being bound by theory, a well solvated linker/spacer is expected to allow a subsequent group placed in a solution to have better access to the reactive group on the end of the linker/spacer while at the same time preventing quenching of fluorescence from a fluorescently labeled marker attached to a subsequent group or a chain of subsequent groups.

The following examples are provided merely to explain, illustrate, and clarify the present invention and not to limit the scope or application of the present invention. One of skill in the art would readily recognize similar embodiments and applications of the present invention that fall within the scope of the present invention.

Example 1

This example illustrates microarrays of nucleotides prepared using selected adsorbed porous reaction layers on the different microarrays. Each microarray was cleaned using the plasma cleaning method and the electrochemical cleaning method or using the plasma cleaning method and the hydrogen peroxide cleaning method, each as disclosed herein. After cleaning, each microarray was exposed to a solution containing a chemical for forming an adsorbed porous reaction layer as disclosed herein. The chemicals used for the experiments included agarose, sucrose, diethylene glycol, ethylene glycol, N-hydroxysuccinimide, triethylene glycol, raffinose, melizitose, Splenda®, inulin, polyethylene glycol having a molecular weight of 8000, salicin, ribose, and melibiose.

Figure 9:
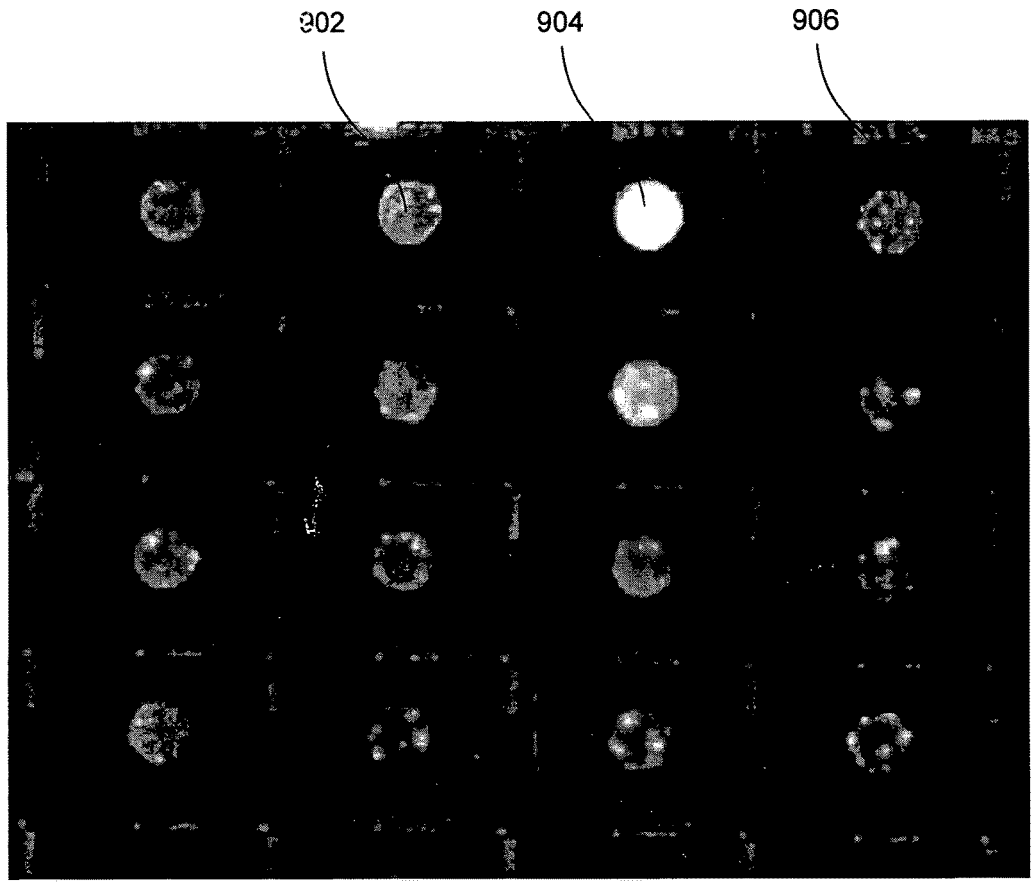
FIG. 9 is a photograph of a magnified portion of a top view of a microarray having N-hydroxysuccinimide as a reaction layer. The lighter spots are fluorescence of fluorescently labeled nucleotides that were hybridized with the array after in situ synthesis of DNA oligos.
Figure 10:
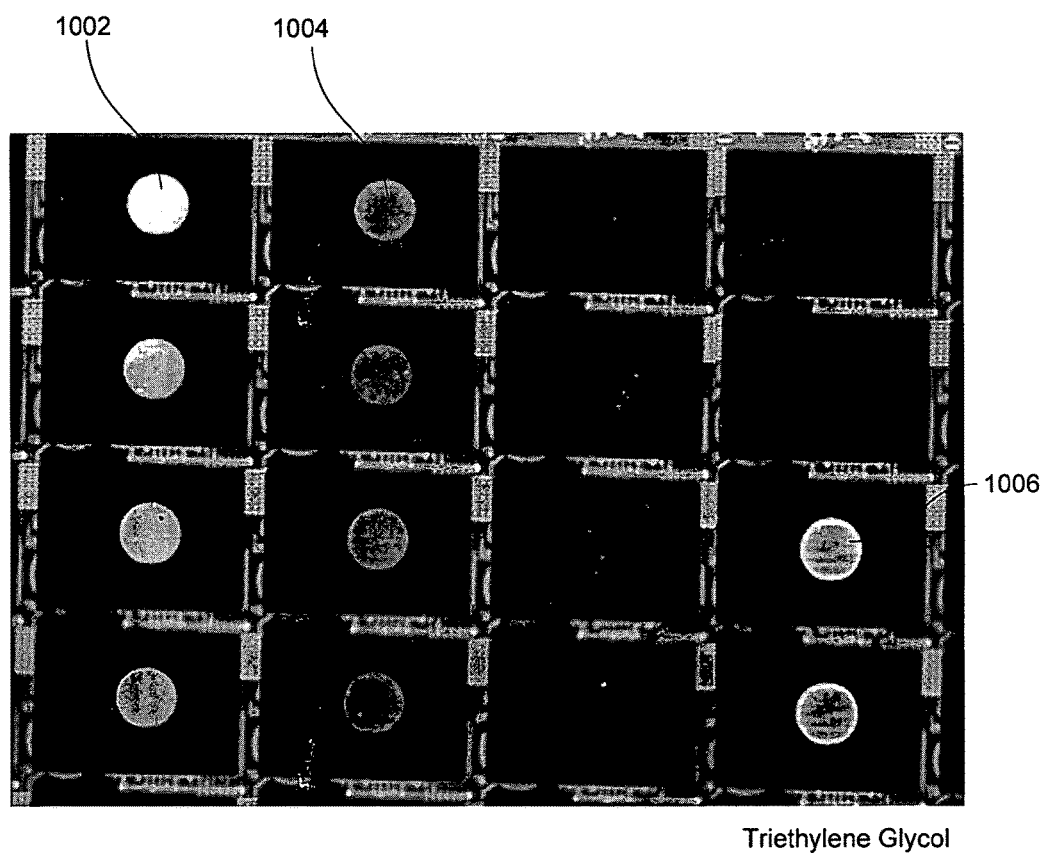
FIG. 10 is a photograph of a magnified portion of a top view of a microarray having triethylene glycol as a reaction layer. The lighter spots are fluorescence of fluorescently labeled nucleotides that were hybridized with the array after in situ synthesis of DNA oligos.
Figure 11:
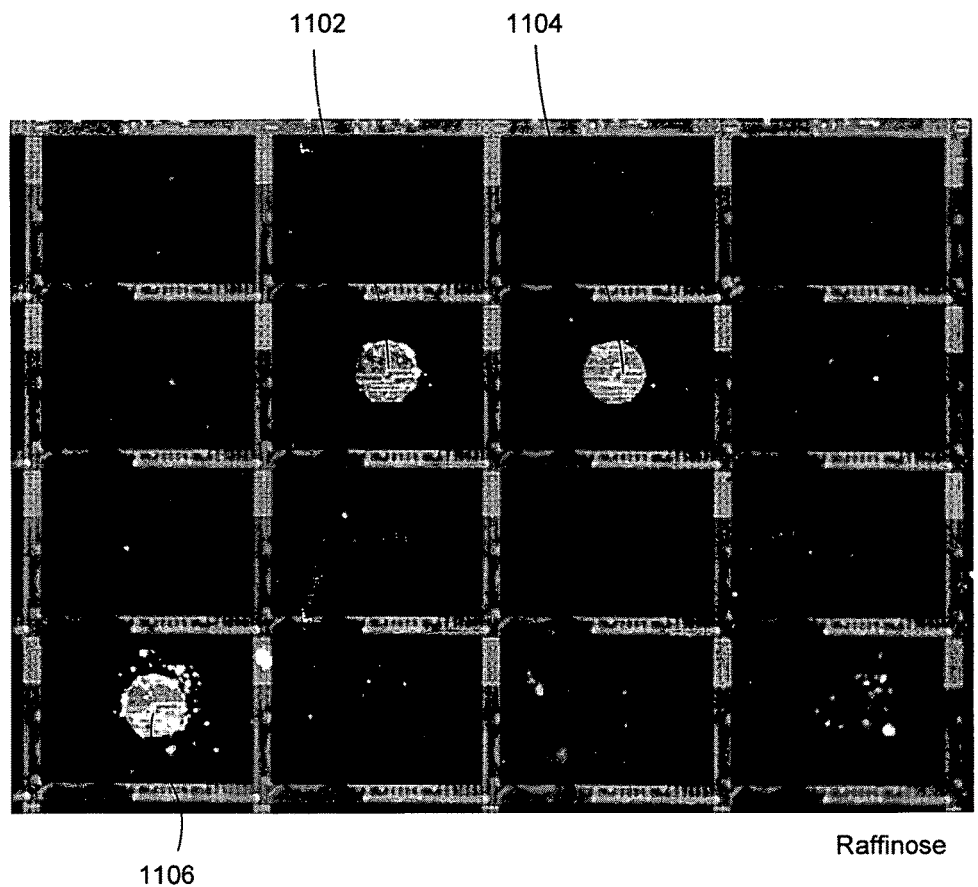
FIG. 11 is a photograph of a magnified portion of a top view of a microarray having raffinose as a reaction layer. The lighter spots are fluorescence of fluorescently labeled nucleotides that were hybridized with the array after in situ synthesis of DNA oligos.

After each microarray was prepared, after cleaning with a porous reaction layer, different nucleotides of either 15 mer, shown in FIG. 11 though 19, 25, and 26, or 35 mer, shown in FIGS. 5 through 10, were synthesized in situ on each microarray using an electrochemical synthesis method. After synthesis, the 35 mer nucleotide microarrays were hybridized to a complex background having a spiked-in control transcript. The complex background sample was prepared from fluorescently labeled placental DNA. The spiked-in control was a labeled phage lambda nucleic acid. Various amounts of spiked-in control transcripts were combined with the complex background. The 15 mer microarrays were hybridized to labeled 15 mer DNA oligonucleotides. The 15 mer oligonucleotides were prepared from phage lambda nucleic acid. After hybridization to the spiked control transcripts in the complex background or the 15 mer labeled oligonucleotide, each microarray was imaged to view the amount of fluorescence and the quality of the fluorescence on the microelectrodes of the microarrays. Quality was considered "good" when there was a fluorescent circle on an electrode having a relatively uniform amount of fluorescence and having a sharp loss of fluorescence at the edge of the circle. In addition, another quality parameter was where there was minimal fluorescence at locations other than electrodes.

Figure 27:
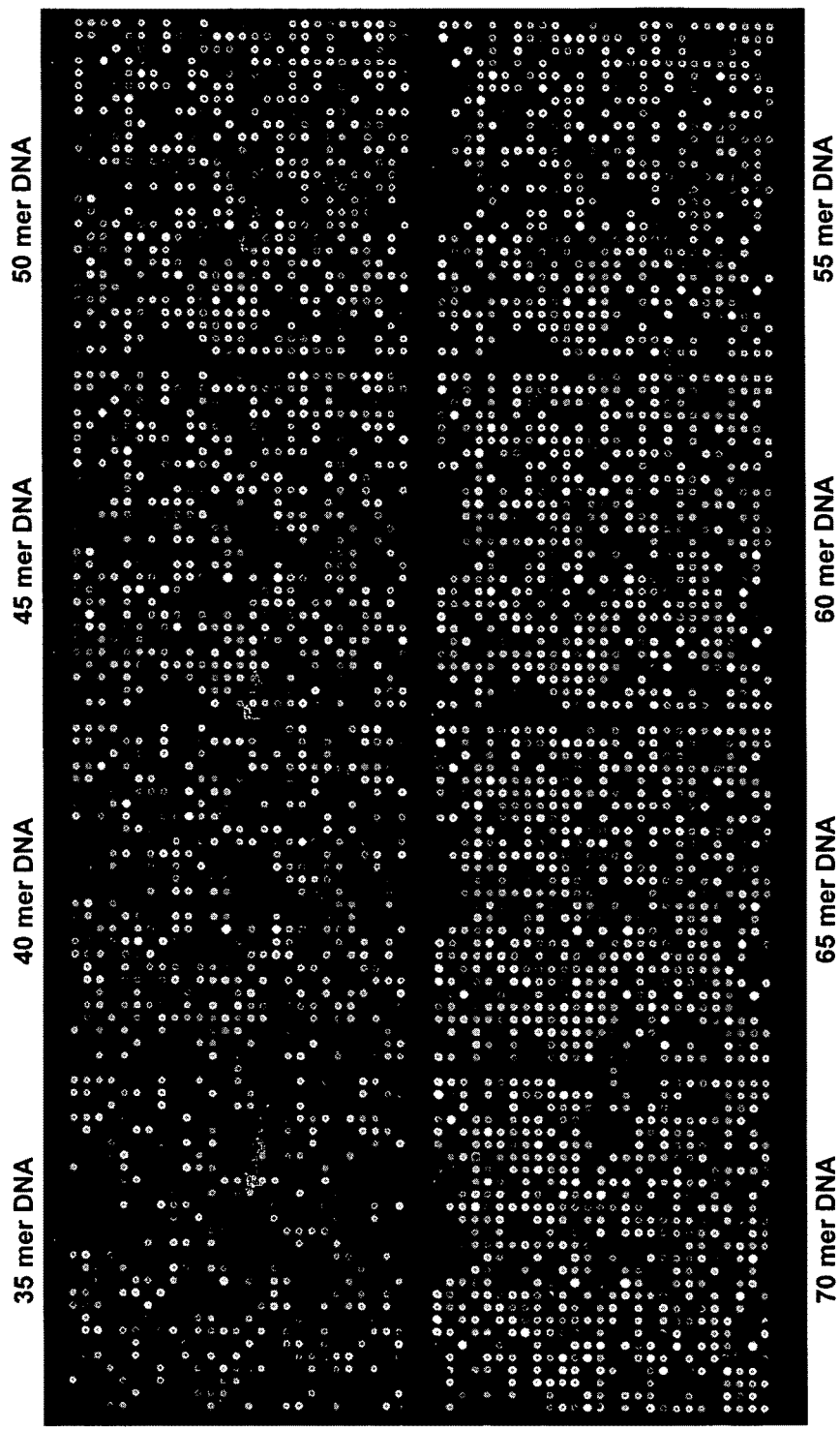
Figure 28:
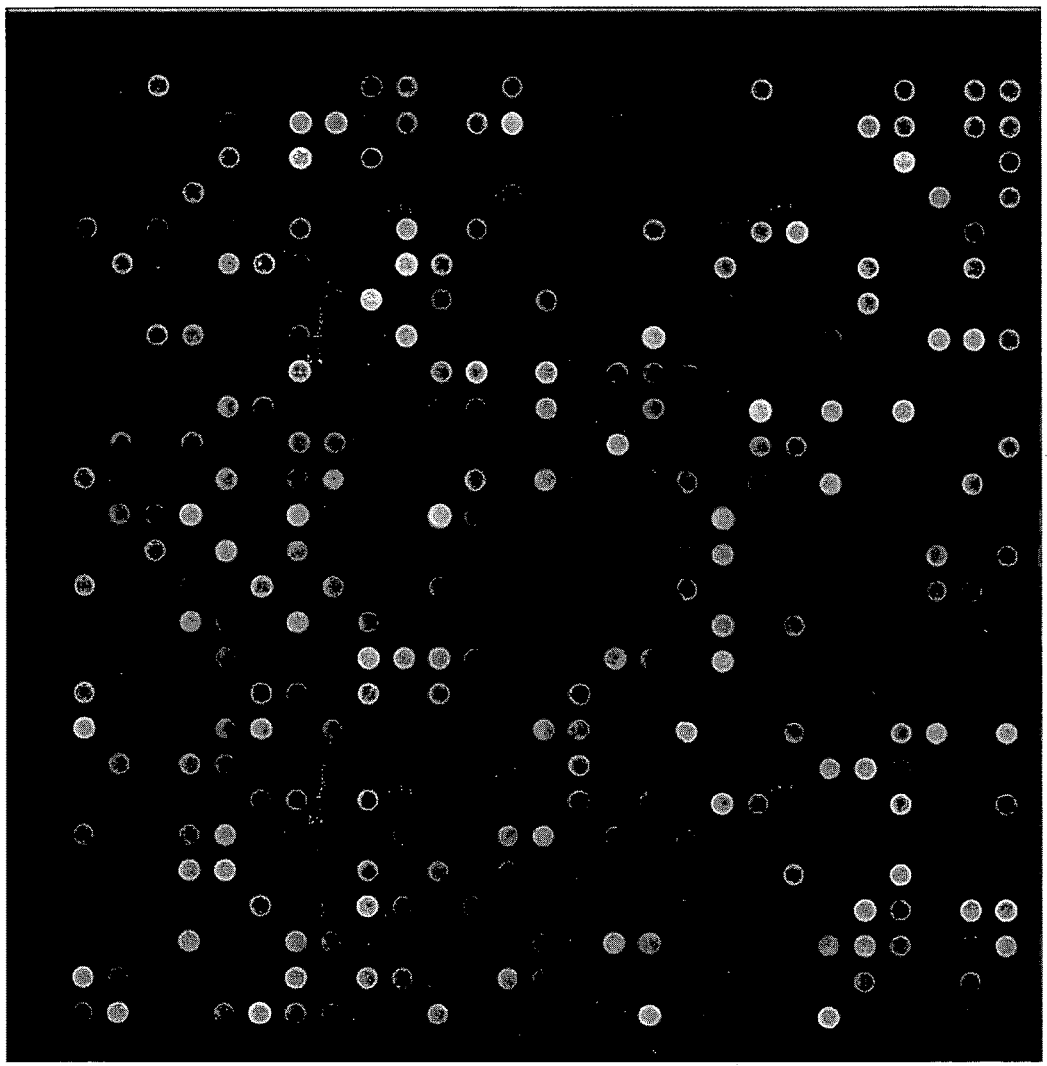
Figure 29:
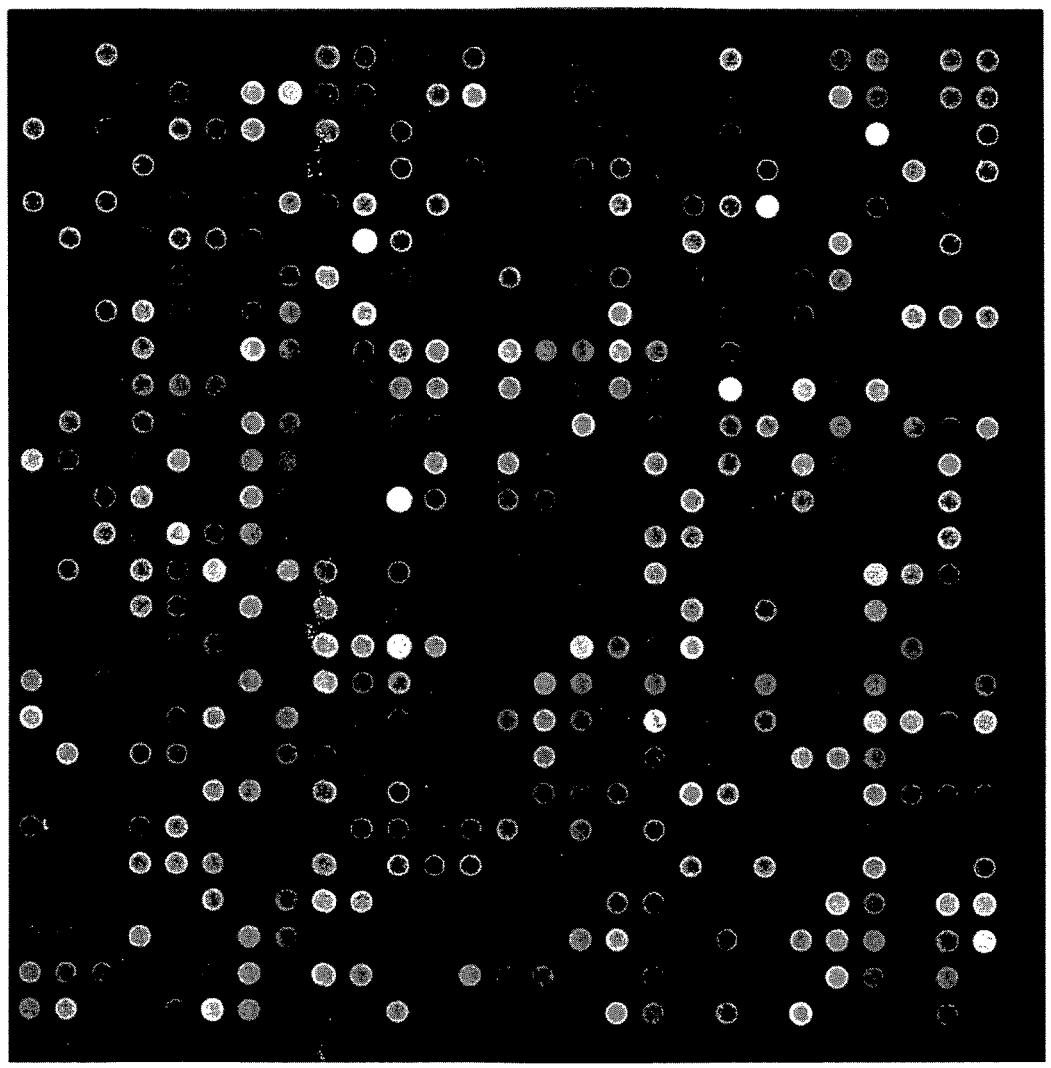
Figure 30:
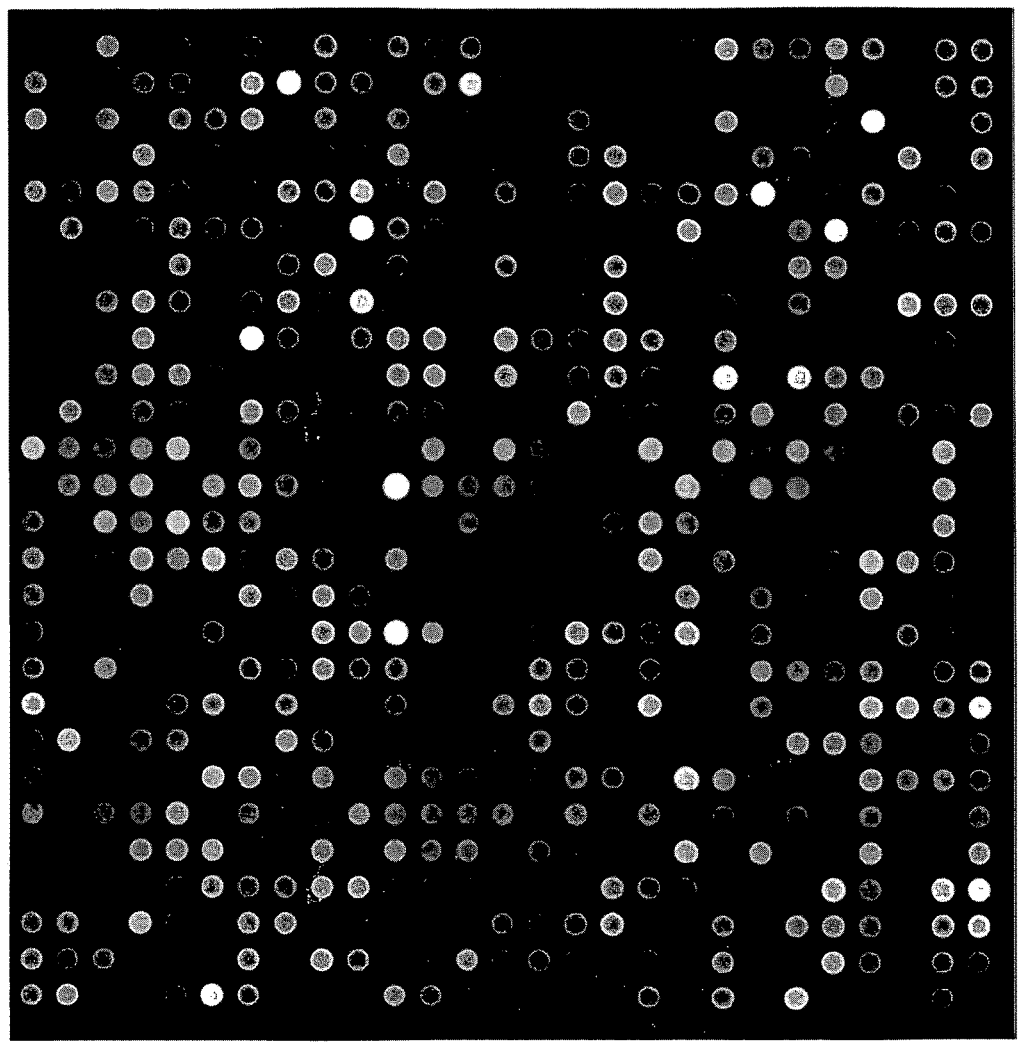
Figure 31:
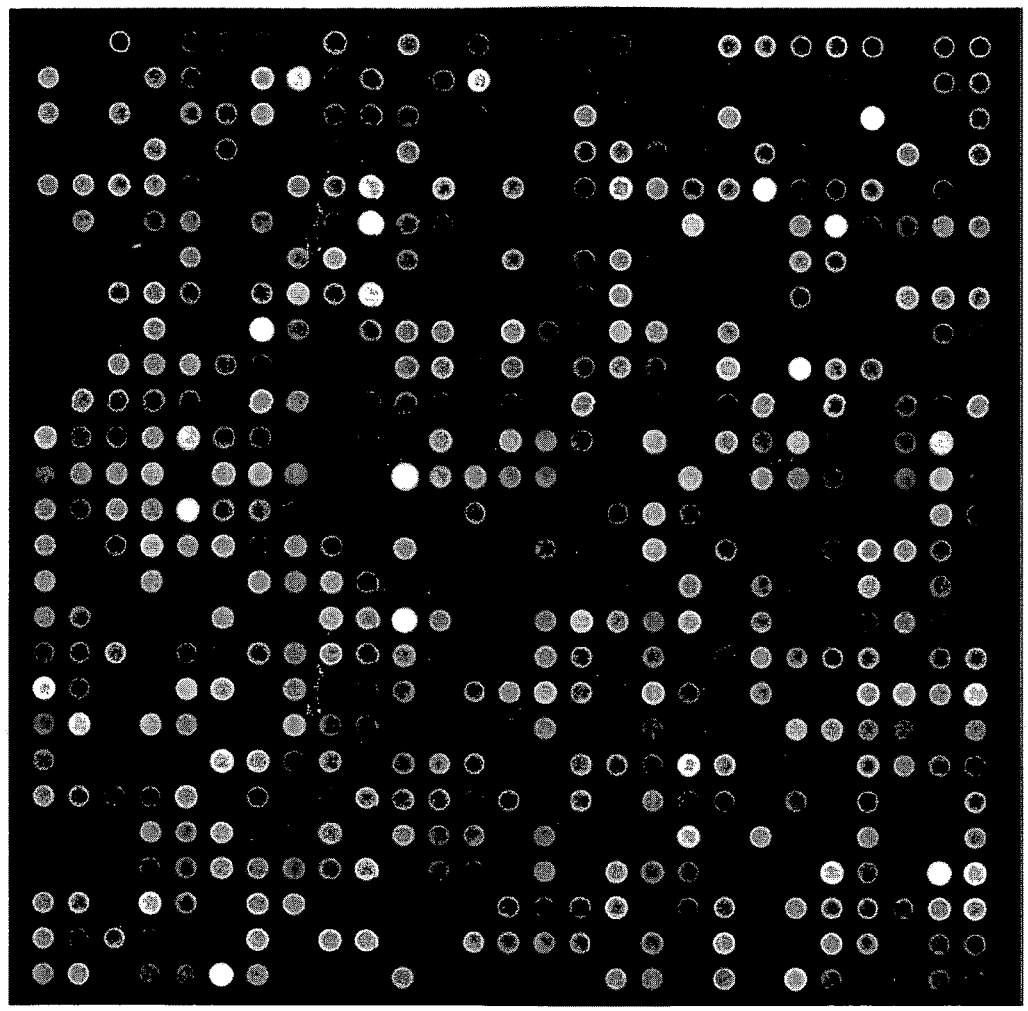
FIG. 31 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 50 mers.
Figure 32:
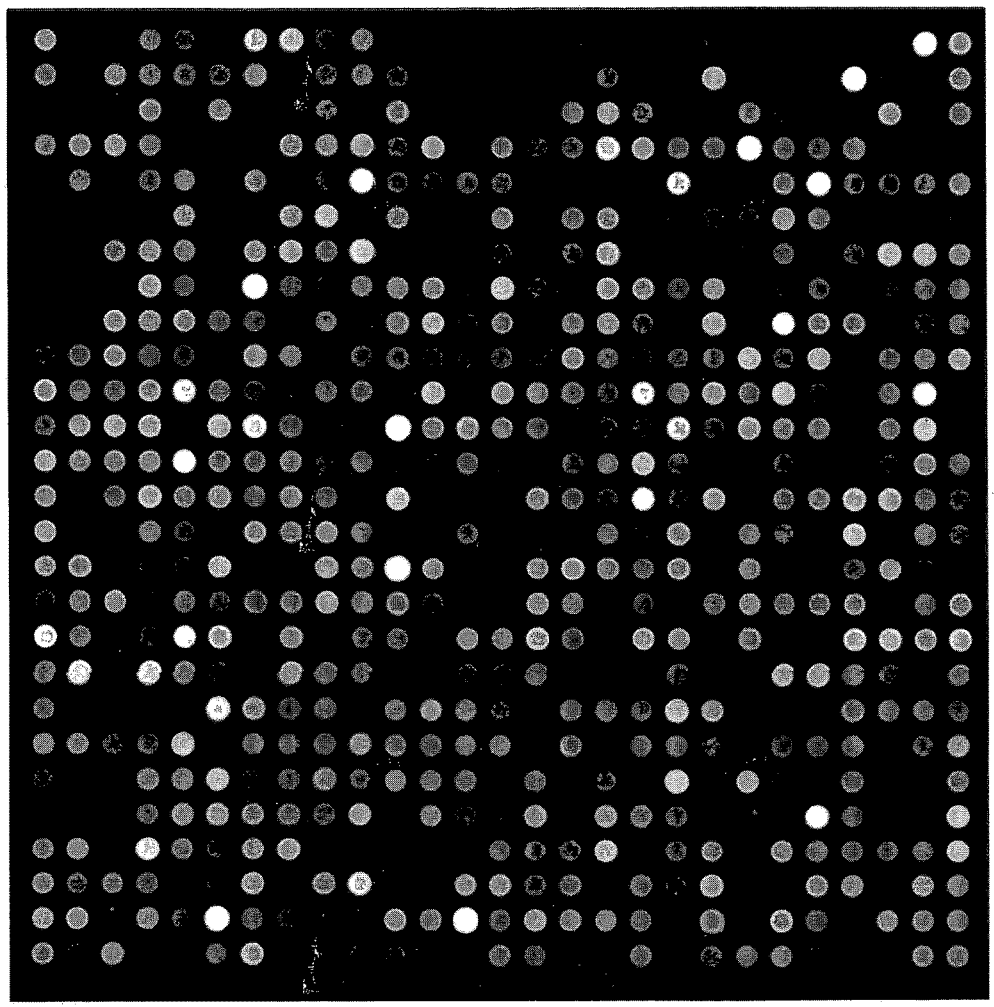
FIG. 32 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 55 mers.
Figure 33:
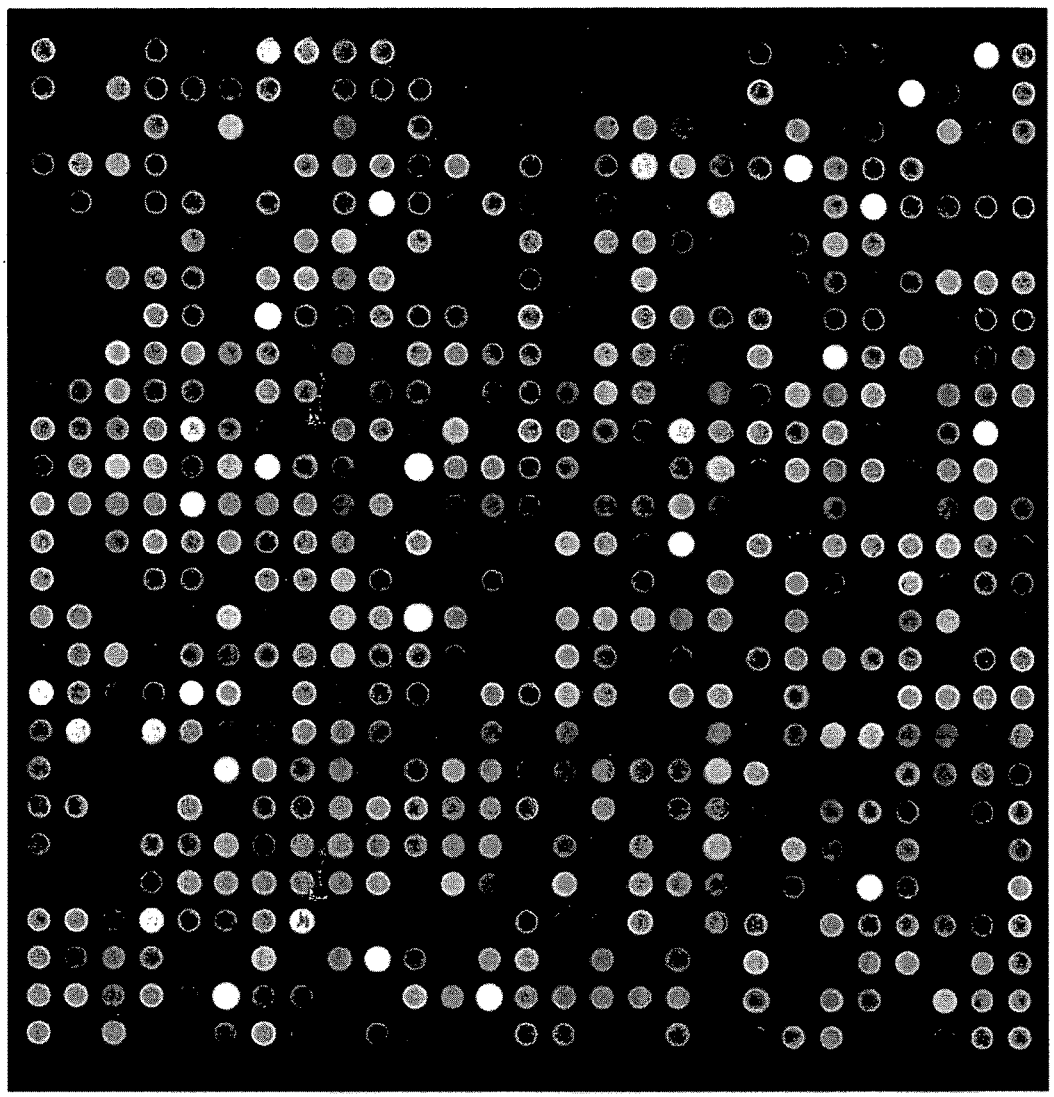
FIG. 33 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 60 mers.
Figure 34:
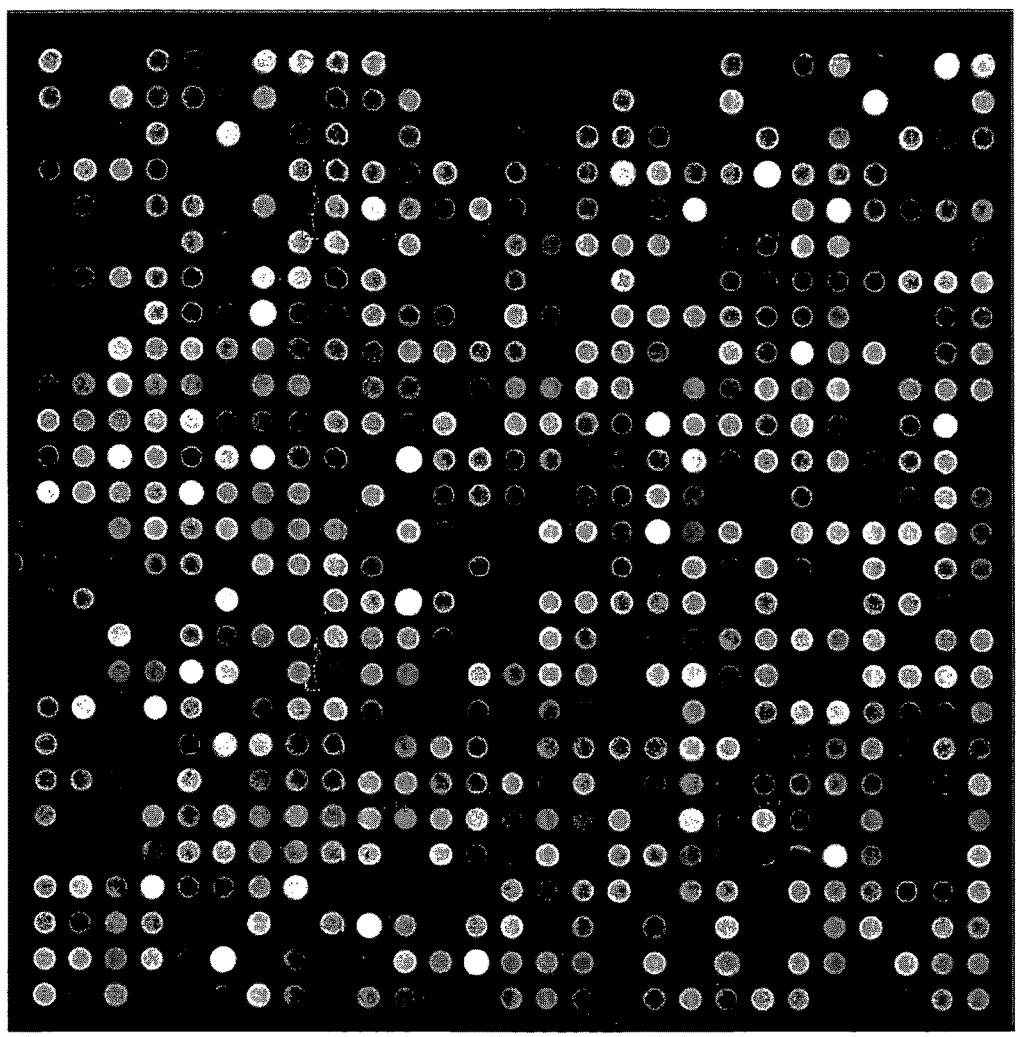
FIG. 34 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 65 mers.
Figure 35:
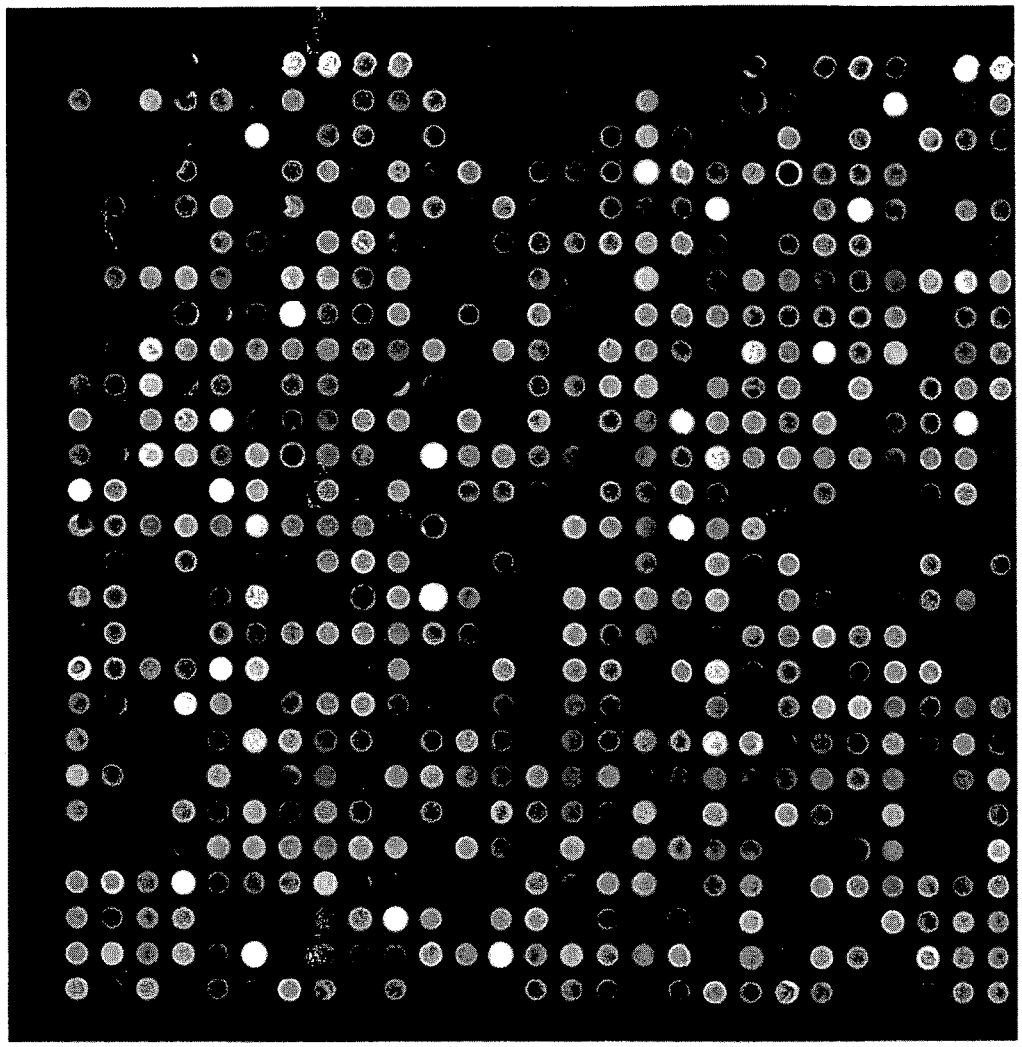
FIG. 35 is a photograph of a magnified portion of a top view of a microarray having a combination reaction layer, wherein the combination comprises sucrose and fructose. The lighter spots are fluorescence of fluorescently labeled nucleotides that were hybridized with the array after in situ synthesis of DNA oligos. The oligomers have a length of 70 mers.

In FIGS. 27 through 35, sucrose was blended with other saccharides to form an adsorbed porous reaction layer. The solution having the blend contained 50 mM of sucrose, 100 mM of fructose, and 100 mM of glucose. Oligonucleotides were synthesized with lengths of 35, 40, 45, 50, 55, 60, 65, and 70 mers on different quadrants of the microarray. FIG. 27 shows a section of a microarray having each of the different length of DNA mers. FIGS. 28 through 35 show a larger magnification of each of the quadrants in FIG. 27. Synthesis quality was assessed by hybridization of a labeled random 9 mer (sequence: NNN NNN NNN, where N=A, G, C, or T). Without being bound by theory, a blend of monosaccharides and disaccharides used to form the adsorbed porous reaction layer is hypothesized to decrease the amount of DNA that is synthesized at each electrode. Furthermore, without being bound by theory, as the length of the oligo is increased, thus increasing the quantity of DNA made per spot, the DNA may be susceptible to sheer forces and may be coming off the electrode when sucrose is used by itself. Glucose and fructose provided lower density of DNA synthesis at each electrode. Thus, blending sucrose with glucose and fructose is thought to reduce the amount of DNA per electrode. Using a blend as provided in the present invention, the amount, as well as the spacing, between the DNA synthesized at each electrode is better controlled.

Figure 4:
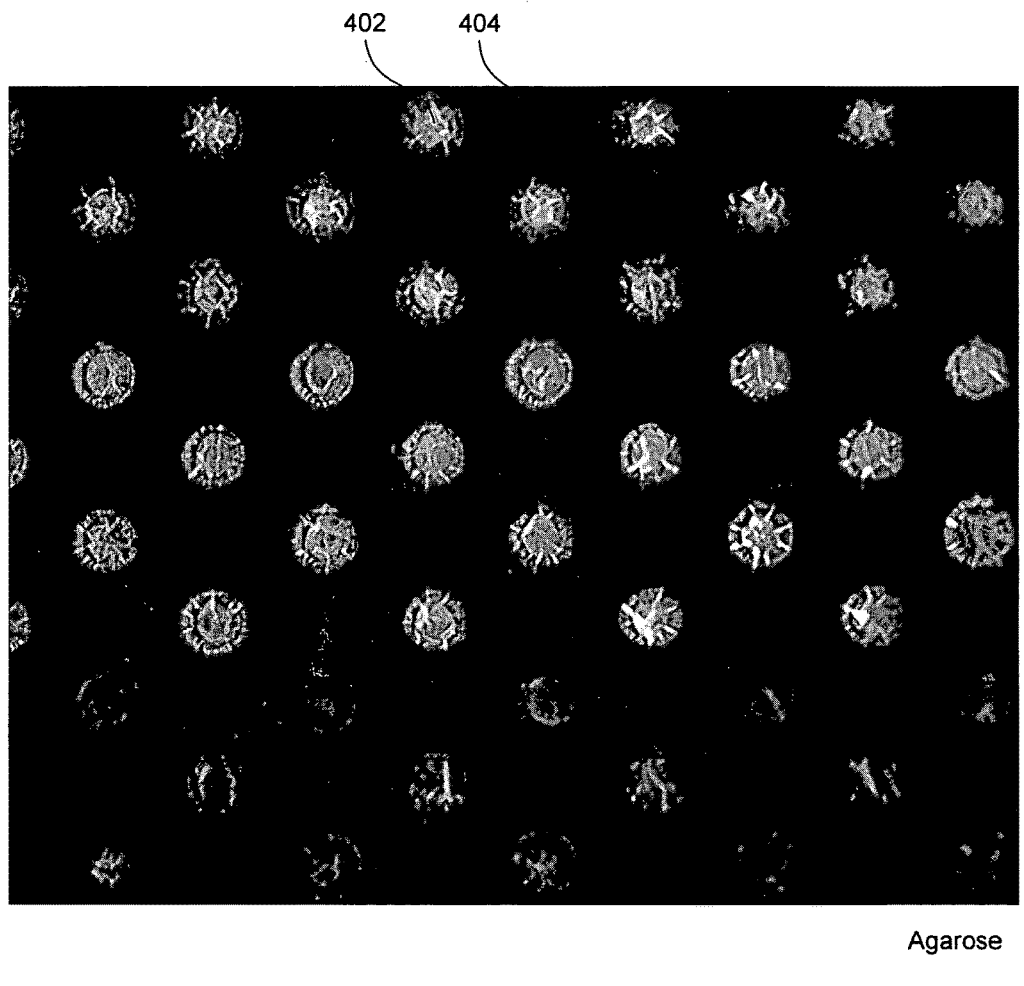
FIG. 4 is a photograph of a magnified portion of a top view of a microarray having agarose as a reaction layer. The lighter spots are fluorescence of fluorescently labeled nucleotides that were hybridized with the array after in situ synthesis of DNA oligos.

FIGS. 4 through 19, 25, 26, and 27 are magnified photographs of a top view of a portion of each microarray having a different adsorbed porous reaction layer. In FIG. 4, the reaction layer was agarose. Electrode 402 shows non-uniform fluorescence that indicated the synthesis was of low quality. The low quality may have been a result of a separation of the agarose away from the electrode. The synthesis was performed in a checkerboard pattern of on and off electrodes where electrode 404 was an electrode that was off. This result indicated that agarose is not that suitable for use as a reaction layer.

Figure 5:
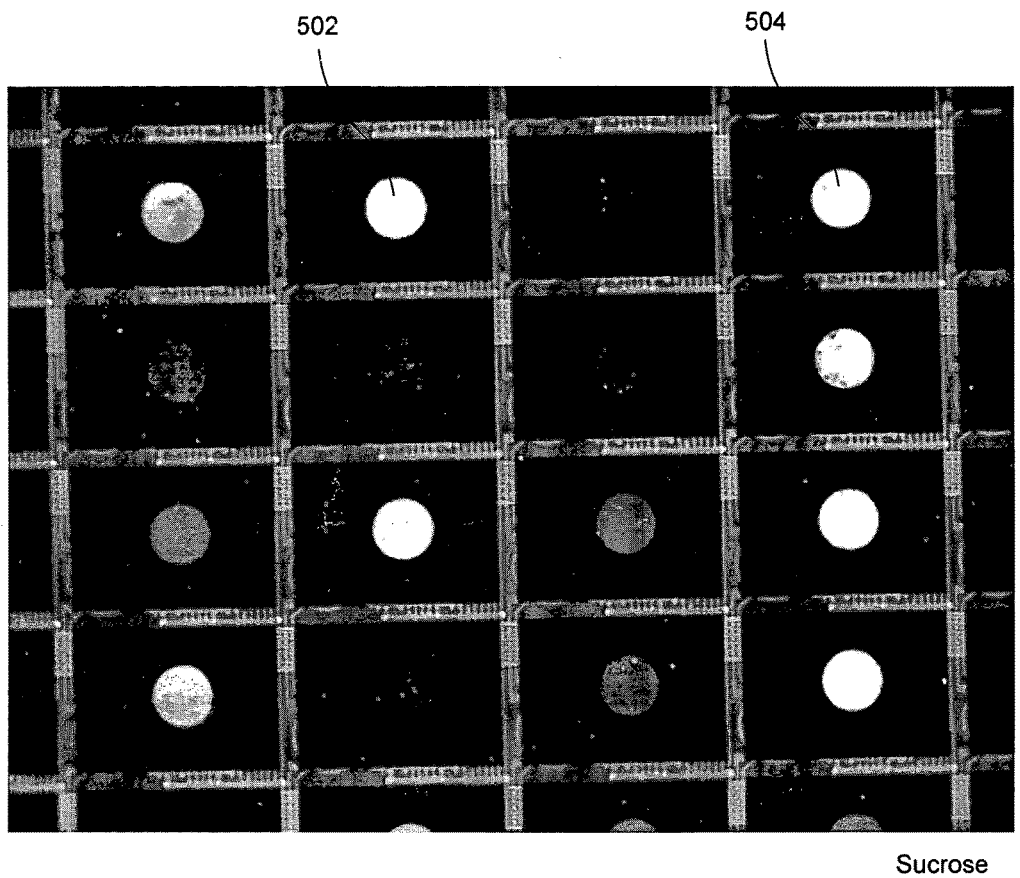
FIG. 5 is a photograph of a magnified portion of a top view of a microarray having sucrose as a reaction layer. The lighter spots are fluorescence of fluorescently labeled nucleotides that were hybridized with the array after in situ synthesis of DNA oligos.

In FIG. 5, the reaction layer was sucrose. Electrode 502 shows good uniformity across the electrodes of the fluorescence, which indicated a high quality synthesis and a stable reaction layer. At electrode 504, there is some amount of spotting; however, on the whole, sucrose worked well as a reaction layer.

Figure 6:
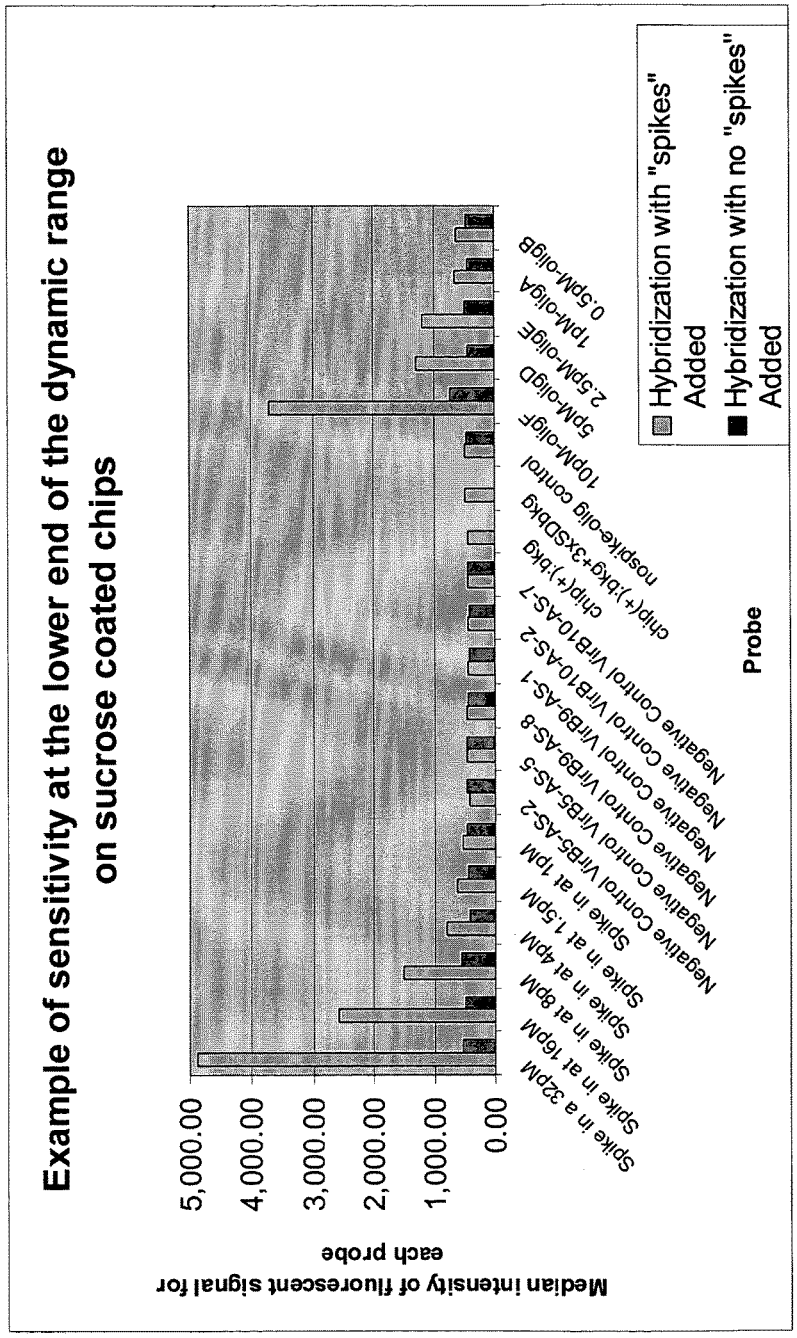
FIG. 6 is a bar chart displaying the results of a sensitivity study using sucrose as the reaction layer.

FIG. 6 shows the results of a sensitivity study on a sucrose reaction layer. Hybridization was done with and without transcript spike. Controls were done to ensure that the microarray was performing the synthesis as designed. Comparing the results of spiked to non-spiked samples, the microarray showed a sensitivity of approximately one picomolar when sucrose is used as the porous reaction layer.

Figure 7:
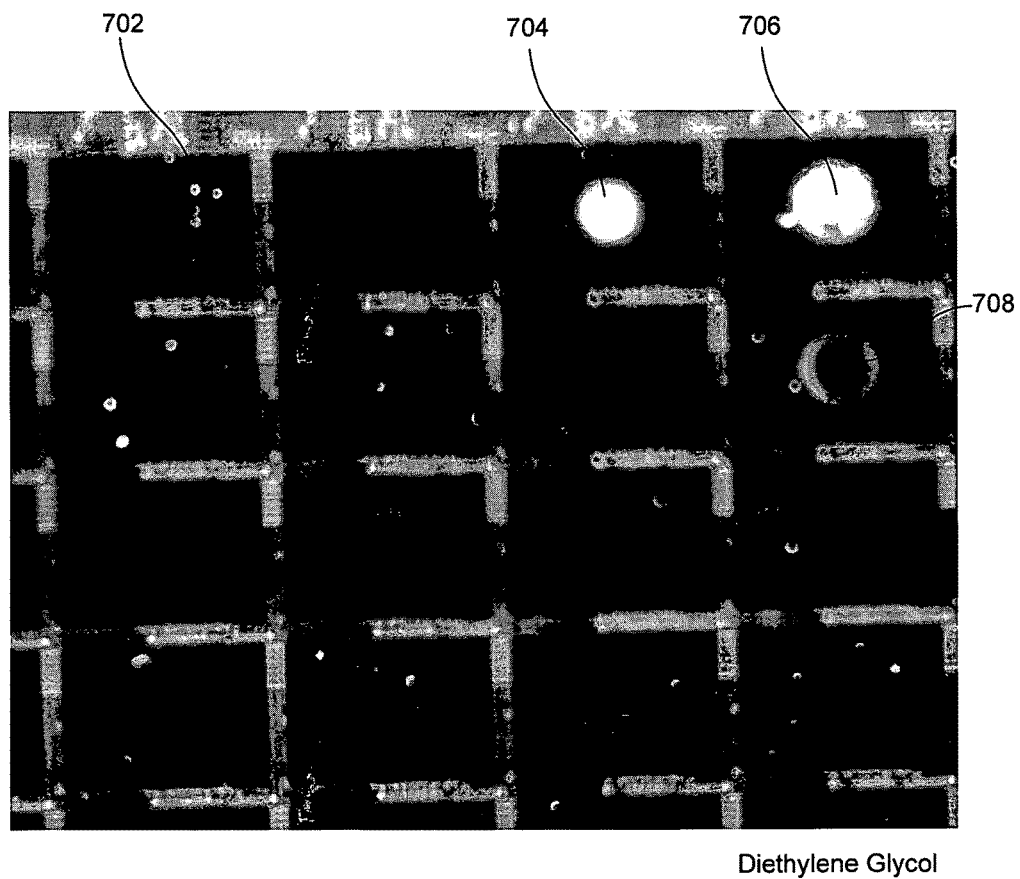
FIG. 7 is a photograph of a magnified portion of a top view of a microarray having diethylene glycol as a reaction layer. The lighter spots are fluorescence of fluorescently labeled nucleotides that were hybridized with the array after in situ synthesis of DNA oligos.
Figure 8:
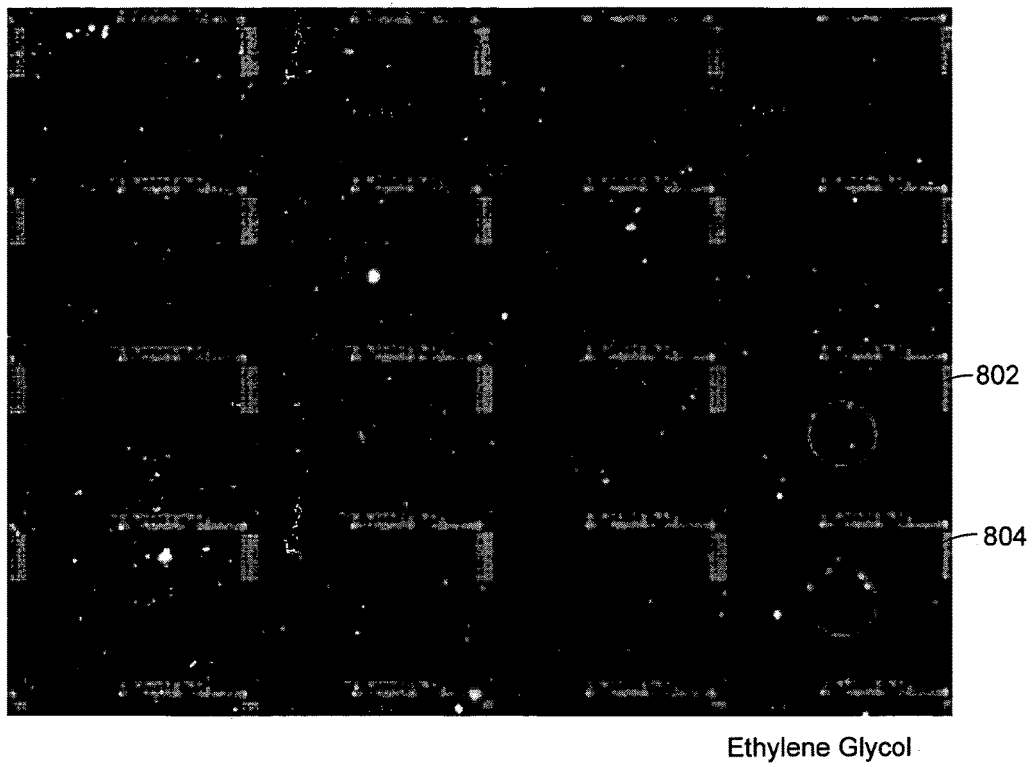
FIG. 8 is a photograph of a magnified portion of a top view of a microarray having ethylene glycol as a reaction layer. The lighter spots are fluorescence of fluorescently labeled nucleotides that were hybridized with the array after in situ synthesis of DNA oligos.

In FIG. 7, the reaction layer is diethylene glycol. Electrodes 704, 706, 708 show uniformity problems and loss of sharpness at the edge of the electrodes. Moreover, there were considerable random spotting 702. In FIG. 8, the reaction layer is ethylene glycol. Electrodes 802 and 804 showed some indication of synthesis; however, the overall quality was very low owing to the lack of synthesis and considerable amount of random spotting. In FIG. 9, the reaction layer is N-hydroxysuccinamide. Electrode 904 showed acceptable uniformity and sharpness at the edge of the electrode. However, electrodes 902 and 906 showed some random spotting. In FIG. 10, the reaction layer is triethylene glycol. Electrode 1002 showed good quality. Electrode 1004 showed some spotting. Electrode 1006 showed some halo effect where the middle part of the electrode showed a loss of fluorescence, which may indicate a loss of reaction layer.

Figure 12:
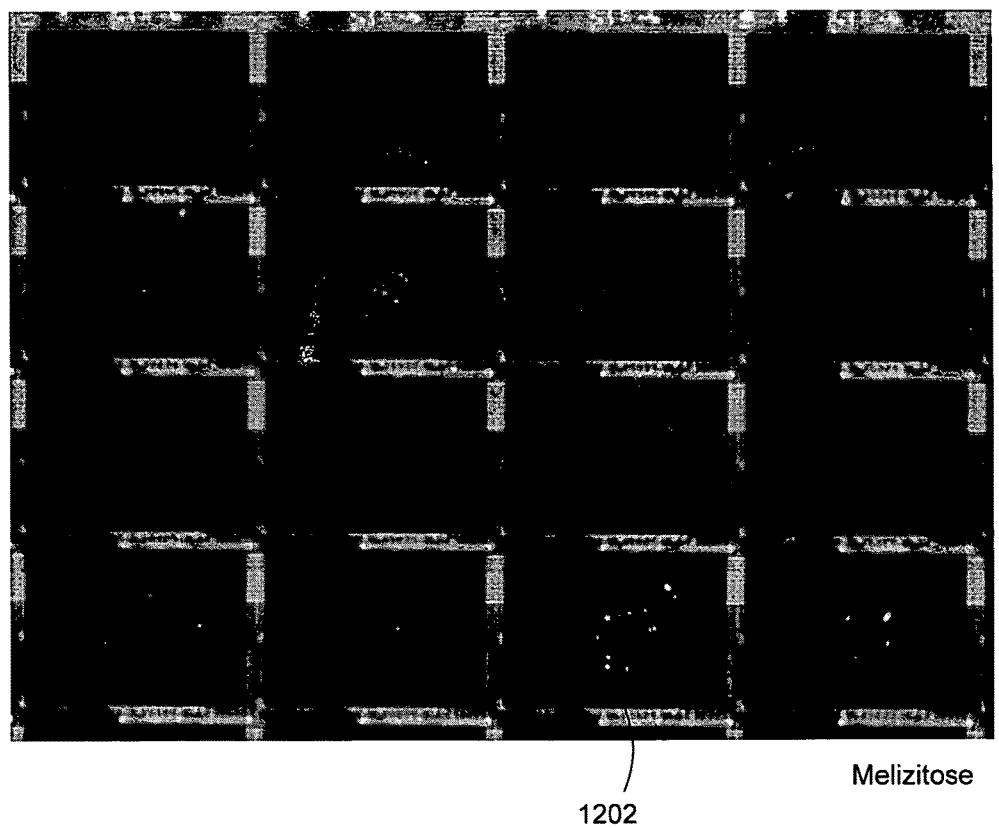
FIG. 12 is a photograph of a magnified portion of a top view of a microarray having melizitose as a reaction layer. The lighter spots are fluorescence of fluorescently labeled nucleotides that were hybridized with the array after in situ synthesis of DNA oligos.
Figure 13:
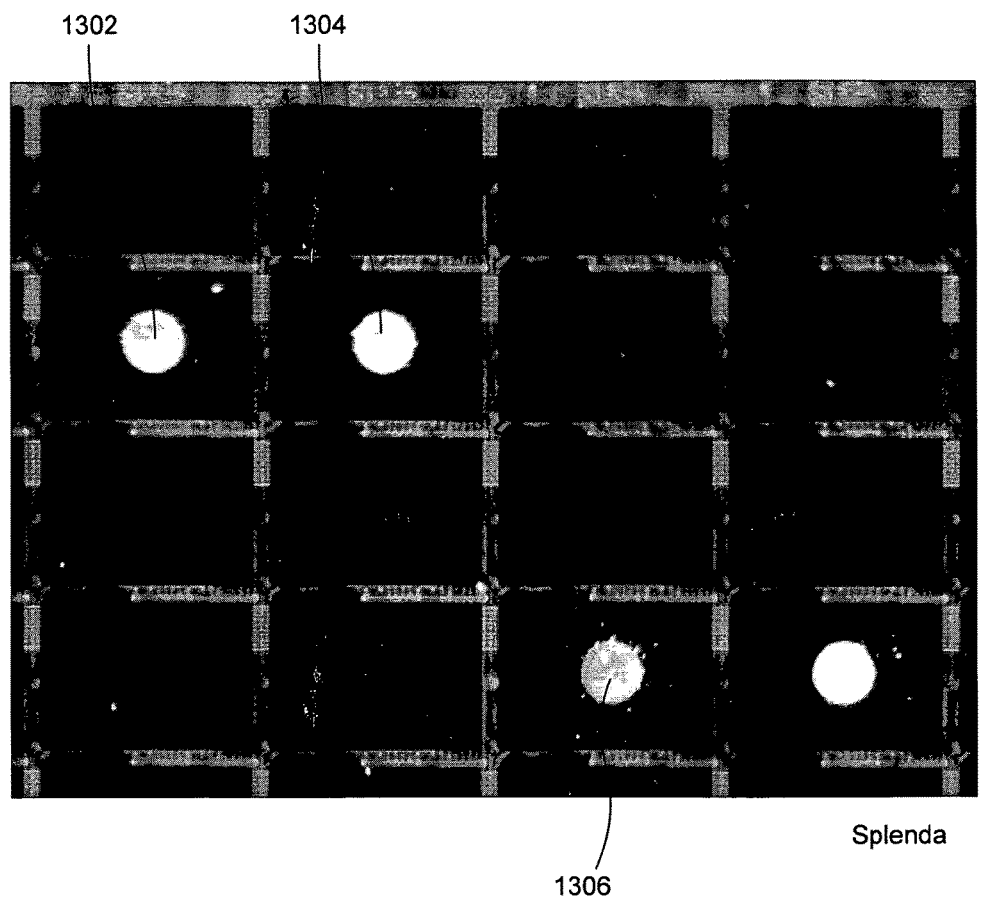
FIG. 13 is a photograph of a magnified portion of a top view of a microarray having Splenda® as a reaction layer. The lighter spots are fluorescence of fluorescently labeled nucleotides that were hybridized with the array after in situ synthesis of DNA oligos.
Figure 14:
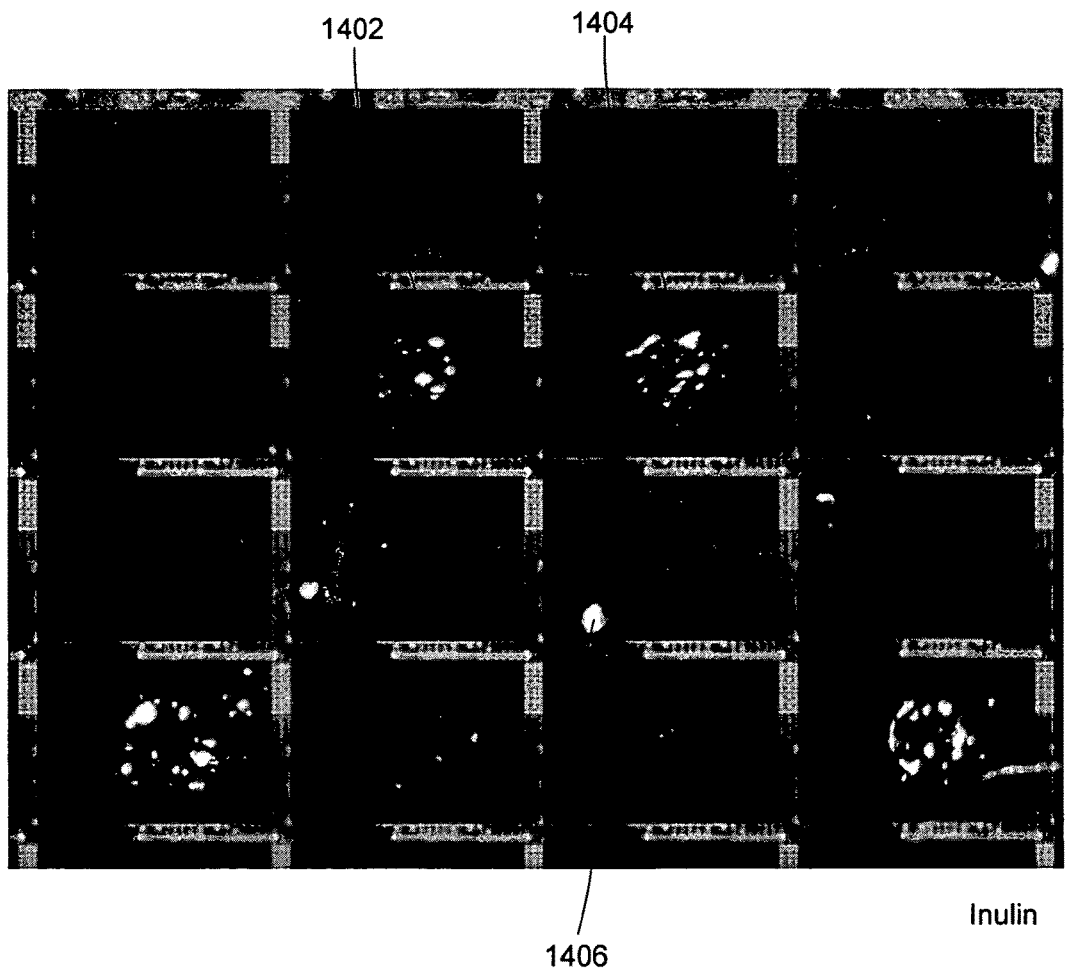
FIG. 14 is a photograph of a magnified portion of a top view of a microarray having inulin as a reaction layer. The lighter spots are fluorescence of fluorescently labeled nucleotides that were hybridized with the array after in situ synthesis of DNA oligos.

In FIG. 11, the reaction layer is raffinose. Although synthesis occurred, electrodes 1102, 1104, and 1106 showed a fair amount of non-uniformity and random spotting. In FIG. 12, the reaction layer is melizitose. There was little, if any, indication of synthesis at electrode 1202. There was some random spotting. In FIG. 13, the reaction layer is Splenda®, a modified sucrose. Uniformity was fairly good as shown at electrodes 1302 and 1304. Electrode 1306 showed some non-uniformity and random spotting. In FIG. 14, the reaction layer is inulin, a fructose oligomer. Electrodes 1402 and 1404 indicated spotting synthesis. There was considerable random spotting as indicated by feature 1406.

Figure 15:
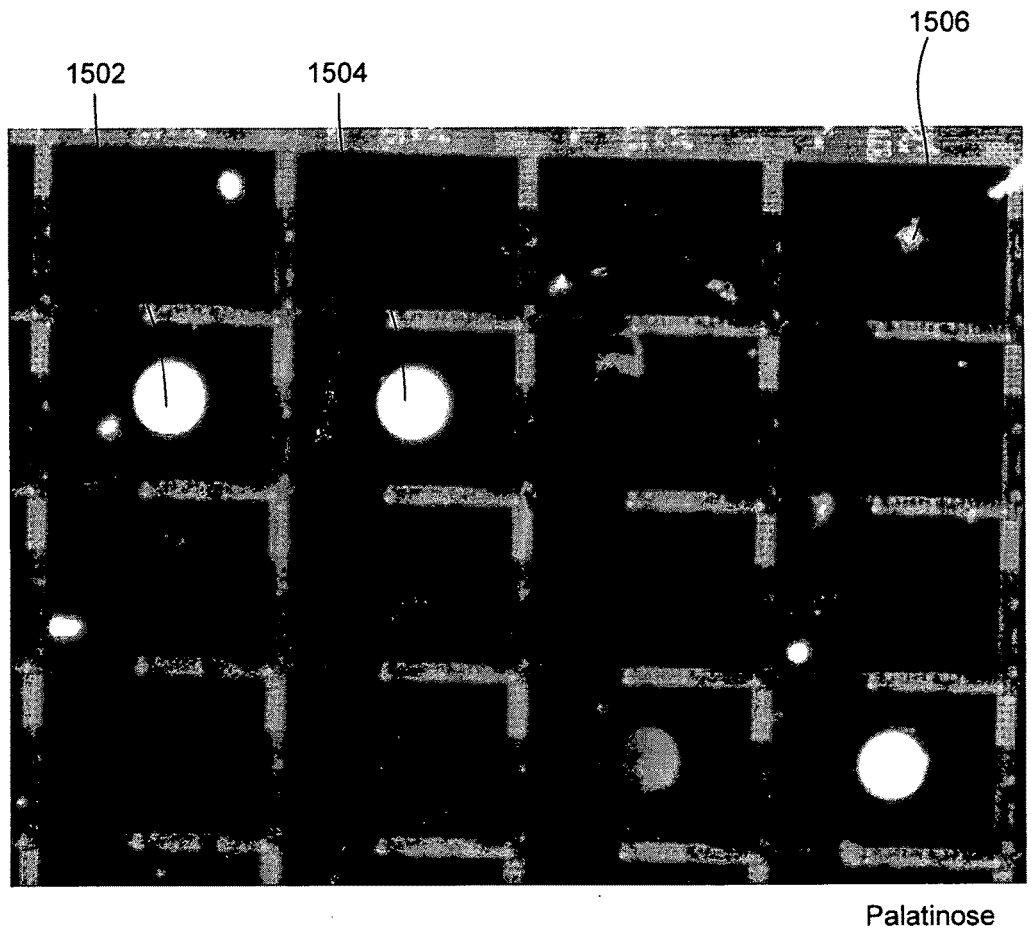
FIG. 15 is a photograph of a magnified portion of a top view of a microarray having palatinose as a reaction layer. The lighter spots are fluorescence of fluorescently labeled nucleotides that were hybridized with the array after in situ synthesis of DNA oligos.
Figure 16:
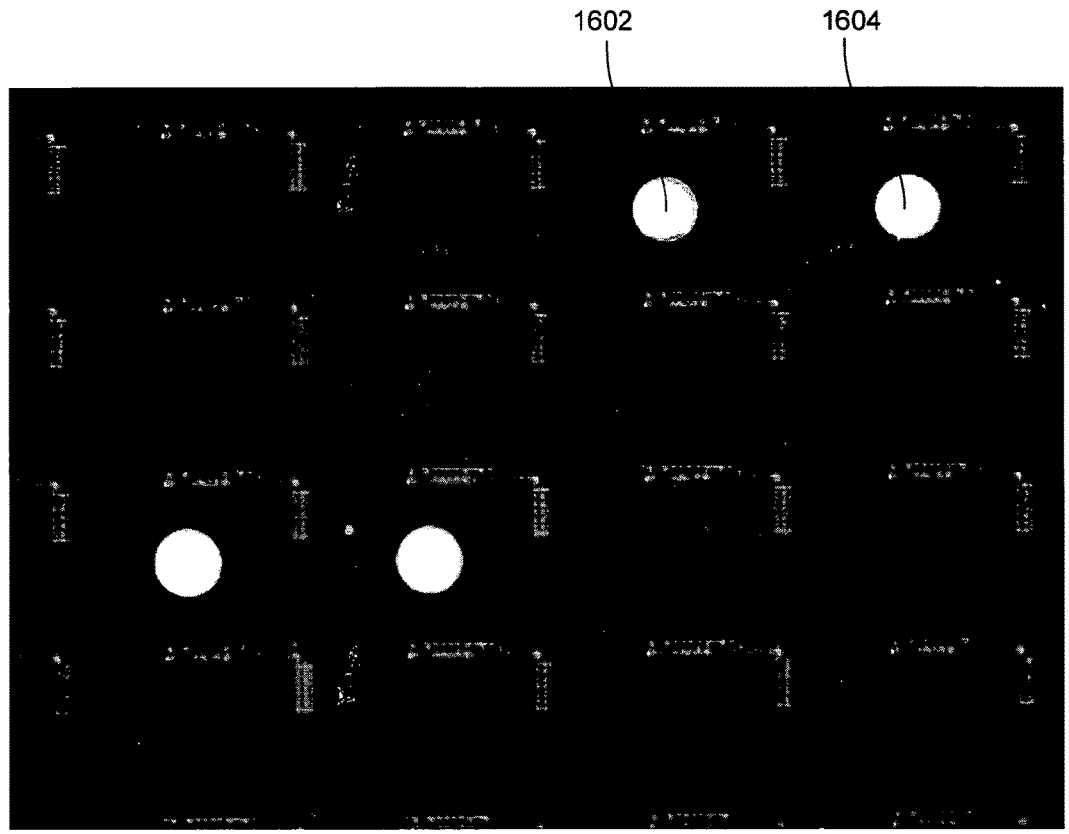
FIG. 16 is a photograph of a magnified portion of a top view of a microarray having polyethylene glycol as a reaction layer. The lighter spots are fluorescence of fluorescently labeled nucleotides that were hybridized with the array after in situ synthesis of DNA oligos.
Figure 17:
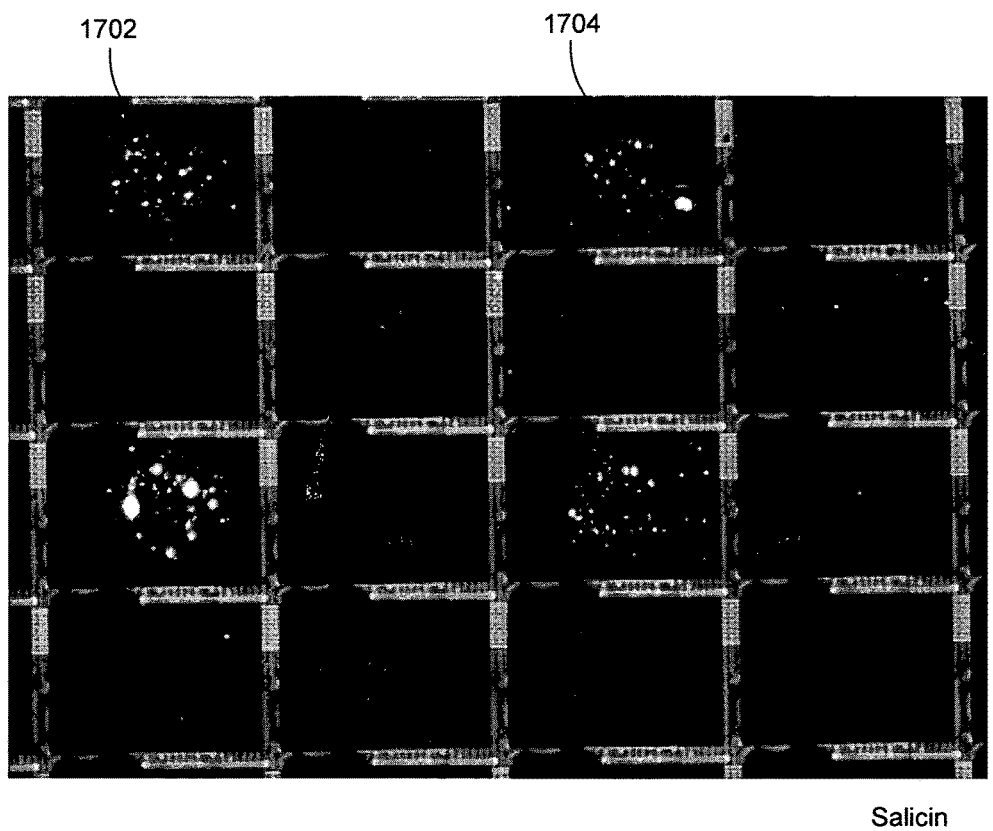
FIG. 17 is a photograph of a magnified portion of a top view of a microarray having salicin as a reaction layer. The lighter spots are fluorescence of fluorescently labeled nucleotides that were hybridized with the array after in situ synthesis of DNA oligos.
Figure 18:
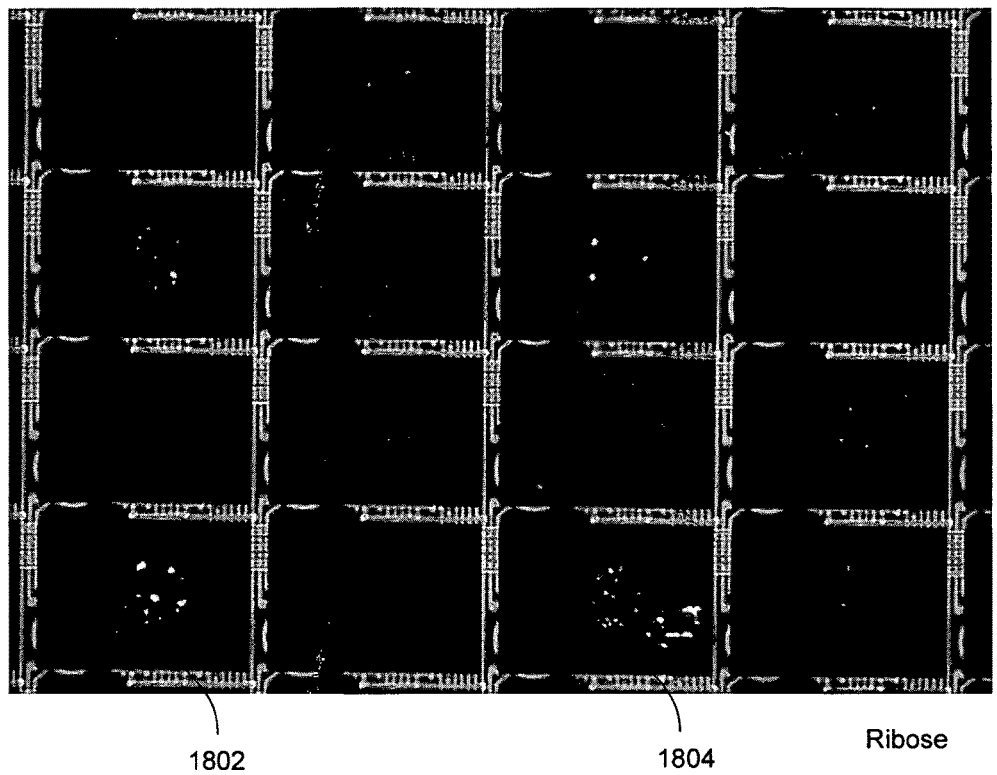
FIG. 18 is a photograph of a magnified portion of a top view of a microarray having ribose as a reaction layer. The lighter spots are fluorescence of fluorescently labeled nucleotides that were hybridized with the array after in situ synthesis of DNA oligos.
Figure 19:
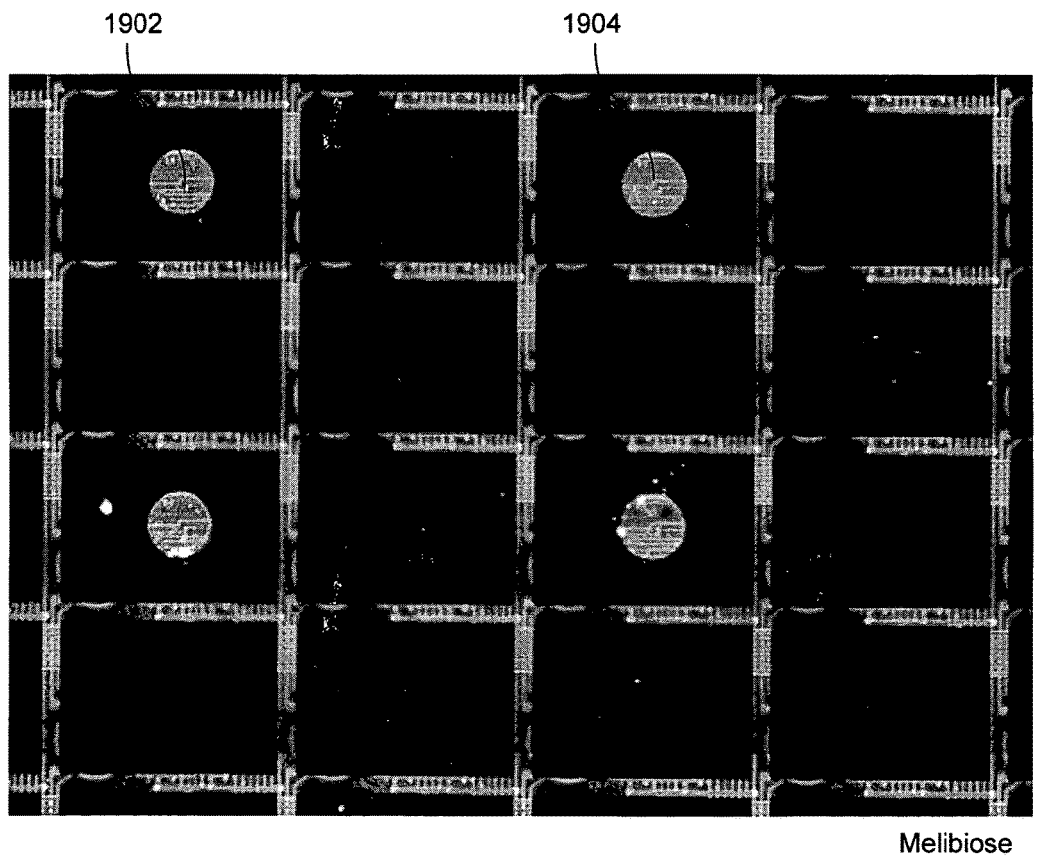
FIG. 19 is a photograph of a magnified portion of a top view of a microarray having melibiose as a reaction layer. The lighter spots are fluorescence of fluorescently labeled nucleotides that were hybridized with the array after in situ synthesis of DNA oligos.

In FIG. 15, the reaction layer is palatinose. Electrodes 1502 and 1504 showed good uniformity and edge sharpness. Feature 1506 showed that there is some random spotting. In FIG. 16, the reaction layer is polyethylene glycol having a molecular weight of approximately 8000 daltons. Electrodes 1602 and 1604 showed very good uniformity and edge sharpness. Additionally, there was minimal random spotting. In FIG. 17, the reaction layer is salicin. Electrodes 1702 and 1704 showed very spotty and non-uniform synthesis. In FIG. 18, the reaction layer is ribose. Electrodes 1802 and 1804 showed minimal spotty synthesis. There was some random spotting. In FIG. 19, the reaction layer is melibiose. Electrodes 1902 and 1904 showed non-uniform synthesis.

Figure 25:
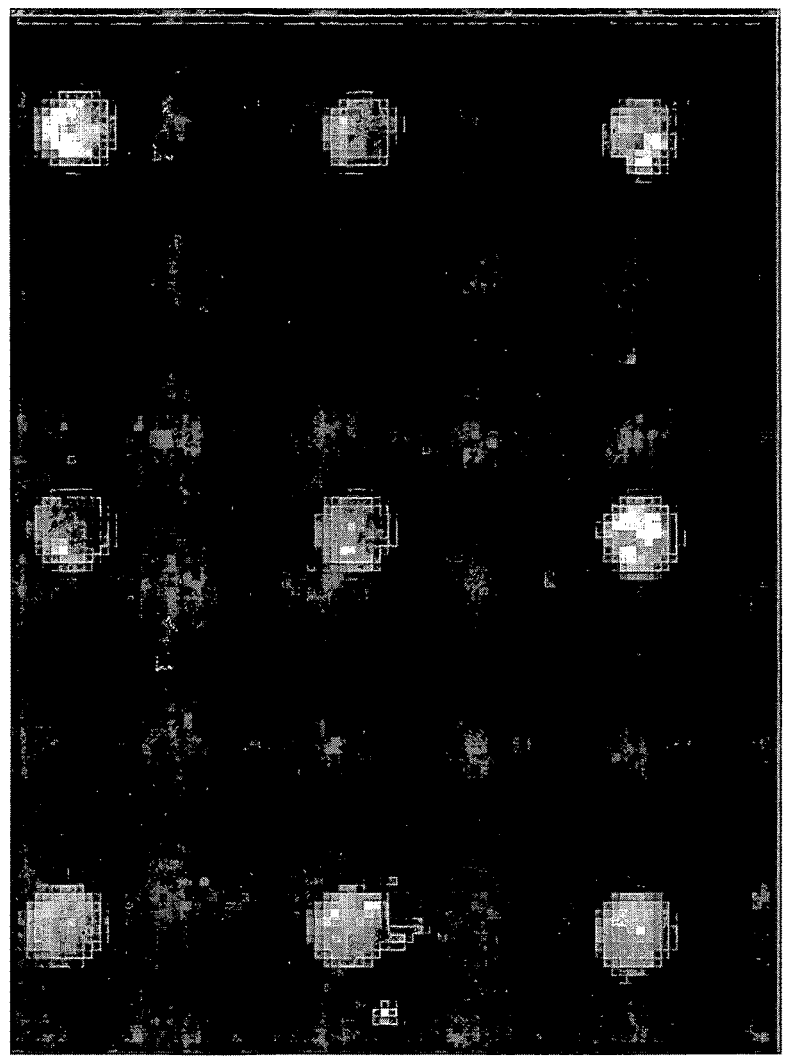
Figure 26:
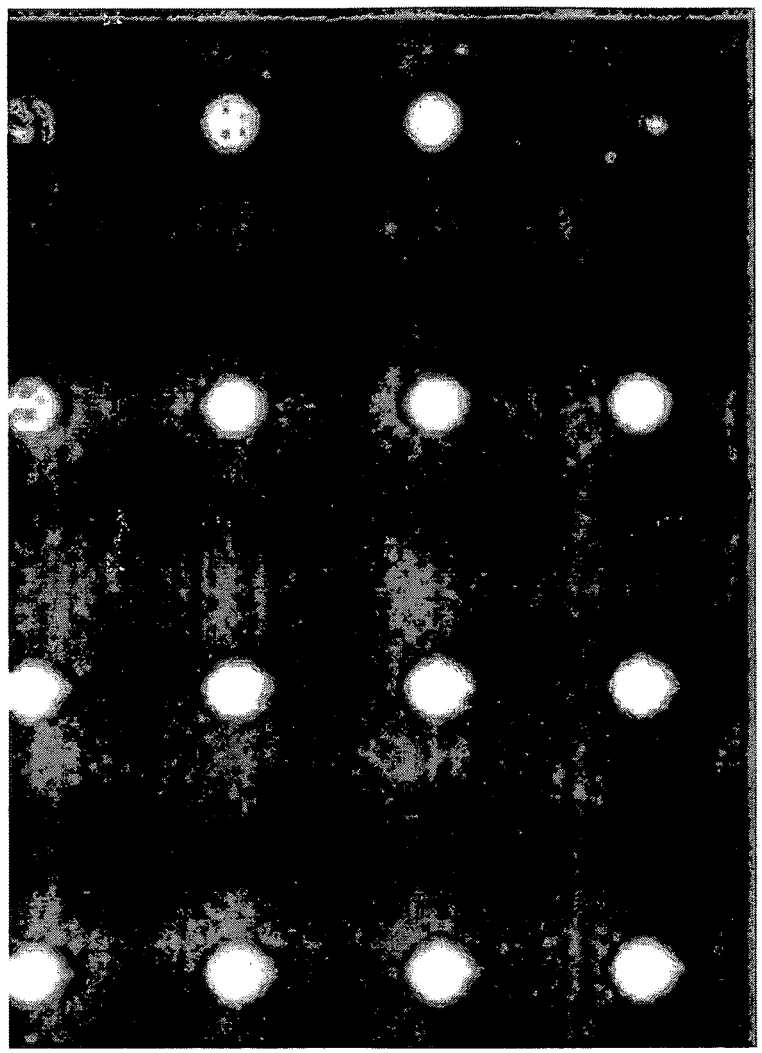

In FIG. 25, the reaction layer is 1-(3-hydroxylpropyl) pyrrole. The electrodes showed a fairly uniform synthesis, indicating 1-(3-hydroxylpropyl) pyrrole as a good candidate for uses as an adsorbed porous reaction layer. In FIG. 26, the reaction layer is 1-hexylpyrrole. The electrodes showed a fairly uniform synthesis, indicating 1-hexylpyrrole as a good candidate for uses as an adsorbed porous reaction layer. FIG. 27 is a photograph of a magnified portion of a top view of a microarray having a combination reaction layer, wherein the combination comprises sucrose, fructose, and glucose. The lighter spots are fluorescence of fluorescently labeled nucleotides that were hybridized with the array after in situ synthesis of DNA oligos. The oligomers had a length of 35 to 70 mers. FIGS. 28 through 35 show each quadrant of FIG. 27.

Example 2

This example illustrates a peptide array with and without a combination linker and spacer that was synthesized on an electrode microarray of platinum electrodes having an absorbed porous reaction layer comprising sucrose. The combination linker and spacer was a 16 T unit synthesized in situ. After synthesis of the combination linker and spacer, the peptide array was synthesized in situ thereon. Fluorescent reagent was used to image the peptides, but the only image that could be seen was on the electrodes having the combination linker and spacer.

The electrode microarray used was a commercial microarray made by CombiMatrix Corporation (CUSTOMARRAY) (Dill et al., Anal. Chim. Acta 2001, 444:69, and Montgomery I, II, and III). The microarray consisted of a semiconductor silicon chip with an array of 1024 individually serially addressable 92-micrometer diameter platinum electrodes in a 16.times.64 pattern. Prior to using the microarray, the electrodes were coated with sucrose to allow covalent bonding of chemical species to the electrode via the adsorbed sucrose. The sucrose was adsorbed by exposing the platinum electrodes to a solution of sucrose in water followed by a water rinse to remove excess sucrose. The electrodes were set to a specified voltage via connection to a personal computer having appropriate control software. The software allowed control of each electrode on the microarray for electrochemical deblocking in the sequential synthesis of small molecules, oligomers, and polymers, including oligos and peptides.

Figure 22:
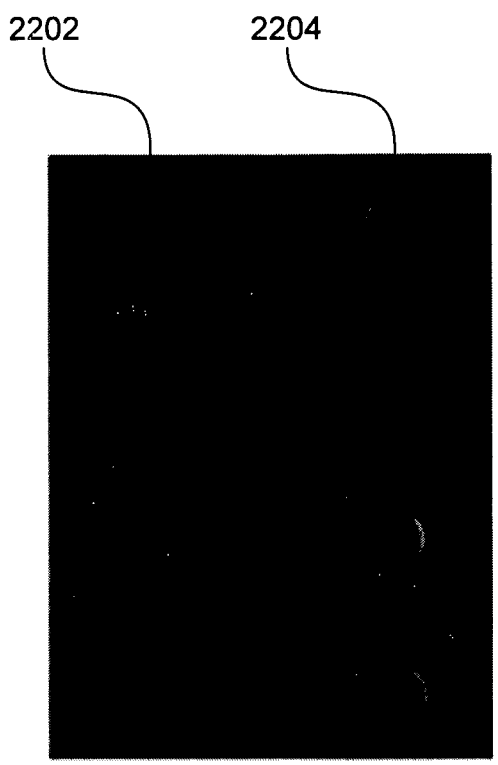

On four electrodes (FIG. 22), a 15-unit deoxythymidylate strand was synthesized using standard phosphoramidite chemistry. For the electrochemical deblocking steps, 1.8 volts was applied for 60 seconds using an acetonitrile/methanol deblocking solution. Following the deblocking of the 15$^{th}$ deoxythymidylate, a deoxythymidylate having a 5' aminoethoxyethyl modifier was attached to electrodes having the 15 deoxythymidylate units and attached to electrodes not having the 15 deoxythymidylate units (FIG. 22). A modified deoxythymidylate can be obtained from Glen Research, Inc. The microarray was then fully deprotected using standard chemical deblocking instead of electrochemical deblocking.

Chemical deblocking was accomplished by exposing the microarray to a one to one solution of ethylene diamine and ethanol for one hour at 65.degree. C. and then exposing to Deblock™ (Burdick and Jackson) for 30 minutes at room temperature. Leucine (L) was coupled to eight electrodes. The microarray was exposed to a solution containing t-BOC protected L (120 milligrams, 0.52 millimoles), O-benzotriazol-1-yl-N,N,N',N'-tetramethyluronium hexafluorophosphate (190 milligrams, 0.50 millimoles)(HBTU), N-hydroxybenztriazole (67 milligrams, 0.50 millimoles)(HOBT), and diisopropylethylamine (261 microliter, 1.50 millimoles) (DIPEA) dissolved into one milliliter of N,N-dimethylformamide (DMF).

Following coupling of the leucine, the microarray was washed successively with DMF (one milliliter) and then methylene chloride (one milliliter). Following washing, the leucine-coupling step was repeated to ensure complete coverage of the electrodes with the t-BOC protected leucine. Following the second L couple step, the microarray was washed successively with DMF (one milliliter), methylene chloride (one milliliter), and then with ethanol to remove any residual DMF or methylene chloride. The microarray was then allowed to air dry.

Following drying, the microarray was covered with a solution of 1,2-diphenylhydrazine (200 milligrams, 1.1 millimoles) and tetrabutylammonium hexafluorophosphate (400 milligrams, 1.0 millimoles) dissolved in methylene chloride (10 milliliters). Using a computer control system, the eight selected electrodes were powered to make such electrodes the active electrodes to deblock the L on only the active electrodes. Deblocking removed the t-BOC protecting group from the L on the active electrodes. The active electrodes were held at 3.0 volts verses a platinum counter electrode for 60 seconds. After deblocking, the deblock solution was removed from the microarray. The microarray was rinsed with ethanol to remove any residual electrochemical deblocking solution and then allowed to air dry.

The synthesis process was repeated using a step pattern with t-BOC-phenylalanine-OH (F) (FIG. 22). Following this step, electrochemical deblocking was done. The synthesis process iterated through two rounds of boc-glycine-OH (G) followed by Boc-tyrosine (t-butyl)-OH (Y) to construct a peptide having LFGGY as its sequence as viewed by moving away from the solid surface. The peptide sequence is more commonly written as YGGFL (SEQ ID NO:2).

Once the microarray was constructed, instead of using electrochemical deblocking, the entire microarray was subjected to standard chemical deblocking using 40% trifluoroacetic acid (TFA) in methylene chloride (30 minutes) followed by 90% aqueous TFA (30 minutes). Following deblocking, the microarray was rinsed with ethanol and then blocked with acylated bovine serum albumin (ABSA) to eliminate background binding of antibody. The solution used for blocking contained two milligrams per milliliter of ABSA in 2.times.PBS and 0.05% TWEEN20™. The blocking reaction was allowed to proceed for 30 minutes. After blocking, the microarray was incubated with primary anti-beta-endorphin antibody. The antibody used was Clone 3-E7 (monoclonal, mouse) and was diluted by ¹⁄₁₀₀₀ using 2.times.PBS having 0.05% TWEEN20™ therein. The 2.times.PBS and TWEEN20™ were purchased from Chemicon International, Inc. The anti-beta-endorphin antibody will selectively adsorb on the electrodes having the peptide sequence YGGFL (SEQ ID NO:2) synthesized thereon. Following incubation, the microarray was exposed to Cy5™ labeled donkey anti-mouse antibody, which will selectively adsorb onto the anti-beta-endorphin antibody. The Cy5™ labeled donkey anti-mouse antibody was purchased from Integrated DNA Technologies. Finally, the microarray was imaged on an Array Works® Imager to locate the electrodes having Cy5™ labeled donkey anti-mouse.

Figure 20:
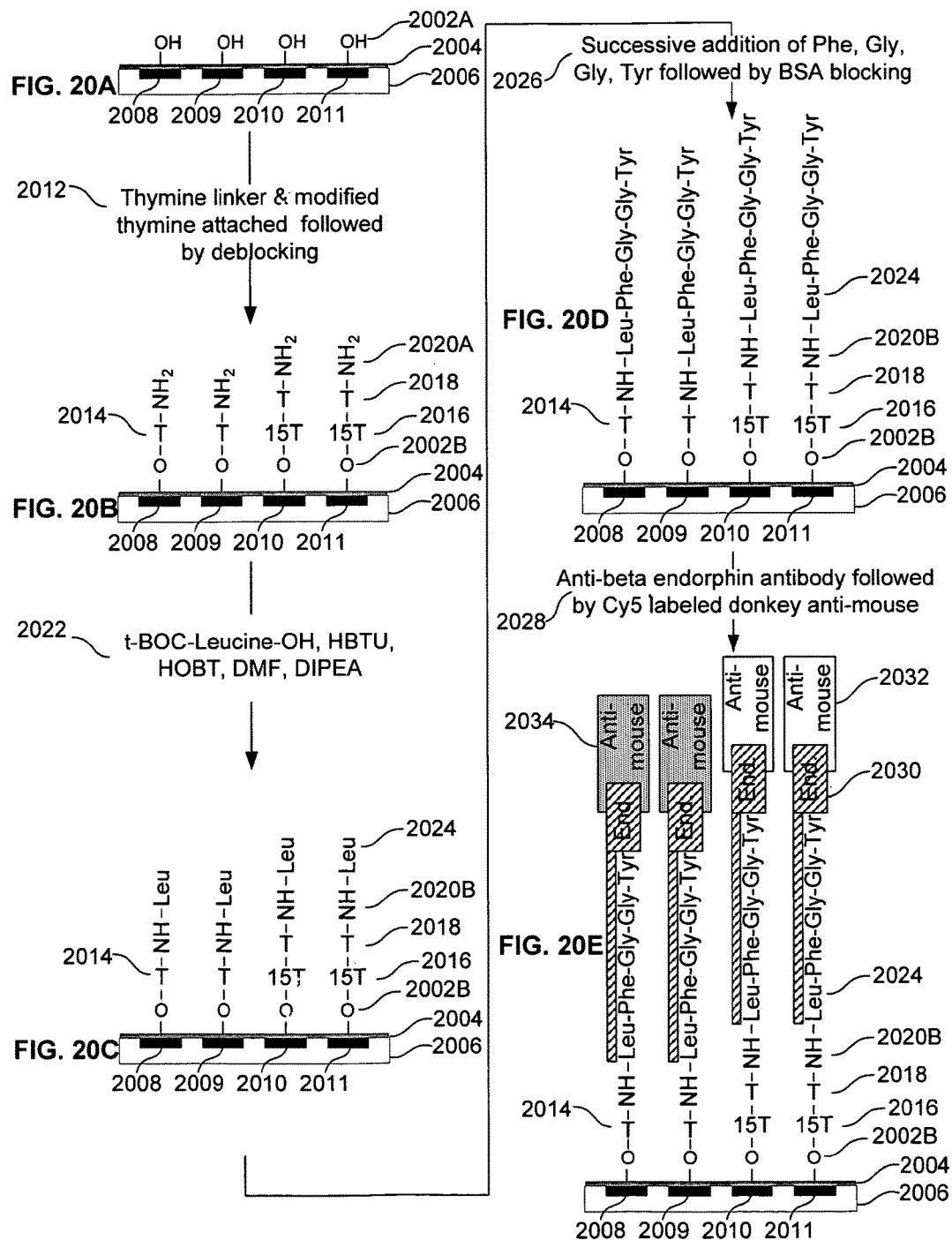

FIGS. 20A-20E are schematics of a cross-section of a microarray 2006 of four electrodes 2008, 2009, 2010, 2010 of a microarray of electrodes. A sequence of steps is shown for the synthesis of the combination linker and spacer 2016, 2018, 2020A, 2020B on two electrodes 2010, 2011 followed by peptide synthesis 2024 and labeling 2030, 2032, 2034. FIG. 20A is a schematic of the electrode microarray 2006 before synthesis. A coating 2004 is shown covering the microarray. The coating 2004 only covered the platinum electrodes 2008, 2009, 2010, 2011. The coating 2004 is shown having hydroxyl groups as the reactive groups 2002A. Other reactive groups may be used. For this experiment, the coating 2004 was an adsorbed layer of sucrose; therefore, the reactive groups were hydroxyl groups. Step 2012 was a sequence of steps for the attachment of the combination linker and spacer to two electrodes 2010, 2011 in FIG. 20B. Two electrodes 2008, 2009 are shown without the combination linker and spacer but having the reactive group changed to an amine 2020A by attachment of a modified T 2014, 2018 according to the above procedure. Step 2022 was the first step in building the peptide 2024 by adding L to the reactive amine groups 2020B as shown in FIG. 20C. Step 2026 was multiple steps for building the peptide chain 2024 as shown in FIG. 20D on all four electrodes 2008, 2009, 2010, 2011. Step 2028 is two steps for the adsorption of Clone 3-E7 antibody 2030 followed by adsorption of the Cy5™ labeled donkey anti-mouse 2032, 2034 according to the above procedure as shown in FIG. 20E. The Cy5™ labeled donkey anti-mouse 2034 on two electrodes 2008, 2009 is shown as shaded to indicate that the fluorescence is quenched by the platinum electrodes because the distance between the electrodes and the label is insufficient to prevent quenching. In contrast, Cy5™ labeled donkey anti-mouse 2032 on two electrodes 2010, 2011 is shown as not shaded to indicate that the fluorescence is visible because the combination linker and spacer provides sufficient distance between the label and the electrodes to prevent quenching. Although only one synthesis unit is shown per electrode, there were actually many units at each electrode; however, for illustration purposes, only one unit is shown.

Figure 21:
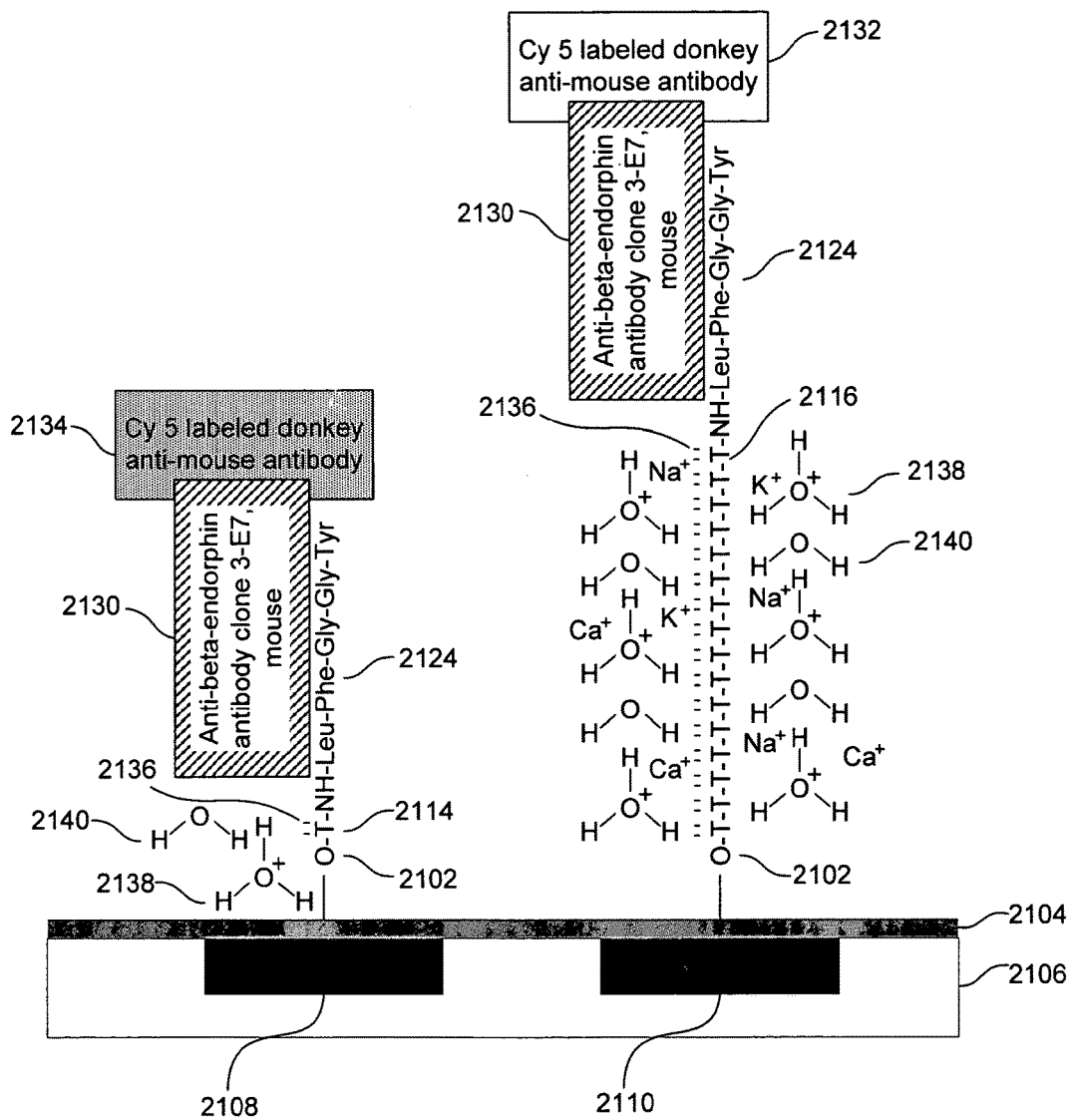

FIG. 21 is a schematic of two electrodes from FIG. 20E shown with and without the combination linker and spacer.

FIG. 21 shows a cross section of the electrode microarray 2106 showing two electrodes 2108, 2110 and having a coating 2104 having reactive hydroxyl groups 2102. The coating 2104 is sucrose and was present only on the platinum electrodes. FIG. 21 shows the effect of the combination linker and spacer 2116 on the distance between the Cy5 labeled donkey anti-mouse antibody 2132, 2134 and the platinum electrodes 2108, 2110 and the accompanying effect on preventing quenching. The fluorescence from the label 2134 on electrode 2108 was quenched whereas the fluorescence from the label 2132 on electrode 2110 was not quenched due to the further distance between the electrode 2110 and the label 2132. Additionally, the T units 2114, 2116 are shown have a negative charge 2136, which improved solvation in aqueous media 2140 having ions 2138. The negative counter ions are not shown. The ions shown are merely representative of any type of ion that may have been present in solution. The hydronium ion is shown to represent acidic species as a result of the dissociation of the phosphate OH groups on the T units.

FIG. 22 is a magnified photograph of the eight electrodes used in this example. The four electrodes 2202 did not have the combination linker and spacer and hence did not show any visible fluorescence from the Cy5 labeled donkey anti-mouse antibody because of platinum quenching. The four electrodes 2204 did have the combination linker and spacer and hence did show the fluorescence from the Cy5 labeled donkey anti-mouse antibody.

Example 3

An electrode microarray was prepared according to the procedures in Example 1 but with a series of linker/spacers of different lengths from 0 to 15 T units. In addition, after the first amino acid, leucine, was attached, no subsequent amino acids were attached. Instead, biotin was attached to the leucine at the locations having the different lengths of linker/spacers. Following attachment of the biotin, the microarray was covered by a solution of Texas Red labeled streptavidin, which selectively complexes to biotin. Image analysis was done on the microarray to view the electrodes having the Texas Red labeled streptavidin.

Figure 24:
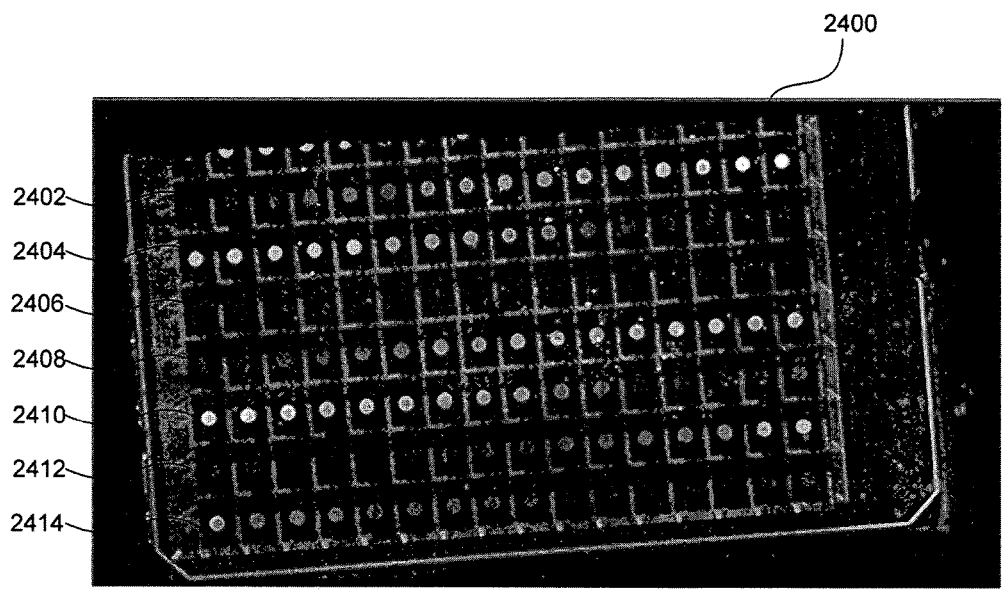

FIG. 24 is magnified photograph of a top view of a portion of the microarray 2400 showing rows 2402, 2404, 2406, 2408, 2410, 2412, and 2414. Moving from left to right, the length of the combination linker and spacer was zero on the first electrode in rows 2402, 2408, and 2412. Moving from right to left, the length of the linker/spacer was zero on the first electrode in rows 2403, 2410, and 2414. Row 2406 did not have any synthesis thereon. For rows 2402, 2408, and 2412, the length of the linker/spacer increased by one T unit moving from left to right. For rows 2403, 2410, and 2414, the length of the combination linker and spacer increased by one T unit moving from right to left. To allow in situ synthesis, the cells without a T unit had one modified T unit having the amine group according to example 1 and FIG. 21, electrode 2108. FIG. 24 shows that as the length of the combination linker and spacer increases, the fluorescence increases. At approximately 6 to 8 T units, the fluorescence began to increase substantially until reaching the last cell having 15 T units having the strongest fluorescence. Thus, increasing the length of the linker/spacer can eliminate the quenching effect of the platinum electrode.

Example 4

Figure 23:
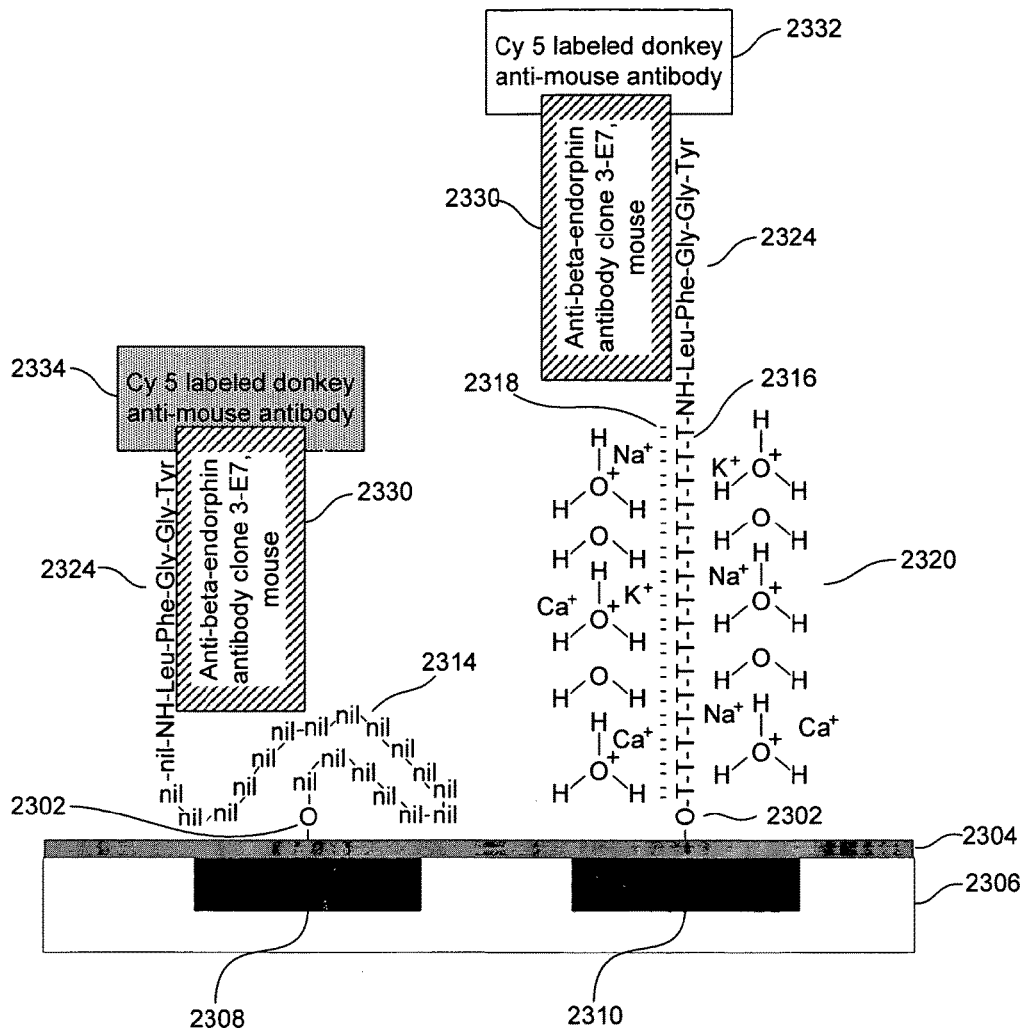

FIG. 23 is a schematic of a cross section of two cells 2308, 2310 of an electrode microarray 2306 having a plurality of platinum electrodes serially and individually addressable. A coating 2304 having hydroxyl reactive groups 2302 is shown. The coating 2304 was a sucrose layer adsorbed onto the platinum electrodes and was only present on the electrodes. Electrode 2308 is shown with a non-ionic combination linker and spacer 2314, and electrode 2310 is shown having a combination linker and spacer 2316 in accordance with the present invention. The nonionic linker 2314 was attached before or after synthesis of the combination linker and spacer 2316 in accordance with the present invention. The peptide 2324 was synthesized in situ on electrodes 2308 and 2310. The fluorescent labeling procedure of examples 1 and 2 was used to label the peptides 2330, 2332, 2334 at electrodes 2308 and 2310.

The nonionic combination linker and spacer 2314 was a PEG compound or other nonionic compound. Although PEG is water soluble, it is not as well solvated as the multiple ionic combination linker and spacer 2316 of the present invention because negative charges 2318 contributed substantially to solvation. The lack of charge on a PEG (or other nonionic) can allow the PEG to fold upon itself, to approach the electrode surface, or to approach nearby PEG chains on the same electrode with the result that the fluorescence on electrode 2308 is expected to be less than 2310 due to platinum quenching and due to less access of the labeling species to the peptide. It is expected that synthesis efficiency will be higher using the multiple ionic combination linker and spacer 2316 of the present invention because of better access to the reactive group 420A, 420B on the end of the combination linker and spacer 2316.

Another embodiment of the present invention also includes a method for electrochemical synthesis of an array of separately formed oligonucleotides on a substrate, which comprises the steps of: placing a buffering or scavenging solution in contact with an array of electrodes that is proximate to a substrate surface, said surface being proximate to one or more molecules bearing at least one protected chemical functional group attached thereto, selectively deprotecting at least one protected chemical functional group on at least one of the molecules; bonding a first nucleotide having at least one protected chemical functional group to one or more deprotected chemical functional groups of the molecule; selectively deprotecting a chemical functional group on the bonded molecule or another of the molecules bearing at least one protected chemical functional group; bonding a second nucleotide having at least one protected chemical functional group to a deprotected chemical functional group of the bonded molecule or the other deprotected molecule; and repeating the selective deprotection of a chemical functional group on a bonded protected nucleotide or a bonded protected molecule and the subsequent bonding of an additional nucleotide to the deprotected chemical functional group until at least two separate oligonucleotides of desired length are formed on the substrate surface.

By using the electrochemical techniques discussed herein, it is possible to place monomers, both those that can be used for polymer synthesis and those that can be decorated, and pre-formed molecules at small and precisely known locations on a substrate. It is therefore possible to synthesize polymers of a known chemical sequence at selected locations on a substrate. For example, in accordance with the presently disclosed invention, one can place nucleotides at selected locations on a substrate to synthesize desired sequences of nucleotides in the form of, for example, oligonucleotides.

The monomers or pre-formed molecules can then be deprotected in the same manner to yield a second set of reactive chemical functional groups. A second monomer or pre-formed molecule, which may also bear at least one protecting group removable by an electrochemically generated reagent, is subsequently brought into contact with the substrate to bond with the second set of exposed functional groups. Any unreacted functional groups can optionally be capped at any point during the synthesis process. The deprotection and bonding steps can be repeated sequentially at this site on the substrate until polymers or oligonucleotides of a desired sequence and length are obtained.

In another embodiment of the present invention, the substrate having one or more molecules bearing at least one protected chemical functional group bonded thereto is proximate an array of electrodes, which array is in contact with a buffering or scavenging solution. Following application of an electric potential to selected electrodes in the array sufficient to generate electrochemical reagents capable of deprotecting the protected chemical functional groups, molecules proximate the selected electrodes are deprotected to expose reactive functional groups, thereby preparing them for bonding. A monomer solution or a solution of pre-formed molecules, such as proteins, nucleic acids, polysaccharides, and porphyrins, is then contacted with the substrate surface and the monomers or pre-formed molecules bond with the deprotected chemical functional groups.

Another sufficient potential is subsequently applied to select electrodes in the array to deprotect at least one chemical functional group on the bonded molecule or another of the molecules bearing at least one protected chemical functional group. A second monomer or pre-formed molecule having at least one protected chemical functional group is subsequently bonded to a deprotected chemical functional group of the bonded molecule or the other deprotected molecule. The selective deprotection and bonding steps can be repeated sequentially until polymers or oligonucleotides of a desired sequence and length are obtained. The selective deprotection step is repeated by applying another potential sufficient to effect deprotection of a chemical functional group on a bonded protected monomer or a bonded protected molecule. The subsequent bonding of an additional monomer or pre-formed molecule to the deprotected chemical functional group(s) until at least two separate polymers or oligonucleotides of desired length are formed on the substrate.

Preferred embodiments of the present invention use a buffering or scavenging solution in contact with each electrode, which is buffered towards the electrochemically generated reagents, in particular, towards protons and/or hydroxyl ions, and that actively prevents chemical cross-talk caused by diffusion of the electrochemically generated ions from one electrode to another electrode in an array. For example, when an electrode exposed to an aqueous or partially aqueous media is biased to a sufficiently positive (or negative) potential, protons (or hydroxyl ions) are produced as products of water hydrolysis. Protons, for example, are useful for removing electrochemical protecting groups from several molecules useful in combinatorial synthesis, for example, peptides, nucleic acids, and polysaccharides.

In order to produce separate and pure polymers, it is desirable to keep these protons (or hydroxyl ions) confined to the area immediately proximate the selected electrode(s) in order to minimize, and, if possible to eliminate, chemical cross-talk between nearby electrodes in an array. The spatial extent of excursion of electrochemically generated reagents can be actively controlled by the use of a buffering or scavenging solution that reacts with the reagents that move away from the selected electrodes, thus preventing these reagents from reacting at a nearby electrode.

Protective groups are materials that bind to a monomer, a linker molecule or a pre-formed molecule to protect a reactive functionality on the monomer, linker molecule or pre-formed molecule, which may be removed upon selective exposure to an activator, such as an electrochemically generated reagent. Protective groups that may be used in accordance with the present invention preferably include all acid and base labile protecting groups. For example, peptide amine groups are preferably protected by t-butyloxycarbonyl (BOC) or benzyloxycarbonyl (CBZ), both of which are acid labile, or by 9-fluorenylmethoxycarbonyl (FMOC), which is base labile. Additionally, hydroxy groups on phosphoramidites may be protected by dimethoxytrityl (DMT), which is acid labile. Exocyclic amine groups on nucleosides, in particular on phosphoramidites, are preferably protected by dimethylformamidine on the adenosine and guanosine bases, and isobutyryl on the cytidine bases, both of which are base labile protecting groups. This protection strategy is known as fast oligonucleotide deprotection (FOD). Phosphoramidites protected in this manner are known as FOD phosphoramidites.

Additional protecting groups that may be used in accordance with the present invention include acid labile groups for protecting amino moieties: tertbutyloxycarbonyl,-tert-amyloxycarbonyl, adamantyloxycarbonyl, 1-methylcyclobutyloxycarbonyl, 2-(p-biphenyl)propyl(2)oxycarbonyl, 2-(p-phenylazophenylyl)propyl(2)oxycarbonyl, .alpha., .alpha.-dimethyl-3,5-dimethyloxybenzyloxy-carbonyl, 2-phenylpropyl(2)oxycarbonyl, 4-methyloxybenzyloxycarbonyl, benzyloxycarbonyl, furfuryloxycarbonyl, triphenylmethyl (trityl), p-toluenesulfenylaminocarbonyl, dimethylphosphinothioyl, diphenylphosphinothioyl, 2-benzoyl-1-methylvinyl, o-nitrophenylsulfenyl, and 1-naphthylidene; as base labile groups for protecting amino moieties: 9-fluorenylmethyloxycarbonyl, methylsulfonylethyloxycarbonyl, and 5-benzisoazolylmethyleneoxycarbonyl; as groups for protecting amino moieties that are labile when reduced: dithiasuccinoyl, p-toluene sulfonyl, and piperidino-oxycarbonyl; as groups for protecting amino moieties that are labile when oxidized: (ethylthio)carbonyl; as groups for protecting amino moieties that are labile to miscellaneous reagents, the appropriate agent is listed in parenthesis after the group: phthaloyl (hydrazine), trifluoroacetyl (piperidine), and chloroacetyl (2-aminothiophenol); acid labile groups for protecting carboxylic acids: tert-butyl ester; acid labile groups for protecting hydroxyl groups: dimethyltrityl; and basic labile groups for protecting phosphotriester groups: cyanoethyl.

The at least one electrode proximate the substrate of the invention is preferably an array of electrodes. Arrays of electrodes of any dimension may be used, including arrays containing up to several million electrodes. Preferably, multiple electrodes in an array are simultaneously addressable and controllable by an electrical source. More preferably, each electrode is individually addressable and controllable by its own electrical source, thereby affording selective application of different potentials to select electrodes in the array. In this regard, the electrodes can be described as "switchable".

There are four naturally occurring deoxyribonucleotide monomers that form DNA polymers. They are adenosine (A), thymidine (T), cytosine (C), and guanosine (G). DNA is considered an acid because the phosphodiester groups that bind the monomers together are acidic. The nucleosides (A, T, C, G) are organic bases. DNA in nature is normally tens of millions to billions of base units long. A fifteen base unit long piece of DNA will be prepared in the following example. A piece of DNA of this length is known as a oligonucleotide. DNA molecules should be at least this long, otherwise it is very difficult to distinguish between them.

The nucleosides are protected because the exocyclic amine bases (A, C, G) are susceptible to depurination by acids. The protecting groups on these bases are base labile. There are three kinds of protecting groups on phosphoramidites. They are the DMT groups, which protect the 5' hydroxyl groups, the cyanoethyl ether groups, which protect the phosphorous, and the FOD (fast oligonucleotide deprotection) groups, which protect the exocyclic amines on the nucleoside bases. The DMT groups are acid labile and the others are base labile.

The trivalent phosphite linkage between the polymer and the phosphoramidite is oxidized to the more stable pentavalent phosphotriester linkage by electrochemically generated iodine. The iodine is produced electrochemically by the oxidation of iodide ions in an aqueous THF solution of potassium iodide. Iodine can be confined to the local area where it is formed by both an iodine buffering reaction and a scavenging reaction. Iodine is buffered by an equilibrium reaction with iodide ions to form the triiodide ion. The triiodide ion is not a useful reagent. Further, the solution can be buffered with respect to hydroxyl ions such that it is slightly basic. Iodine reacts with hydroxyl ions to form iodide ions and hypoiodite. Both of these chemical species are unreactive. Thus, hydroxyl ions serve as scavengers for iodine. Because the electrochemical oxidation of iodide ions to iodine can occur under conditions that also produce protons, the local environment can be made acidic while the iodine is being generated. There will be no scavenging in the acidic regions where iodine needs to be active. As a result, there are stable phosphodiester linkages to the polymer film only over those electrodes that electrochemically generate iodine. The unoxidized phosphite linked groups will eventually fall off after repeated exposure to the acetic anhydride capping solution.

The electrode array is next exposed to an aqueous 0.1 M sodium phosphate solution. A positive potential is applied for one second to first selected areas and the DMT protecting groups are removed from the cytidine phosphoramidites in first selected areas. The array is then washed with anhydrous acetic anhydride. The reactive array is then exposed to a 0.05 M solution of thymidine phosphoramidite, T, and tetrazole in anhydrous acetonitrile for 30 seconds. The T nucleotides react with the C nucleotides at the first selected sites to form a C-T dimer. The remaining unreacted C nucleotides are capped and the phosphite linkages are reduced to phosphotriester linkages as outlined above.

This procedure is repeated at second, third, fourth, and so on, selected sites to synthesize combinatorially four different fifteenmer oligonucleotides at selected sites on the array. The array is then exposed to a 0.1 M aqueous ammonium hydroxide solution at 50.degree. C. for an hour. The FOD protecting groups and the cyanoethyl protecting groups on the phosphotriester are removed by the hydroxyl ions. The resulting array consists of single strands of the oligomer nucleic acids bound covalently to the polymer membrane.

What is claimed is:

1. A process for forming an electrode array device for synthesis of an oligonucleotide having a plurality of electrodes, where the plurality of electrodes have a top electrode surface, and a porous reaction layer adsorbed to the top electrode surface for improved synthesis quality comprising:
   (a) providing a substrate including a top electrode surface, one or more recesses in the substrate and a plurality of electrodes positioned in the one or more recesses, where each of the plurality of electrodes is electronically connected to a computer control system, where the computer control system is configured to control an addressing system for selecting and controlling one or more individual electrodes within the plurality of electrodes and a source to supply a current, where the source is electronically connected to each of the plurality of electrodes by the addressing system;
   (b) contacting a treatment solution to the top electrode surface, where the treatment solution comprises a chemical species that adsorbs onto the top electrode surface and a solvent capable of dissolving the chemical species;
   (c) washing off the treatment solution while leaving a layer of the chemical species adsorbed onto the top electrode surface to form a porous reaction layer; and
   (d) performing a plurality of electrochemical synthesis reactions to synthesize an oligonucleotide on the porous reaction layer, where the computer control system is configured such that the current generates a reactive species in the one or more individual electrodes within the plurality of electrodes, where the generation of the reactive species in the one or more individual electrodes within the plurality of electrodes forms a virtual flask adjacent the one or more individual electrodes within the plurality of electrodes, where the plurality of electrochemical synthesis reactions occur on the porous reaction layer within the virtual flask.

2. The process of claim 1, where the chemical species is one or more species selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and

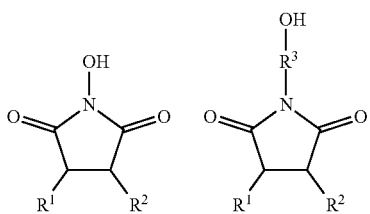

combinations thereof, where formula I is formula II is formula III is HOR4(OR5)mR7, formula IV is,

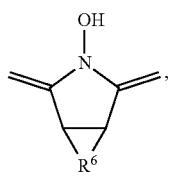

formula V is

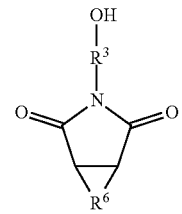

formula VI is

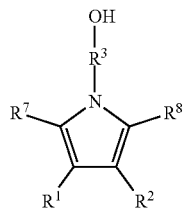

and formula VII is

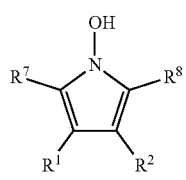

where in each formula m is an integer from 1 to 4; R1, R2, R7, and R8 are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; R3 is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; R4 and R5 are independently selected from the group consisting of methylene, ethylene, propylene, butylene, pentylene, and hexylene; R6 forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and R7 is selected from the group consisting of amino and hydroxyl.

3. The process of claim 2, where the monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose.

4. The process of claim 2, where the disaccharide is selected from the group consisting of amylose, cellobiose, lactose, maltose, melibiose, palatinose, sucrose, and trehalose.

5. The process of claim 2, where the trisaccharide is selected from the group consisting of raffinose and melezitose.

6. The process of claim 2, where the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholino benzophenone-4-hexa(ethylene glycol) allyl ether, 4-morpholino benzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

7. The process of claim 2, where the polyethylene glycol has a molecular weight from approximately 1,000 to 20,000.

8. The process of claim 1, where step (b) further comprises:
  contacting the treatment solution to the top electrode surface from between:
  a lower limit of about 1 minute; and
  an upper limit of about 1 month.

9. The process of claim 1, where the solvent is water.

10. The process of claim 1, where the chemical species has a concentration of between:
  a lower limit of approximately 0.001 molar; and
  an upper limit of approximately 5 molar;
  where the temperature of the treatment solution is between:
  a lower limit of approximately 0 degrees Celsius; and
  an upper limit of approximately 90 degrees Celsius.

11. The process of claim 1, where the top electrode surface is selected from the group consisting of platinum, gold, semiconductor, indium tin oxide, and carbon and combinations thereof.

12. The process of claim 1, where step (a) further comprises etching the top electrode surface using a plasma cleaning method.

13. The process of claim 12, where the plasma cleaning method further comprises: exposing the top electrode surface to an argon plasma for approximately two to six minutes.

14. The process of claim 12, where the plasma cleaning method further comprises exposing the top electrode surface to a sulfur hexafluoride plasma for between:
  a lower limit of approximately two minutes; and
  an upper limit of approximately six minutes.

15. The process of claim 12, where the plasma cleaning method comprises:
  (a) etching the top electrode surface using a power of approximately 600 watts and a pressure of approximately eight millitorr to generate an argon plasma for between:
  a lower limit of about 2 minutes; and
  an upper limit of about 4 minutes;
  (b) etching the top electrode surface using a power of approximately 500 watts and a pressure of approximately fifty millitorr to generate an argon plasma for between:
  a lower limit of about 5 minutes; and
  an upper limit of about 7 minutes; and
  (c) etching the top electrode surface using a power of approximately 600 watts and a pressure of approximately eight millitorr to generate an argon plasma for between:
  a lower limit of about 8 minutes; and
  an upper limit of about 12 minutes.

16. The process of claim 1, where step (a) further comprises cleaning the top electrode surface using a chemical cleaning method.

17. The process of claim 16, where the chemical cleaning method further comprises an electrochemical cleaning method, where the electrochemical cleaning method comprises:
   (a) contacting a sulfuric acid solution with the top electrode surface, where the sulfuric acid solution has a concentration between:
   a lower limit of approximately 0.01 molar; and
   an upper limit of approximately 5 molar;
   (b) pulsing a current to a first group of electrodes while a second group of electrodes is grounded, where each electrode is in the first group of electrodes or the second group of electrodes for between:
   a lower limit of approximately 0.01 seconds; and
   an upper limit of approximately 60 seconds;
   (c) pulsing a current to the second group of electrodes while the first group of electrodes is grounded for between:
   a lower limit of approximately 0.01 seconds; and
   an upper limit of approximately 60 seconds; and
   (d) alternating between step (b) and step (c) for a cumulative time of between
   a lower limit of approximately 1 minute; and
   an upper limit of approximately 60 minutes.

18. The process of claim 16, where the chemical cleaning method further comprises a hydrogen peroxide cleaning method comprising:
   (a) contacting a hydrogen peroxide solution with the top electrode surface, where the hydrogen peroxide solution has a concentration of between:
   a lower limit of approximately 0.5 percent (by volume); and
   an upper limit of approximately 10 percent (by volume).

19. The process of claim 18, where the contacting time is from between:
   a lower limit of approximately 1 minute; and
   an upper limit of approximately 24 hours.

20. The process of claim 18, where the hydrogen peroxide solution temperature is between:
   a lower limit of approximately 20 degrees Celsius; and
   an upper limit of approximately 95 degrees Celsius.

* * * * *

SEQUENCE LISTING

```
<160> NUMBER OF SEQ ID NOS: 3

<210> SEQ ID NO 1
<211> LENGTH: 10
<212> TYPE: DNA
<213> ORGANISM: Artificial Sequence
<220> FEATURE:
<223> OTHER INFORMATION: Synthetic polynucleotide

<400> SEQUENCE: 1
agctgctata                                                          10

<210> SEQ ID NO 2
<211> LENGTH: 5
<212> TYPE: PRT
<213> ORGANISM: Artificial Sequence
<220> FEATURE:
<223> OTHER INFORMATION: Synthetic polypeptide

<400> SEQUENCE: 2

Tyr Gly Gly Phe Leu
1               5

<210> SEQ ID NO 3
<211> LENGTH: 16
<212> TYPE: DNA
<213> ORGANISM: Artificial Sequence
<220> FEATURE:
<223> OTHER INFORMATION: Synthetic polynucleotide

<400> SEQUENCE: 3
tttttttttt tttttt                                                   16
```